US012581332B2

(12) United States Patent
Huang et al.

(10) Patent No.: US 12,581,332 B2
(45) Date of Patent: Mar. 17, 2026

(54) CHANNEL STATUS REPORT BASED ON SOUNDING REFERENCE SIGNAL RESOURCE USAGE IN FULL DUPLEX

(71) Applicant: QUALCOMM Incorporated, San Diego, CA (US)

(72) Inventors: Min Huang, Beijing (CN); Yu Zhang, San Diego, CA (US); Jing Dai, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/996,561

(22) PCT Filed: May 14, 2021

(86) PCT No.: PCT/CN2021/093763
§ 371 (c)(1),
(2) Date: Oct. 19, 2022

(87) PCT Pub. No.: WO2021/228211
PCT Pub. Date: Nov. 18, 2021

(65) Prior Publication Data
US 2023/0189027 A1     Jun. 15, 2023

(30) Foreign Application Priority Data
May 15, 2020     (WO) ................ PCT/CN2020/090689

(51) Int. Cl.
*H04W 24/08*         (2009.01)
*H04B 7/06*          (2006.01)
(Continued)

(52) U.S. Cl.
CPC ........ *H04W 24/08* (2013.01); *H04B 7/06956* (2023.05); *H04B 17/336* (2015.01); *H04L 5/0051* (2013.01)

(58) Field of Classification Search
None
See application file for complete search history.

(56) References Cited

U.S. PATENT DOCUMENTS 9,450,658 B1      9/2016  Moon et al.
2018/0302192 A1   10/2018  Yang et al.
(Continued)

FOREIGN PATENT DOCUMENTS

CN       106452522 A     2/2017
CN       110945793 A     3/2020
(Continued)

OTHER PUBLICATIONS

Intel Corporation: "On Cross-Link Interference Measurement for NR Dynamic TDD", 3GPP TSG RAN1 WG Meeting NR AH 1701, 3GPP Draft, R1-1704775, on Cross Link Interference Measurement for NR TDD, 3rd Generation Partnership Project (3GPP), Mobile Competence Centre, 650, Route Des Lucioles, F-06921 Sophia-Antipolis Cedex, vol. RAN WG1, No. Spokane, WA, USA, Apr. 3, 2017-Apr. 7, 2017, Apr. 2, 2017, XP051242912, 5 pages, pp. 2-4, Section 2, the Whole Document.
(Continued)

*Primary Examiner* — Peter P Chau
(74) *Attorney, Agent, or Firm* — Holland & Hart LLP/Qualcomm

(57) ABSTRACT

Methods, systems, and devices for wireless communications are described. An integrated access and backhaul (IAB) node may receive, from a parent IAB node, a channel state information (CSI) report configuration for generation of a CSI report associated with monitoring, by the IAB node, at least one CSI-reference signal (CSI-RS) resource set, the configuration also indicating usage information for the at least one CSI-RS resource set. The IAB node may transmit a CSI resource configuration to a downstream node, the CSI resource configuration indicating, based at least in part on
(Continued)

the usage information, a number of spatial layers of cross-link interference associated with the parent IAB node. The IAB node may receive, from the downstream node, the CSI report indicating CSI, the CSI associated with the cross-link interference based at least in part on the number of spatial layers.

28 Claims, 21 Drawing Sheets

(51) Int. Cl.
  *H04B 17/336*  (2015.01)
  *H04L 5/00*  (2006.01)

(56) References Cited

U.S. PATENT DOCUMENTS

| | | | |
|---|---|---|---|
| 2018/0323887 A1 | 11/2018 | Azarian Yazdi et al. | |
| 2019/0274155 A1 | 9/2019 | Bhattad et al. | |
| 2020/0106488 A1 | 4/2020 | Akoum et al. | |
| 2022/0006501 A1* | 1/2022 | Kim | H04W 24/10 |
| 2022/0116129 A1* | 4/2022 | Ying | H04B 7/0617 |
| 2022/0124531 A1* | 4/2022 | Miao | H04B 17/345 |
| 2022/0159596 A1* | 5/2022 | Kim | H04J 11/00 |

FOREIGN PATENT DOCUMENTS

| | | |
|---|---|---|
| WO | WO-2018188669 A1 | 10/2018 |
| WO | WO-2018204098 | 11/2018 |
| WO | WO-2019032031 A1 | 2/2019 |

OTHER PUBLICATIONS

International Search Report and Written Opinion—PCT/CN2020/090689—ISA/EPO—Feb. 5, 2021.
International Search Report and Written Opinion—PCT/CN2021/093763—ISA/EPO—Aug. 13, 2021.
Qualcomm Incorporated (Mediator): "Rel-17 IAB Email Discussion—Report", 3GPP TSG RAN meeting #86, RP-193094, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 8, 2019 (Dec. 8, 2019), 39 Pages, XP051838727, p. 13-p. 14.
Supplementary European Search Report—EP21804460—Search Authority—The Hague—May 22, 2024.

* cited by examiner

Receiver

710

Communications Manager

715

Transmitter

720

705

700

1110

1115

1120

1105

1100

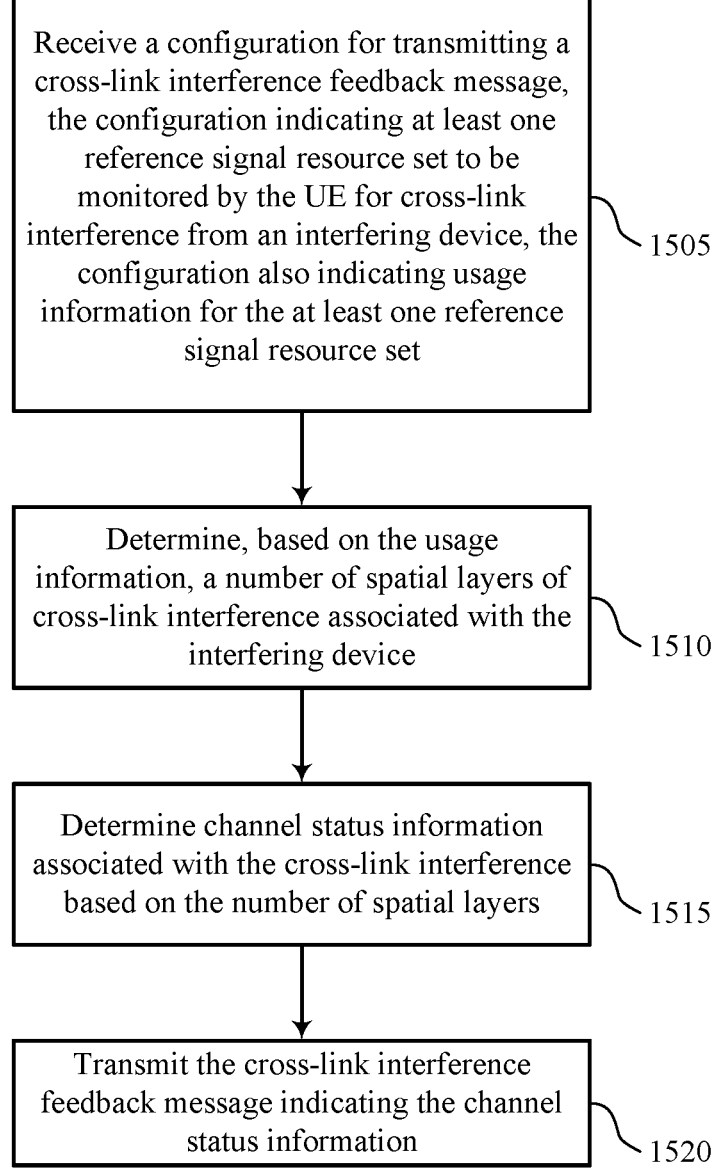

Receive a configuration for transmitting a cross-link interference feedback message, the configuration indicating at least one reference signal resource set to be monitored by the UE for cross-link interference from an interfering device, the configuration also indicating usage information for the at least one reference signal resource set ⟋ 1505

Determine, based on the usage information, a number of spatial layers of cross-link interference associated with the interfering device ⟋ 1510

Determine channel status information associated with the cross-link interference based on the number of spatial layers ⟋ 1515

Transmit the cross-link interference feedback message indicating the channel status information ⟋ 1520

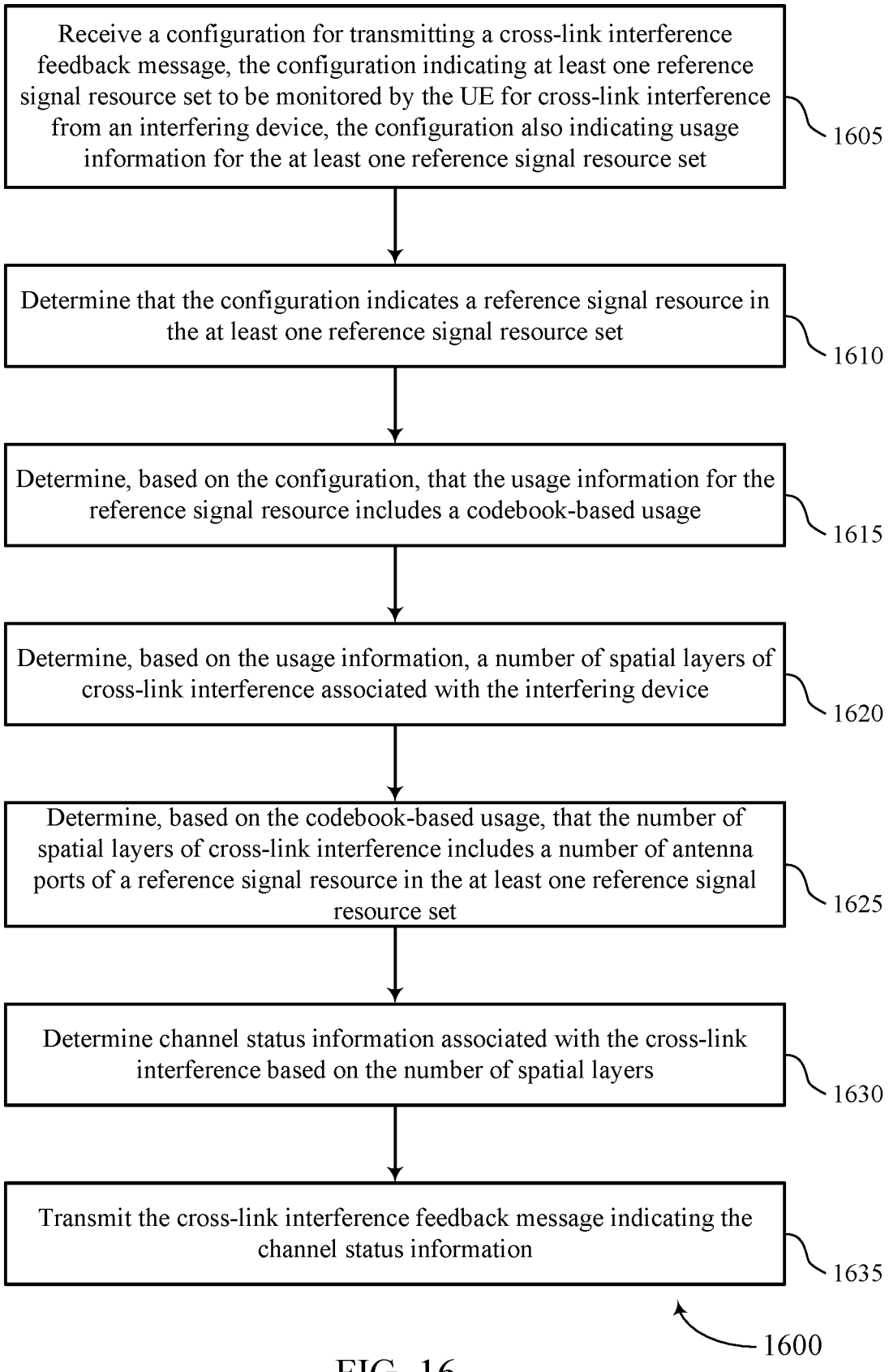

Receive a configuration for transmitting a cross-link interference feedback message, the configuration indicating at least one reference signal resource set to be monitored by the UE for cross-link interference from an interfering device, the configuration also indicating usage information for the at least one reference signal resource set

1605

Determine that the configuration indicates a reference signal resource in the at least one reference signal resource set

1610

Determine, based on the configuration, that the usage information for the reference signal resource includes a codebook-based usage

1615

Determine, based on the usage information, a number of spatial layers of cross-link interference associated with the interfering device

1620

Determine, based on the codebook-based usage, that the number of spatial layers of cross-link interference includes a number of antenna ports of a reference signal resource in the at least one reference signal resource set

1625

Determine channel status information associated with the cross-link interference based on the number of spatial layers

1630

Transmit the cross-link interference feedback message indicating the channel status information

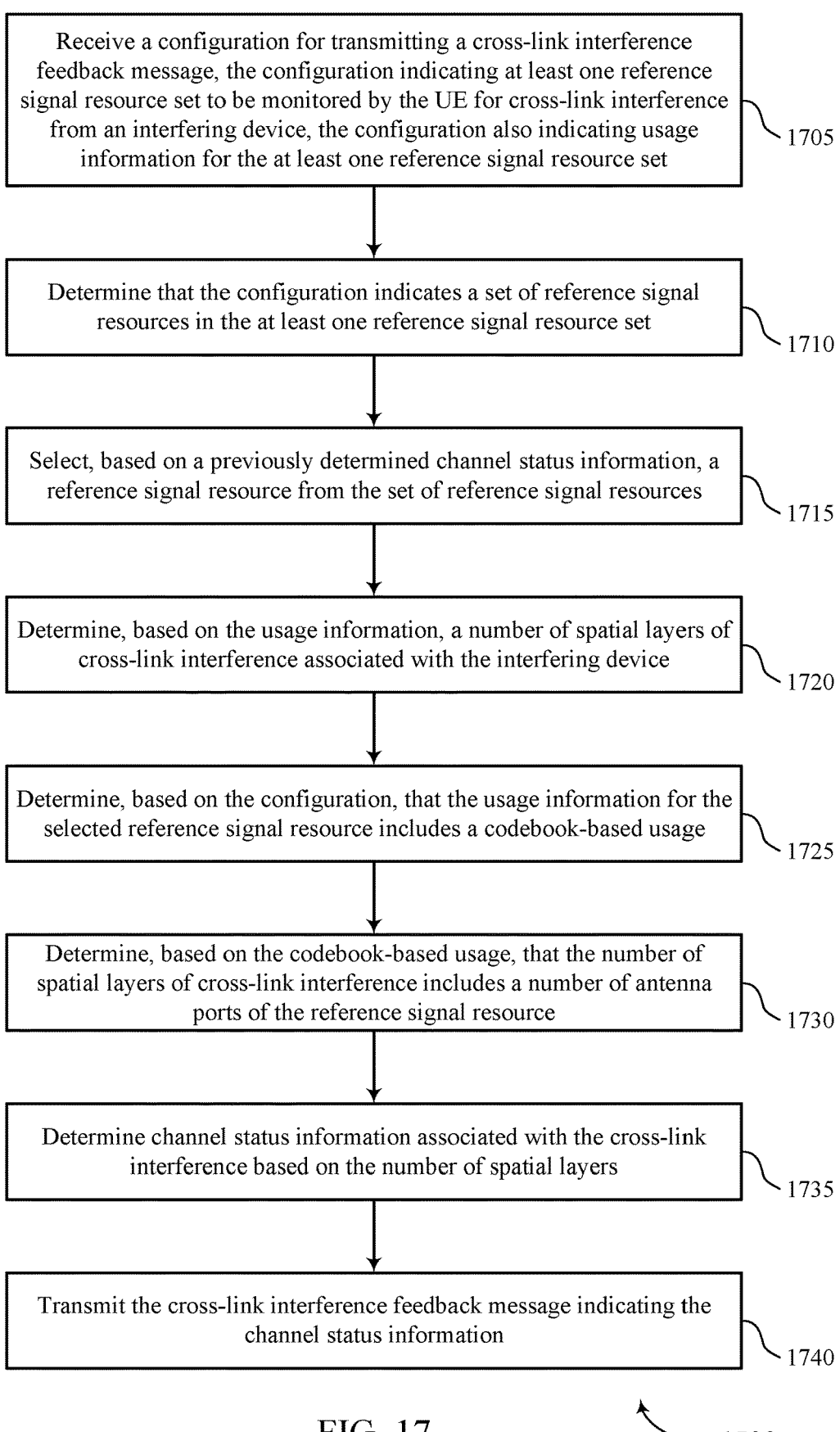

Receive a configuration for transmitting a cross-link interference feedback message, the configuration indicating at least one reference signal resource set to be monitored by the UE for cross-link interference from an interfering device, the configuration also indicating usage information for the at least one reference signal resource set

1705

Determine that the configuration indicates a set of reference signal resources in the at least one reference signal resource set

1710

Select, based on a previously determined channel status information, a reference signal resource from the set of reference signal resources

1715

Determine, based on the usage information, a number of spatial layers of cross-link interference associated with the interfering device

1720

Determine, based on the configuration, that the usage information for the selected reference signal resource includes a codebook-based usage

1725

Determine, based on the codebook-based usage, that the number of spatial layers of cross-link interference includes a number of antenna ports of the reference signal resource

1730

Determine channel status information associated with the cross-link interference based on the number of spatial layers

1735

Transmit the cross-link interference feedback message indicating the channel status information

Figure 18:
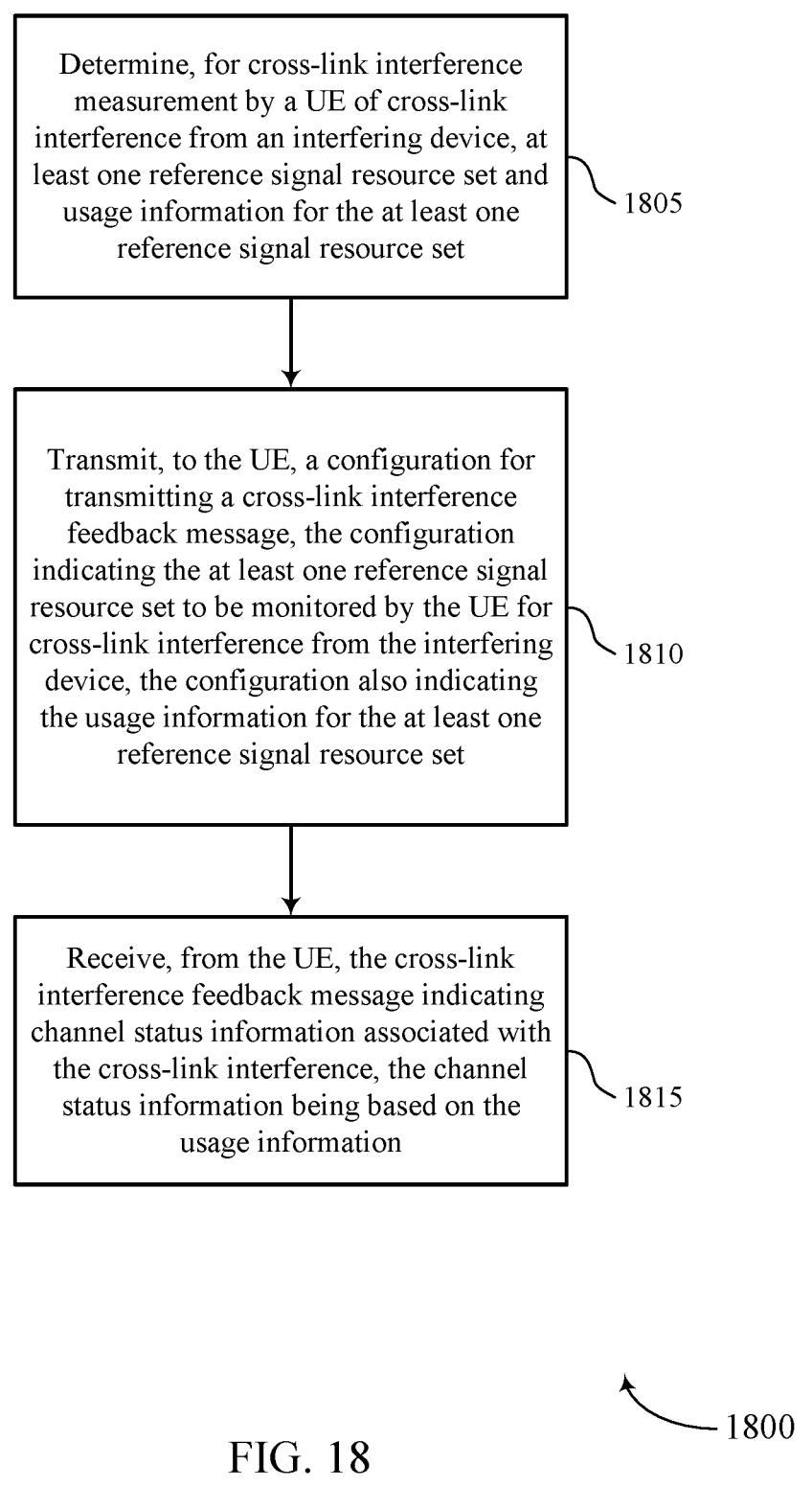

Determine, for cross-link interference measurement by a UE of cross-link interference from an interfering device, at least one reference signal resource set and usage information for the at least one reference signal resource set

1805

Transmit, to the UE, a configuration for transmitting a cross-link interference feedback message, the configuration indicating the at least one reference signal resource set to be monitored by the UE for cross-link interference from the interfering device, the configuration also indicating the usage information for the at least one reference signal resource set

1810

Receive, from the UE, the cross-link interference feedback message indicating channel status information associated with the cross-link interference, the channel status information being based on the usage information

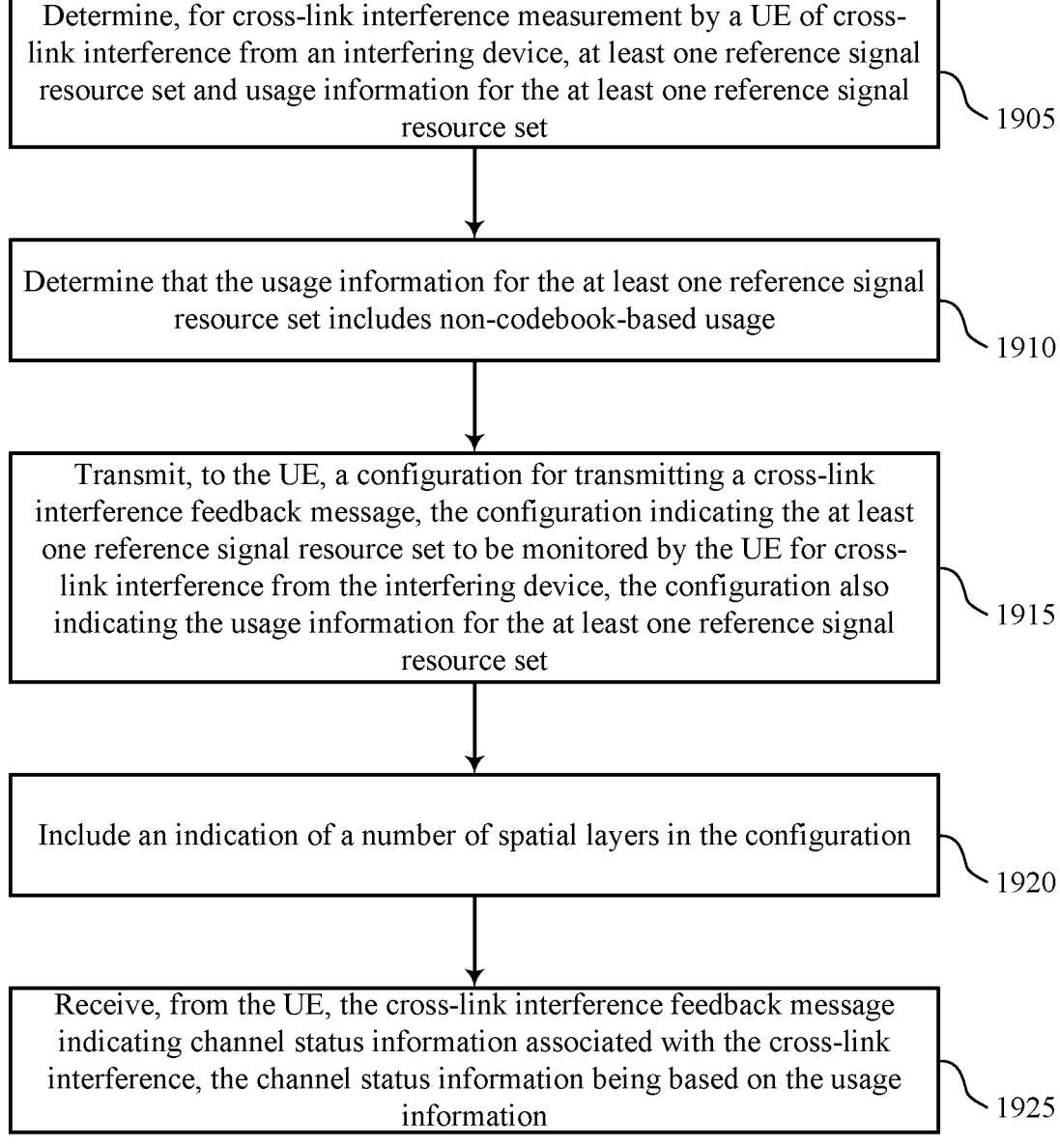

Determine, for cross-link interference measurement by a UE of cross-link interference from an interfering device, at least one reference signal resource set and usage information for the at least one reference signal resource set

1905

Determine that the usage information for the at least one reference signal resource set includes non-codebook-based usage

1910

Transmit, to the UE, a configuration for transmitting a cross-link interference feedback message, the configuration indicating the at least one reference signal resource set to be monitored by the UE for cross-link interference from the interfering device, the configuration also indicating the usage information for the at least one reference signal resource set

1915

Include an indication of a number of spatial layers in the configuration

1920

Receive, from the UE, the cross-link interference feedback message indicating channel status information associated with the cross-link interference, the channel status information being based on the usage information

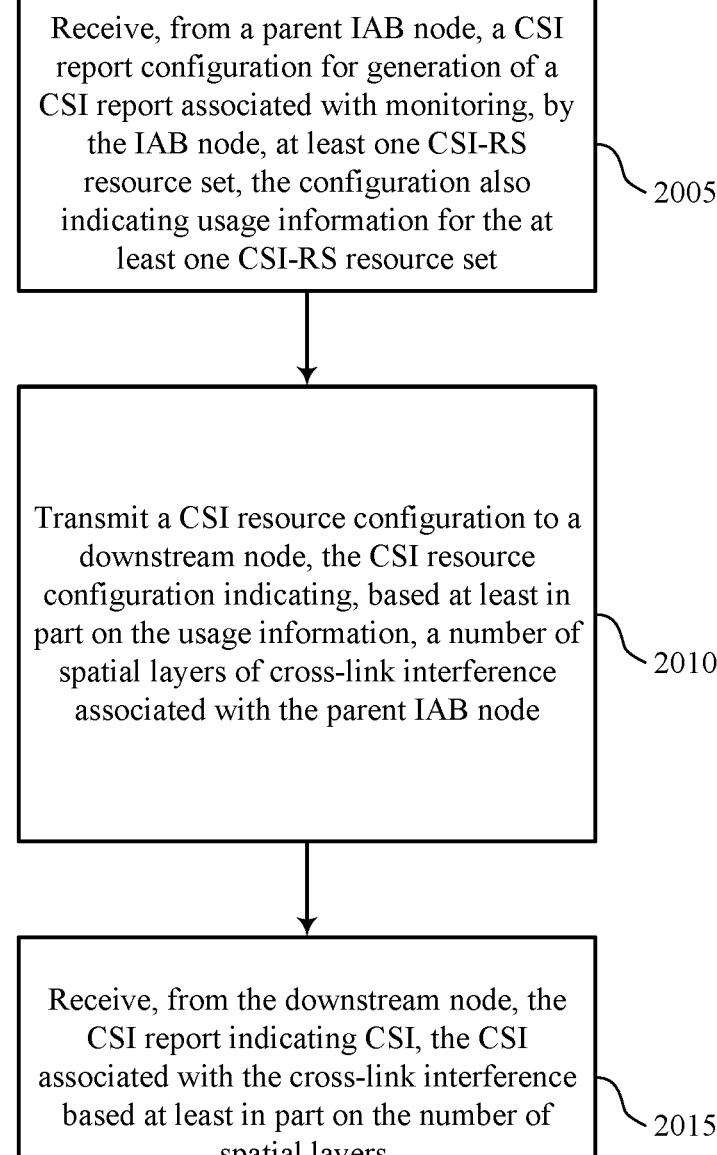

Receive, from a parent IAB node, a CSI report configuration for generation of a CSI report associated with monitoring, by the IAB node, at least one CSI-RS resource set, the configuration also indicating usage information for the at least one CSI-RS resource set

2005

Transmit a CSI resource configuration to a downstream node, the CSI resource configuration indicating, based at least in part on the usage information, a number of spatial layers of cross-link interference associated with the parent IAB node

2010

Receive, from the downstream node, the CSI report indicating CSI, the CSI associated with the cross-link interference based at least in part on the number of spatial layers.

Figure 21:
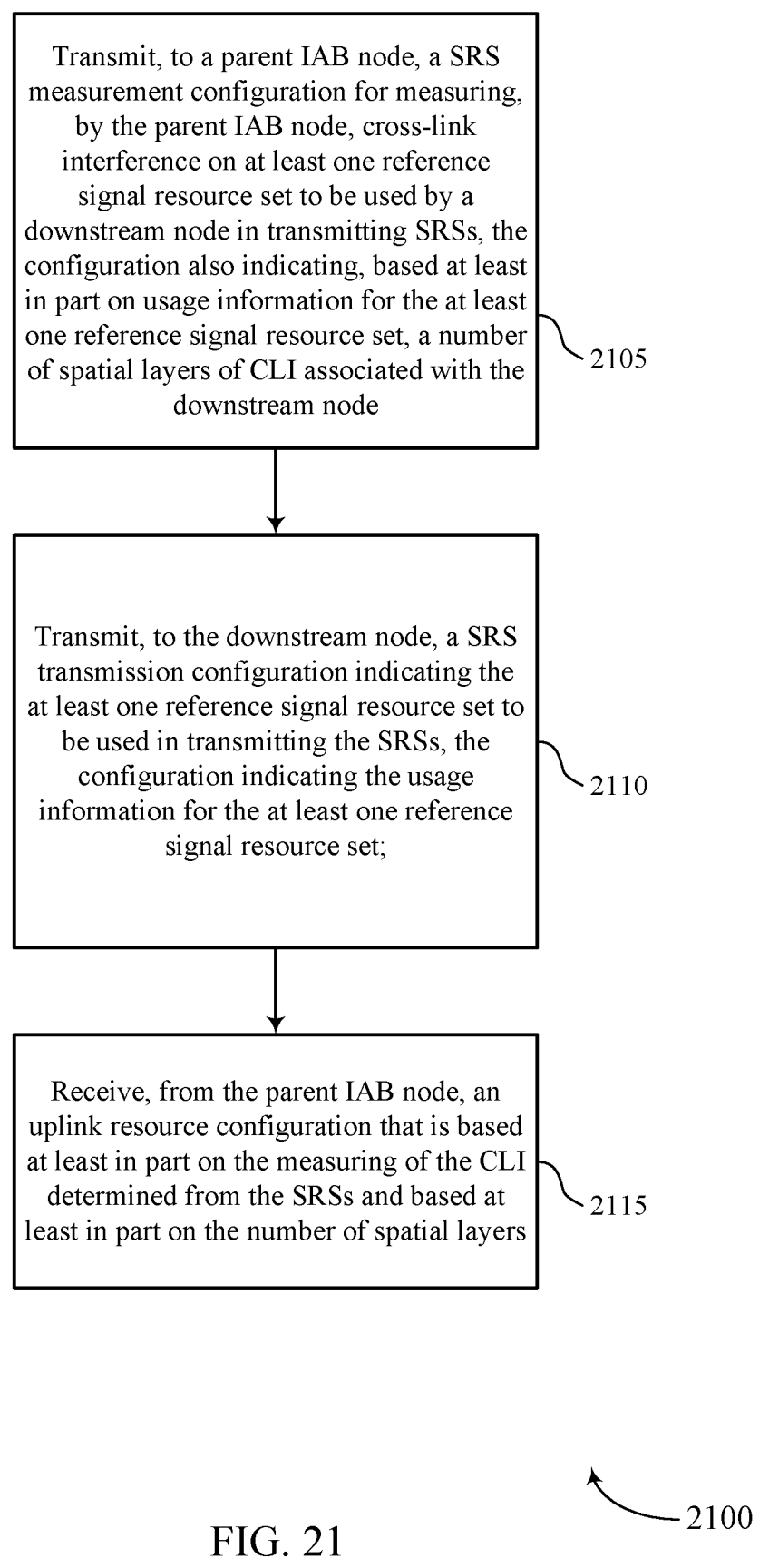

Transmit, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node

2105

Transmit, to the downstream node, a SRS transmission configuration indicating the at least one reference signal resource set to be used in transmitting the SRSs, the configuration indicating the usage information for the at least one reference signal resource set;

2110

Receive, from the parent IAB node, an uplink resource configuration that is based at least in part on the measuring of the CLI determined from the SRSs and based at least in part on the number of spatial layers

CHANNEL STATUS REPORT BASED ON SOUNDING REFERENCE SIGNAL RESOURCE USAGE IN FULL DUPLEX

CROSS REFERENCE

The present Application is a 371 national stage filing of International PCT Application No. PCT/CN2021/093763 by Huang et al. entitled "CHANNEL STATUS REPORT BASED ON SOUNDING REFERENCE SIGNAL RESOURCE USAGE IN FULL DUPLEX," filed May 14, 2021; and claims priority to International Patent Application No. PCT/CN2020/090689 by Huang et al. entitled "CHANNEL STATUS REPORT BASED ON SOUNDING REFERENCE SIGNAL RESOURCE USAGE IN FULL DUPLEX," filed May 15, 2020, each of which is assigned to the assignee hereof, and each of which is expressly incorporated by reference in its entirety herein.

FIELD OF TECHNOLOGY

The following relates generally to wireless communications and more specifically to channel status report based on sounding reference signal resource usage in full duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel status report based on sounding reference signal resource usage in full duplex. Generally, the described techniques provide for a base station to send a channel state information (CSI) report configuration message to a UE (e.g., a victim UE experiencing cross-link interference (CLI) from an aggressor device). The message may carry or otherwise indicate at least one sounding reference signal (SRS) resource set (e.g., where the aggressor device transmits its SRS(s)) and the usage information of the SRS resource set(s), e.g., beam management information, codebook vs. non-codebook, antenna switching information, etc. If the usage information for the SRS resource set is non-codebook usage, the base station may indicate the number of spatial layers of the aggressor device. The UE, which may operate in a full duplex communication mode, determines the number of spatial layers of the CLI based on the indicated SRS resource set(s) and corresponding usage information. For example, if the usage of the SRS resource set(s) is non-codebook, the number of spatial layers may be equal to the indicated number of physical uplink shared channel (PUSCH) spatial layers. As another example, if the usage of the SRS resource set(s) is codebook, the number of spatial layers may be equal to the number of antenna port(s) of an SRS resource in the SRS resource set. Accordingly, the UE may determine and report its CSI values for full duplex mode (e.g., in a CLI feedback message) communications in accordance with the determined number of spatial layers.

In some aspects of the described techniques, such channel status reporting may be adopted within an integrated access and backhaul (IAB) network. The IAB network may include an anchor node having a connection to a core network, one or more IAB nodes forming the links within the IAB network, and one or more UE associated with at least a portion of the IAB nodes. Broadly, the IAB network provides a backhaul connection for the UE to the core network via one or more intermediate IAB nodes to the anchor IAB node. In some aspects, each IAB node may include a distributed unit (DU) function that manages various aspects of the wireless backhaul links between the IAB node and a parent IAB node (which may simply be an upstream IAB node or may be the anchor IAB node) and between the IAB node and a downstream IAB node (which may be referred to as a child IAB node). Additionally, each IAB node may also include a mobile terminal (MT) function that manages various aspects of the wireless access links between the IAB node and one or more associated UE (which may also be considered a downstream node in this context).

For example, a parent IAB node may transmit or otherwise convey a CSI report configuration to an IAB node (e.g., a node within the IAB network between the parent IAB node in the downstream JAB node). Broadly, the CSI report configuration may generally carry or otherwise convey information identifying how the JAB node is to generate a CSI report based on monitoring CSI-reference signal (CSI-RS) transmissions from the parent IAB node. In some aspects, the CSI report configuration may also carry or otherwise convey usage information for a CSI-RS resource set (e.g., information identifying the usage of the CSI-RS transmissions). Based on the CSI report configuration, that JAB node may transmit or otherwise provide a CSI resource configuration to a downstream node (which may simply be a downstream JAB node served by the DU function or may be a UE served by the MT function). The parent IAB node may transmit CSI-RS according to the CSI-RS resource set, which the IAB node may monitor to determine CSI for the parent IAB node. However, the downstream IAB node may also receive the CSI-RS transmissions from the parent IAB node (which may be CLI from the perspective of the downstream node) and determine CSI information (e.g., CLI information) for the parent IAB node (e.g., based on the CSI resource configuration provided to the downstream JAB node). Accordingly, the downstream IAB node may transmit or otherwise provide a CSI report to the JAB node indicating the CSI information for the parent node. That is, the CSI for the parent node may be associated with CLI that is based on the number spatial layers associated with the parent IAB node. Accordingly, the JAB node may identify or otherwise determine the number of interference spatial layers associated with the parent IAB node, which may be equal to or less than the number of CSI-RS ports associated with the CSI-RS resource set.

Additionally, such techniques may be utilized in an upstream scenario within the IAB network. For example, the IAB node may transmit or otherwise provide an SRS measurement configuration to the parent IAB node. Broadly, the SRS measurement configuration may provide information to be used by the parent IAB node to measure CLI on a reference signal resource set (e.g., an SRS resource set) to be used by the downstream node for transmitting SRS. The SRS measurement configuration may also identify or otherwise indicate a number spatial layers of CLI associated with the downstream node (e.g., based on the usage information for the reference signal resources). That JAB node may also transmit or otherwise provide the SRS transmission configuration to the downstream node that carries or otherwise conveys information identifying the reference signal resource set to be used for transmitting SRS by the downstream node. The SRS transmission configuration may also carry or otherwise convey information identifying the usage information for the reference signal resources. The downstream IAB node a transmit SRS according to the SRS transmission configuration, which may be used by the IAB node to determine the channel status for the link between the IAB node in the downstream node. However, the parent IAB node may also receive an measure the SRS transmissions of the downstream IAB node. Again, this may provide an indication of CLI for the parent IAB node based on the channel status of the link between the IAB node and its downstream IAB node. Accordingly, the parent IAB node may also identify or otherwise determine the amount of interference (e.g., the channel status/CLI interference) and makes scheduling decisions for the IAB node and/or the downstream IAB node. The parent IAB node may transmit or otherwise provide an uplink resource configuration (e.g., a physical uplink control channel (PUCCH) and/or physical uplink shared channel (PUSCH) resource configuration) based on the parent IAB node measuring the CLI determine from the SRS transmissions of the downstream IAB node. Again, this may be based on the usage information (e.g., the number spatial layers of CLI associated with the downstream IAB node).

A method of wireless communication at a UE is described. The method may include receiving a configuration for transmitting a CLI feedback message, the configuration indicating at least one reference signal resource set to be monitored by the UE for CLI from an interfering device, the configuration also indicating usage information for the at least one reference signal resource set, determining, based on the usage information, a number of spatial layers of CLI associated with the interfering device, determining channel status information associated with the CLI based on the number of spatial layers, and transmitting the CLI feedback message indicating the channel status information.

An apparatus for wireless communication at a UE is described. The apparatus may include a processor, memory coupled with the processor, and instructions stored in the memory. The instructions may be executable by the processor to cause the apparatus to receive a configuration for transmitting a CLI feedback message, the configuration indicating at least one reference signal resource set to be monitored by the UE for CLI from an interfering device, the configuration also indicating usage information for the at least one reference signal resource set, determine, based on the usage information, a number of spatial layers of CLI associated with the interfering device, determine channel status information associated with the CLI based on the number of spatial layers, and transmit the CLI feedback message indicating the channel status information.

Another apparatus for wireless communication at a UE is described. The apparatus may include means for receiving a configuration for transmitting a CLI feedback message, the configuration indicating at least one reference signal resource set to be monitored by the UE for CLI from an interfering device, the configuration also indicating usage information for the at least one reference signal resource set, determining, based on the usage information, a number of spatial layers of CLI associated with the interfering device, determining channel status information associated with the CLI based on the number of spatial layers, and transmitting the CLI feedback message indicating the channel status information.

A non-transitory computer-readable medium storing code for wireless communication at a UE is described. The code may include instructions executable by a processor to receive a configuration for transmitting a CLI feedback message, the configuration indicating at least one reference signal resource set to be monitored by the UE for CLI from an interfering device, the configuration also indicating usage information for the at least one reference signal resource set, determine, based on the usage information, a number of spatial layers of CLI associated with the interfering device, determine channel status information associated with the CLI based on the number of spatial layers, and transmit the CLI feedback message indicating the channel status information.

In some examples of the method, apparatuses, and non-transitory computer-readable medium described herein, receiving the configuration may include operations, features, means, or instructions for receiving, with the configuration, an indication of a number of antenna ports of at least one reference signal resource of the at least one reference signal resource set.

Some examples of the method, apparatuses, and non-transitory computer-readable medium described herein may further include operations, features, means, or instructions for determining that the configuration indicates a reference signal resource in the at least one reference signal resource set, determining, based on the configuration, that the usage information for the reference signal resource includes a codebook-based usage, and determining, based on the codebook-based usage, that the number of spatial layers of CLI includes a number of antenna ports of a reference signal resource in the at least one reference signal resource set.

Some examples of the method, apparatuses, and non-transitory computer-readable medium described herein may further include operations, features, means, or instructions for determining that the configuration indicates a set of reference signal resources in the at least one reference signal resource set, selecting, based on a previously determined channel status information, a reference signal resource from the set of reference signal resources, determining, based on the configuration, that the usage information for the selected reference signal resource includes a codebook-based usage, and determining, based on the codebook-based usage, that the number of spatial layers of CLI includes a number of antenna ports of the reference signal resource.

In some examples of the method, apparatuses, and non-transitory computer-readable medium described herein, receiving the configuration may include operations, features, means, or instructions for receiving, with the configuration, an indication of the number of spatial layers of CLI associated with the interfering device.

Some examples of the method, apparatuses, and non-transitory computer-readable medium described herein may further include operations, features, means, or instructions for determining, based on the configuration, that the usage information for the at least one reference signal resource set includes a non-codebook-based usage and a number of reference signal resources in the at least one reference signal resource set, determining that the number of reference signal resources may be the same or less than the number of spatial layers of the uplink transmission from the interfering device, and determining, based on the number of reference signal resources being the same or less than the number of spatial layers and the non-codebook-based usage, that the number of spatial layers of CLI include the number of reference signal resources.

Some examples of the method, apparatuses, and non-transitory computer-readable medium described herein may further include operations, features, means, or instructions for determining, based on the configuration, that the usage information for the at least one reference signal resource set includes non-codebook-based usage and a number of reference signal resources in the at least one reference signal resource set, determining that the number of reference signal resources may be the greater than the number of spatial layers of the uplink transmission from the interfering device, and determining, based on the number of reference signal resources being greater than the number of spatial layers and the non-codebook-based usage, that the number of spatial layers of CLI include the number of spatial layers configured of the uplink transmission.

Some examples of the method, apparatuses, and non-transitory computer-readable medium described herein may further include operations, features, means, or instructions for identifying, based on a previous channel status information associated with each reference signal resource, a subset of reference signal resources of the at least one reference signal resource set, determining, based on the configuration, that the usage information for the at least one reference signal resource set includes non-codebook-based usage, and determining, based on the non-codebook-based usage and the number of spatial layers of CLI, the channel status information associated with the CLI for the subset of reference signal resources.

Some examples of the method, apparatuses, and non-transitory computer-readable medium described herein may further include operations, features, means, or instructions for identifying, based on a previous channel status information associated with each reference signal resource, a reference signal resource of the at least one reference signal resource set, determining, based on the configuration, that the usage information for the at least one reference signal resource set includes codebook-based usage, and determining, based on the codebook-based usage and the number of spatial layers of CLI, the channel status information associated with the CLI for the reference signal resource.

Some examples of the method, apparatuses, and non-transitory computer-readable medium described herein may further include operations, features, means, or instructions for determining, based on the configuration, that the usage information for the at least one reference signal resource set includes non-codebook-based usage, and transmitting, based on the non-codebook-based usage, the CLI feedback message indicating the channel status information for a subset of reference signal resources in the at least one reference signal resource set.

Some examples of the method, apparatuses, and non-transitory computer-readable medium described herein may further include operations, features, means, or instructions for determining, based on the configuration, that the usage information for the at least one reference signal resource set includes codebook-based usage, and transmitting, based on the codebook-based usage, the CLI feedback message indicating the channel status information for a reference signal resource in the at least one reference signal resource set.

In some examples of the method, apparatuses, and non-transitory computer-readable medium described herein, the CLI feedback message indicates a SRS resource indicator (SRI) associated with the CLI.

In some examples of the method, apparatuses, and non-transitory computer-readable medium described herein, the CLI feedback message indicates one SRI based on the usage information for the at least one reference signal resource set including a codebook-based usage.

In some examples of the method, apparatuses, and non-transitory computer-readable medium described herein, the CLI feedback message indicates a number of SRIs equal to the number of spatial layers of CLI associated with the interfering device based on the usage information for the at least one reference signal resource set including a non-codebook-based usage.

In some examples of the method, apparatuses, and non-transitory computer-readable medium described herein, the configuration may be received in at least one of a RRC message, or a medium access control (MAC) control element (CE), or a DCI, or a combination thereof.

In some examples of the method, apparatuses, and non-transitory computer-readable medium described herein, the channel status information may be based on the UE operating in a full-duplex communication with the interfering device.

A method of wireless communication at a base station is described. The method may include determining, for CLI measurement by a UE of CLI from an interfering device, at least one reference signal resource set and usage information for the at least one reference signal resource set, transmitting, to the UE, a configuration for transmitting a CLI feedback message, the configuration indicating the at least one reference signal resource set to be monitored by the UE for CLI from the interfering device, the configuration also indicating the usage information for the at least one reference signal resource set, and receiving, from the UE, the CLI feedback message indicating channel status information associated with the CLI, the channel status information being based on the usage information.

An apparatus for wireless communication at a base station is described. The apparatus may include a processor, memory coupled with the processor, and instructions stored in the memory. The instructions may be executable by the processor to cause the apparatus to determine, for CLI measurement by a UE of CLI from an interfering device, at least one reference signal resource set and usage information for the at least one reference signal resource set, transmit, to the UE, a configuration for transmitting a CLI feedback message, the configuration indicating the at least one reference signal resource set to be monitored by the UE for CLI from the interfering device, the configuration also indicating the usage information for the at least one reference signal resource set, and receive, from the UE, the CLI feedback message indicating channel status information associated with the CLI, the channel status information being based on the usage information.

Another apparatus for wireless communication at a base station is described. The apparatus may include means for determining, for CLI measurement by a UE of CLI from an interfering device, at least one reference signal resource set and usage information for the at least one reference signal resource set, transmitting, to the UE, a configuration for transmitting a CLI feedback message, the configuration indicating the at least one reference signal resource set to be monitored by the UE for CLI from the interfering device, the configuration also indicating the usage information for the at least one reference signal resource set, and receiving, from the UE, the CLI feedback message indicating channel status information associated with the CLI, the channel status information being based on the usage information.

A non-transitory computer-readable medium storing code for wireless communication at a base station is described. The code may include instructions executable by a processor to determine, for CLI measurement by a UE of CLI from an interfering device, at least one reference signal resource set and usage information for the at least one reference signal resource set, transmit, to the UE, a configuration for transmitting a CLI feedback message, the configuration indicating the at least one reference signal resource set to be monitored by the UE for CLI from the interfering device, the configuration also indicating the usage information for the at least one reference signal resource set, and receive, from the UE, the CLI feedback message indicating channel status information associated with the CLI, the channel status information being based on the usage information.

Some examples of the method, apparatuses, and non-transitory computer-readable medium described herein may further include operations, features, means, or instructions for determining that the usage information for the at least one reference signal resource set includes non-codebook-based usage, and including an indication of a number of spatial layers in the configuration.

Some examples of the method, apparatuses, and non-transitory computer-readable medium described herein may further include operations, features, means, or instructions for determining that the usage information for the at least one reference signal resource set includes codebook-based usage, and including an indication of a number of antenna ports of at least one reference signal resource of the at least one reference signal resource set in the configuration.

Some examples of the method, apparatuses, and non-transitory computer-readable medium described herein may further include operations, features, means, or instructions for determining that there may be a set of interfering devices associated with the UE, each interfering device associated with a corresponding set of reference signal resources having a same usage information, and combining, based on the same usage information, the corresponding set of reference signal resources for each interfering device into the indication of the at least one reference signal resources set.

Some examples of the method, apparatuses, and non-transitory computer-readable medium described herein may further include operations, features, means, or instructions for identifying, based on a SRI and associated CLI level indicated in the CLI message, an interference level associated with at least one interfering device of the set of interfering devices.

In some examples of the method, apparatuses, and non-transitory computer-readable medium described herein, the configuration indicates that the usage information for the at least one reference signal resource set may include operations, features, means, or instructions for receiving, based on the non-codebook-based usage, the CLI feedback message indicating the channel status information for a subset of reference signal resources in the at least one reference signal resource set.

In some examples of the method, apparatuses, and non-transitory computer-readable medium described herein, the configuration indicates that the usage information for the at least one reference signal resource set may include operations, features, means, or instructions for receiving, based on the codebook-based usage, the CLI feedback message indicating the channel status information for a reference signal resource in the at least one reference signal resource set.

In some examples of the method, apparatuses, and non-transitory computer-readable medium described herein, the configuration may be transmitted in at least one of a RRC message, or a MAC CE, or a DCI, or a combination thereof.

In some examples of the method, apparatuses, and non-transitory computer-readable medium described herein, the channel status information may be based on the UE operating in a full-duplex communication with the interfering device.

A method for wireless communication at an IAB node is described. The method may include receiving, from a parent IAB node, a CSI report configuration for generation of a CSI report associated with monitoring, by the IAB node, at least one CSI reference signal resource set, the configuration also indicating usage information for the at least one CSI reference signal resource set, transmitting a CSI resource configuration to a downstream node, the CSI resource configuration indicating, based on the usage information, a number of spatial layers of CLI associated with the parent IAB node, and receiving, from the downstream node, the CSI report indicating CSI, the CSI associated with the CLI based on the number of spatial layers.

An apparatus for wireless communication at an IAB node is described. The apparatus may include a processor, memory coupled with the processor, and instructions stored in the memory. The instructions may be executable by the processor to cause the apparatus to receive, from a parent IAB node, a CSI report configuration for generation of a CSI report associated with monitoring, by the IAB node, at least one CSI reference signal resource set, the configuration also indicating usage information for the at least one CSI reference signal resource set, transmit a CSI resource configuration to a downstream node, the CSI resource configuration indicating, based on the usage information, a number of spatial layers of CLI associated with the parent IAB node, and receive, from the downstream node, the CSI report indicating CSI, the CSI associated with the CLI based on the number of spatial layers.

Another apparatus for wireless communication at an IAB node is described. The apparatus may include means for receiving, from a parent IAB node, a CSI report configuration for generation of a CSI report associated with monitoring, by the IAB node, at least one CSI reference signal resource set, the configuration also indicating usage information for the at least one CSI reference signal resource set, means for transmitting a CSI resource configuration to a downstream node, the CSI resource configuration indicating, based on the usage information, a number of spatial layers of CLI associated with the parent IAB node, and means for receiving, from the downstream node, the CSI report indicating CSI, the CSI associated with the CLI based on the number of spatial layers.

A non-transitory computer-readable medium storing code for wireless communication at an IAB node is described. The code may include instructions executable by a processor to receive, from a parent IAB node, a CSI report configuration for generation of a CSI report associated with monitoring, by the IAB node, at least one CSI reference signal resource set, the configuration also indicating usage information for the at least one CSI reference signal resource set, transmit a CSI resource configuration to a downstream node, the CSI resource configuration indicating, based on the usage information, a number of spatial layers of CLI associated with the parent IAB node, and receive, from the downstream node, the CSI report indicating CSI, the CSI associated with the CLI based on the number of spatial layers.

Some examples of the method, apparatuses, and non-transitory computer-readable medium described herein may further include operations, features, means, or instructions for identifying, based on the CSI report, a number of interference spatial layers, the number of interference spatial layers being equal to or less than a number of CSI reference signal ports associated with the at least one CSI reference signal resource set.

Some examples of the method, apparatuses, and non-transitory computer-readable medium described herein may further include operations, features, means, or instructions for identifying, based on the CSI report, a precoding matrix indicator associated with a number of interference spatial layers.

Some examples of the method, apparatuses, and non-transitory computer-readable medium described herein may further include operations, features, means, or instructions for transmitting, to the parent IAB node and according to the CSI report configuration, a second CSI report indicating CSI obtained based on monitoring the at least one CSI reference signal resource set, the second CSI report indicating the CSI report received from the downstream node.

In some examples of the method, apparatuses, and non-transitory computer-readable medium described herein, the configuration may be received in at least one of a radio resource control (RRC) message, or a MAC CE, or a DCI, or a combination thereof.

In some examples of the method, apparatuses, and non-transitory computer-readable medium described herein, the CSI may be based on the IAB node operating in a full-duplex communication with the downstream node.

In some examples of the method, apparatuses, and non-transitory computer-readable medium described herein, the downstream node includes a downstream IAB node or a UE.

A method for wireless communication at an IAB node is described. The method may include transmitting, to a parent IAB node, a SRS measurement configuration for measuring, by the parent IAB node, CLI on at least one reference signal resource set to be used by a downstream node in transmitting SRSs, the configuration also indicating, based on usage information for the at least one reference signal resource set, a number of spatial layers of CLI associated with the downstream node, transmitting, to the downstream node, a SRS transmission configuration indicating the at least one reference signal resource set to be used in transmitting the SRSs, the configuration indicating the usage information for the at least one reference signal resource set, and receiving, from the parent IAB node, an uplink resource configuration that is based on the measuring of the CLI determined from the SRSs and based on the number of spatial layers.

An apparatus for wireless communication at an IAB node is described. The apparatus may include a processor, memory coupled with the processor, and instructions stored in the memory. The instructions may be executable by the processor to cause the apparatus to transmit, to a parent IAB node, a SRS measurement configuration for measuring, by the parent IAB node, CLI on at least one reference signal resource set to be used by a downstream node in transmitting SRSs, the configuration also indicating, based on usage information for the at least one reference signal resource set, a number of spatial layers of CLI associated with the downstream node, transmit, to the downstream node, a SRS transmission configuration indicating the at least one reference signal resource set to be used in transmitting the SRSs, the configuration indicating the usage information for the at least one reference signal resource set, and receive, from the parent IAB node, an uplink resource configuration that is based on the measuring of the CLI determined from the SRSs and based on the number of spatial layers.

Another apparatus for wireless communication at an IAB node is described. The apparatus may include means for transmitting, to a parent IAB node, a SRS measurement configuration for measuring, by the parent IAB node, CLI on at least one reference signal resource set to be used by a downstream node in transmitting SRSs, the configuration also indicating, based on usage information for the at least one reference signal resource set, a number of spatial layers of CLI associated with the downstream node, means for transmitting, to the downstream node, a SRS transmission configuration indicating the at least one reference signal resource set to be used in transmitting the SRSs, the configuration indicating the usage information for the at least one reference signal resource set, and means for receiving, from the parent IAB node, an uplink resource configuration that is based on the measuring of the CLI determined from the SRSs and based on the number of spatial layers.

A non-transitory computer-readable medium storing code for wireless communication at an IAB node is described. The code may include instructions executable by a processor to transmit, to a parent IAB node, a SRS measurement configuration for measuring, by the parent IAB node, CLI on at least one reference signal resource set to be used by a downstream node in transmitting SRSs, the configuration also indicating, based on usage information for the at least one reference signal resource set, a number of spatial layers of CLI associated with the downstream node, transmit, to the downstream node, a SRS transmission configuration indicating the at least one reference signal resource set to be used in transmitting the SRSs, the configuration indicating the usage information for the at least one reference signal resource set, and receive, from the parent IAB node, an uplink resource configuration that is based on the measuring of the CLI determined from the SRSs and based on the number of spatial layers.

In some examples of the method, apparatuses, and non-transitory computer-readable medium described herein, the SRS measurement configuration may be transmitted in at least one of an RRC message, or a MAC CE, or a DCI, or a combination thereof.

In some examples of the method, apparatuses, and non-transitory computer-readable medium described herein, the CSI may be based on the IAB node operating in a full-duplex communication with the downstream node.

BRIEF DESCRIPTION OF THE DRAWINGS

FIGS. 15 through 21 show flowcharts illustrating methods that support channel status report based on sounding reference signal resource usage in full duplex in accordance with aspects of the present disclosure.

DETAILED DESCRIPTION

Figure 1:
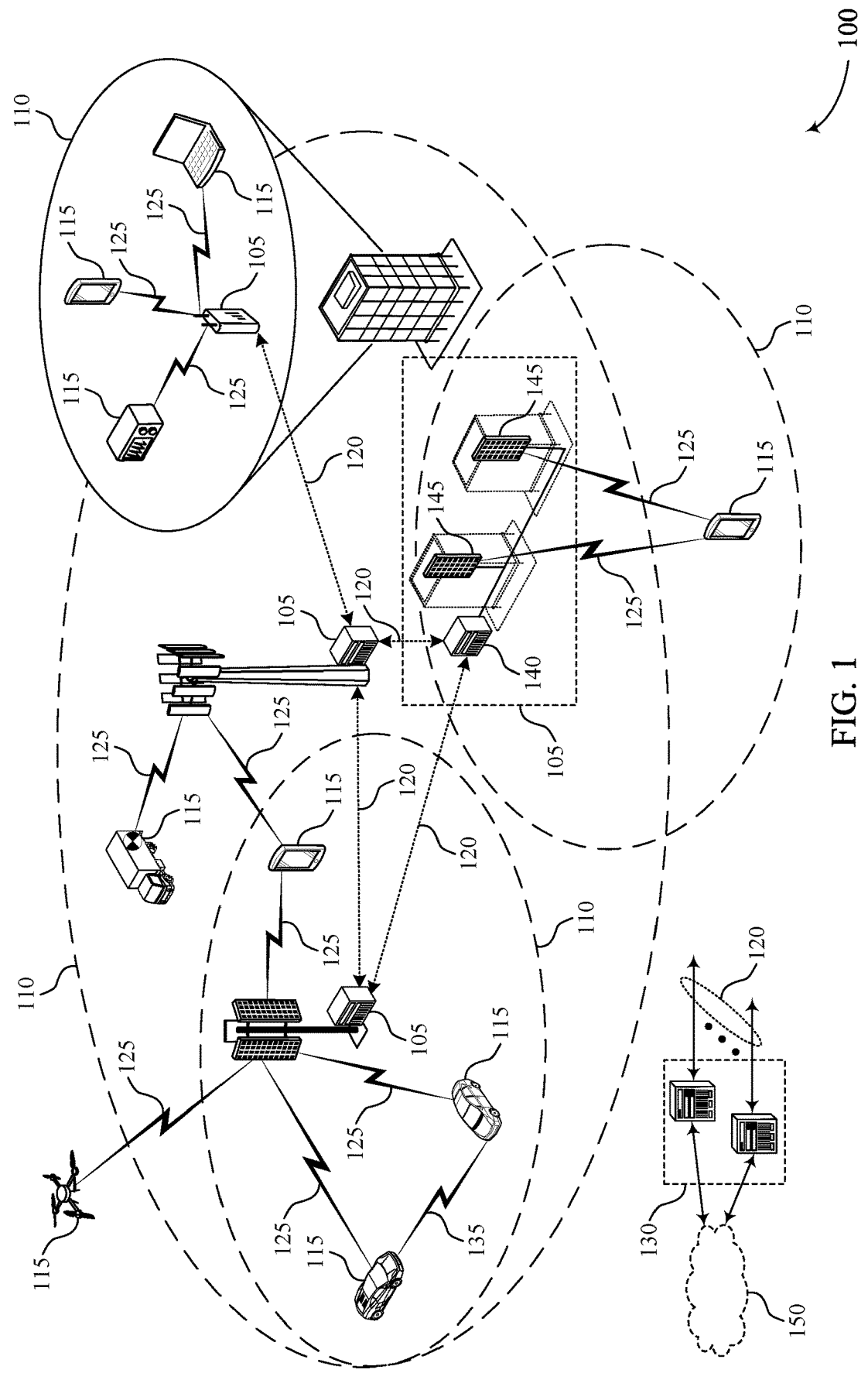
FIG. 1 illustrates an example of a system for wireless communications that supports channel status report based on sounding reference signal resource usage in full duplex in accordance with aspects of the present disclosure.

Cross-link interference (CLI), which may include user equipment (UE)-to-UE interference, may use sounding reference signal (SRS) transmissions from an interfering device (e.g., an aggressor UE) that a victim UE (e.g., the UE being interfered with) uses for channel state information (CSI) measurement and reporting. For example, the victim UE may receive an indication of the SRS resource set being used by the interfering device and use this information to measure SRS transmissions from the interfering device. The results of this measurement are provided to a base station in a feedback message. However, because these UEs are often associated with different cells, backhaul data exchange rates may not support or otherwise comply with various latency/ reliability requirements associated with some wireless communications. Moreover, such techniques typically do not support the victim UE being configured with the usage information for the SRS resource set(s) of the interfering device, which may limit the completeness/accuracy of the CSI reporting. Accordingly, such techniques may be limited to long-term interference management.

Aspects of the disclosure are initially described in the context of wireless communications systems. Generally, the described techniques provide for a base station to send a CSI report configuration message to a UE (e.g., a victim UE experiencing CLI from an aggressor device). The message may carry or otherwise indicate at least one SRS resource set (e.g., where the aggressor device transmits its SRS(s)) and the usage information of the SRS resource set(s), e.g., beam management information, codebook vs. non-codebook, antenna switching information, etc. If the usage information for the SRS resource set is non-codebook usage, the base station may indicate the number of spatial layers of the aggressor device. The UE, which may operate in a full duplex communication mode, determines the number of spatial layers of the CLI based on the indicated SRS resource set(s) and corresponding usage information. For example, if the usage of the SRS resource set(s) is non-codebook, the number of spatial layers may be equal to the indicated number of physical uplink shared channel (PUSCH) spatial layers. As another example, if the usage of the SRS resource set(s) is codebook, the number of spatial layers may be equal to the number of antenna port(s) of an SRS resource in the SRS resource set. Accordingly, the UE may determine and report its CSI values for full duplex mode (e.g., in a CLI feedback message) communications in accordance with the determined number of spatial layers.

In some aspects of the described techniques, such channel status reporting may be adopted within an integrated access and backhaul (IAB) network. The IAB network may include an anchor node having a connection to a core network, one or more IAB nodes forming the links within the IAB network, and one or more UE associated with at least a portion of the IAB nodes. Broadly, the IAB network provides a backhaul connection for the UE to the core network via one or more intermediate IAB nodes to the anchor IAB node. In some aspects, each IAB node may include a distributed unit (DU) function that manages various aspects of the wireless backhaul links between the IAB node and a parent IAB node (which may simply be an upstream IAB node or may be the anchor IAB node) and between the IAB node and a downstream IAB node (which may be referred to as a child IAB node). Additionally, each IAB node may also include a mobile terminal (MT) function that manages various aspects of the wireless access links between the IAB node and one or more associated UE (which may also be considered a downstream node in this context).

For example, a parent IAB node may transmit or otherwise convey a CSI report configuration to an IAB node (e.g., a node within the IAB network between the parent IAB node in the downstream IAB node). Broadly, the CSI report configuration may generally carry or otherwise convey information identifying how the IAB node is to generate a CSI report based on monitoring CSI-reference signal (CSI-RS) transmissions from the parent IAB node. In some aspects, the CSI report configuration may also carry or otherwise convey usage information for a CSI-RS resource set (e.g., information identifying the usage of the CSI-RS transmissions). Based on the CSI report configuration, that IAB node may transmit or otherwise provide a CSI resource configuration to a downstream node (which may simply be a downstream IAB node served by the DU function or may be a UE served by the MT function). The parent IAB node may transmit CSI-RS according to the CSI-RS resource set, which the IAB node may monitor to determine CSI for the parent IAB node. However, the downstream IAB node may also receive the CSI-RS transmissions from the parent IAB node (which may be CLI from the perspective of the downstream node) and determine CSI information (e.g., CLI information) for the parent IAB node (e.g., based on the CSI resource configuration provided to the downstream JAB node). Accordingly, the downstream IAB node may transmit or otherwise provide a CSI report to the JAB node indicating the CSI information for the parent node. That is, the CSI for the parent node may be associated with CLI that is based on the number spatial layers associated with the parent IAB node. Accordingly, the JAB node may identify or otherwise determine the number of interference spatial layers associated with the parent IAB node, which may be equal to or less than the number of CSI-RS ports associated with the CSI-RS resource set.

Additionally, such techniques may be utilized in an upstream scenario within the IAB network. For example, the IAB node may transmit or otherwise provide an SRS measurement configuration to the parent IAB node. Broadly, the SRS measurement configuration may provide information to be used by the parent IAB node to measure CLI on a reference signal resource set (e.g., an SRS resource set) to be used by the downstream node for transmitting SRS. The SRS measurement configuration may also identify or otherwise indicate a number spatial layers of CLI associated with the downstream node (e.g., based on the usage information for the reference signal resources). That JAB node may also transmit or otherwise provide the SRS transmission configuration to the downstream node that carries or otherwise conveys information identifying the reference signal resource set to be used for transmitting SRS by the downstream node. The SRS transmission configuration may also carry or otherwise convey information identifying the usage information for the reference signal resources. The downstream JAB node a transmit SRS according to the SRS transmission configuration, which may be used by the JAB node to determine the channel status for the link between the JAB node in the downstream node. However, the parent IAB node may also receive an measure the SRS transmissions of the downstream IAB node. Again, this may provide an indication of CLI for the parent IAB node based on the channel status of the link between the IAB node and its downstream IAB node. Accordingly, the parent IAB node may also identify or otherwise determine the amount of interference (e.g., the channel status/CLI interference) and makes scheduling decisions for the JAB node and/or the downstream JAB node. The parent IAB node may transmit or otherwise provide an uplink resource configuration (e.g., a physical uplink control channel (PUCCH) and/or PUSCH resource configuration) based on the parent IAB node measuring the CLI determine from the SRS transmissions of the downstream IAB node. Again, this may be based on the usage information (e.g., the number spatial layers of CLI associated with the downstream IAB node).

Aspects of the disclosure are further illustrated by and described with reference to apparatus diagrams, system diagrams, and flowcharts that relate to channel status report based on sounding reference signal resource usage in full duplex.

FIG. 1 illustrates an example of a wireless communications system 100 that supports channel status report based on sounding reference signal resource usage in full duplex in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a configuration for transmitting a CLI feedback message, the configuration indicating at least one reference signal resource set to be monitored by the UE 115 for CLI from an interfering device, the configuration also indicating usage information for the at least one reference signal resource set. The UE 115 may determine, based at least in part on the usage information, a number of spatial layers of CLI associated with the interfering device. The UE 115 may determine channel status information associated with the CLI based at least in part on the number of spatial layers. The UE 115 may transmit the CLI feedback message indicating the channel status information.

A base station 105 may determine, for CLI measurement by a UE 115 of CLI from an interfering device, at least one reference signal resource set and usage information for the at least one reference signal resource set. The base station 105 may transmit, to the UE 115, a configuration for transmitting a CLI feedback message, the configuration indicating the at least one reference signal resource set to be monitored by the UE 115 for CLI from the interfering device, the configuration also indicating the usage information for the at least one reference signal resource set. The base station 105 may receive, from the UE 115, the CLI feedback message indicating channel status information associated with the CLI, the channel status information being based on the usage information.

An IAB node (e.g., a base station 105 and/or UE 115 within an IAB network) may receive, from a parent IAB node, a CSI report configuration for generation of a CSI report associated with monitoring, by the IAB node, at least one CSI-RS resource set, the configuration also indicating usage information for the at least one CSI-RS resource set. The IAB node may transmit a CSI resource configuration to a downstream node, the CSI resource configuration indicating, based at least in part on the usage information, a number of spatial layers of CLI associated with the parent IAB node. The IAB node may receive, from the downstream node, the CSI report indicating channel status information, the CSI associated with the CLI based at least in part on the number of spatial layers.

Figure 2:
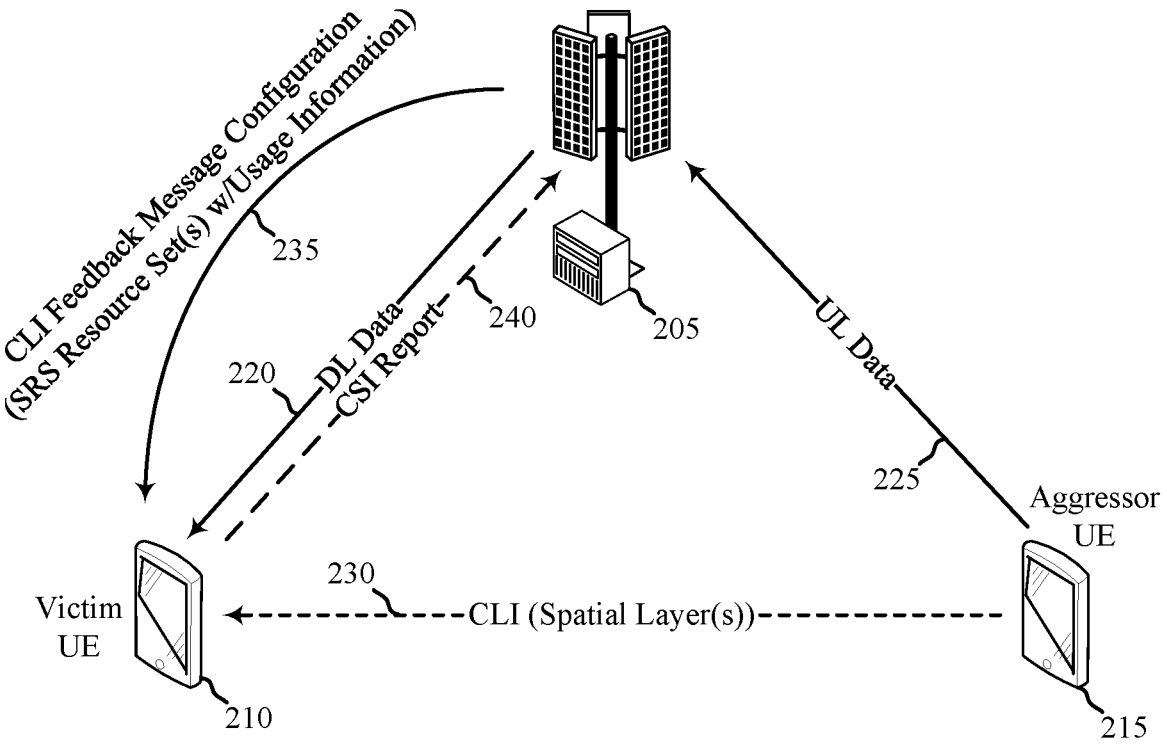
FIG. 2 illustrates an example of a wireless communication system that supports channel status report based on sounding reference signal resource usage in full duplex in accordance with aspects of the present disclosure.

An IAB node (e.g., a base station 105 and/or UE 115 within an IAB network) may transmit, to a parent IAB node, a SRS measurement configuration for measuring, by the parent IAB node, CLI on at least one reference signal resource set to be used by a downstream node in transmitting SRSs, the configuration also indicating, based at least in part on usage information for the at least one reference signal resource set, a number of spatial layers of CLI associated with the downstream node. The IAB node may transmit, to the downstream node, a SRS transmission configuration indicating the at least one reference signal resource set to be used in transmitting the SRSs, the configuration indicating the usage information for the at least one reference signal resource set. The IAB node may receive, from the parent JAB node, an uplink resource configuration that is based at least in part on the measuring of the CLI determined from the SRSs and based at least in part on the number of spatial layers FIG. 2 illustrates an example of a wireless communication system 200 that supports channel status report based on sounding reference signal resource usage in full duplex in accordance with aspects of the present disclosure. In some examples, wireless communication system 200 may implement aspects of wireless communication system 100. Wireless communication system 200 may include base station 205, UE 210, and UE 215, which may be examples of the corresponding devices described herein. In some aspects, UE 210 may be a victim UE (e.g., a downlink UE) and UE 215 may be an aggressor UE (e.g., an uplink UE). Although UE 215 is generally described as being an aggressor UE, interfering device, etc., it is to be understood that the interference may come from a different device.

In some aspects, wireless communication system 200 may support or otherwise be configured for full duplex communications. For example, 5G wireless networks (such as wireless communication system 200) may provide ultra-high data rate communications that support a wide scope of application scenarios. Wireless full duplex (FD) communications is an emerging technique and may double the link capacity. This may include enabling radio network nodes to transmit and receive simultaneously at the same time-frequency resource (or only the same time resource, e.g., in a FDM manner). A full duplex network node, such as base station 205 in the cellular network, can communicate simultaneously in the uplink (UL) and downlink (DL) with two half-duplex terminals (e.g., UEs 210 and 215) using the same radio resources. Another typical wireless full duplex application scenario is in a wireless backhaul network, such as an integrated access and backhaul (IAB) network. In the IAB network, one relay node (e.g. IAB node) can communicate simultaneously with the anchor node (e.g., upstream using a backhaul link) and the mobile terminal (e.g., downstream using an access link) in a one-hop scenario, or with the other two relay nodes in a multi-hop scenario (e.g., upstream and downstream using access links in the multi-hop scenario). By doubling each single-link capacity, full duplexing can significantly increase the system throughput in diverse applications in wireless communication networks, and also reduce the transfer latency for time critical services.

Wireless communication system 200 illustrates an example of a cellular system using full duplex communications. A full-duplex network node, such as base station 205 in the cellular network, can communicate simultaneously in the uplink and downlink with two UEs (e.g., UE 210 and UE 215) using the same radio resources. With full duplexing technique, the downlink of one UE (e.g., UE 210) and the uplink of the other UE (e.g., UE 215) can coexist at the same radio spectrum simultaneously in a cell. In the uplink, UE 215 transmits signal to base station 205 via link 225. In the downlink, UE 210 receives signals from base station 205 via link 220. In full duplex, the UE that transmits uplink signals (e.g., UE 215) would generate inter-UE interference (e.g., CLI 230) to the UE that receives downlink signals (e.g., UE 210).

In an example of an IAB wireless network, one IAB node can be regarded as a relay node (e.g., UE 215 in this example) through which the data can be transmitted from an IAB donor (e.g., base station 205, or some other anchor node) to UE 210 (in this IAB example) or from UE 210 to the IAB donor. In full duplex techniques, the IAB node (e.g., UE 215 in this example) can receive the data from the IAB donor (e.g., base station 205 in this example) and transmit the data to UE 210, or the IAB node (e.g., UE 215 in this example) can receive the data from UE 210 and transmit the data to the IAB donor by using the same time-frequency radio resource. Similar to a Uu interface, at the IAB node (e.g., UE 210 in this example), the interference from the backhaul link to the access link (e.g., from the IAB donor to UE 210 in this example) or the interference from the access link to the backhaul link (from UE 210 to the IAB donor) may cause data reception performance deterioration. It should be noted that UE 210 can be another IAB node. In such cases, the link between the IAB donor (e.g., base station 205) and the IAB node (e.g., UE 215) is called a parent link, while the link between the IAB node (e.g., UE 215) and the another IAB node (e.g., UE 210) is called a child link. So the parent link and the child link may interfere with each other.

In a cell activating full duplex communications, the downlink UE (e.g., UE 210) may suffer from co-channel interference (e.g., CLI 230) from the paired uplink UE (e.g., UE 215). The interference strength depends on the distance between these two UEs, and also depends on the uplink transmit beamforming implemented by the uplink UE (e.g., UE 215). If the downlink UE has more than one receive antenna and performs coherent antenna reception, the interference strength also depends on the spatial direction of the interference signal (e.g., CLI 230).

CLI handling provides an approach where a UE in one cell (e.g., UE 210) may measure the interference from the UE(s) in other cells (e.g., UE 215). A set of SRS resources are configured to both the victim UE (e.g., UE 210) and the aggressor UE (e.g., UE 215) by the network (e.g., via base station 205), due to the favorable multiplexing capability of SRS transmissions. In these SRS resources, the victim UE may be configured to measure the strength of the SRS transmission sent by the aggressor UE(s) in the neighboring cells. Because these two UEs are located in two different cells, considering backhaul data rate and latency restriction, the victim UE may only report the layer-3 measurement results, i.e. the values of SRS-reference signal receive power (RSRP), CLI-reference signal strength indicator (RSSI), etc., which are generated based on the results of long-term measurements (e.g., measurements spanning a duration of tens or even hundreds of slots).

To enable such inter-cell SRS measurement, the information about the SRS configuration needs to be transferred via backhaul between the base stations of the victim cell and the aggressor cell. Due to the restrictions on backhaul transfer latency, such information transfer may only take a static or semi-static mode, thus correspondingly, the SRS measurements can only be configured in a static or semi-static pattern. Accordingly, such CLI techniques may only be used for long-term interference management, e.g. allocating non-overlapping radio resources to aggressor UE and victim UE, which is limited by system capacity compared with radio resource reuse.

According to such techniques, base station 205 would send a SRS configuration message to UE 215 for SRS transmissions, which contain the configuration of a number of SRS resource sets. Each SRS resource set contains a number of SRS resources, all of which have the same parameter "usage" (e.g., usage information). Examples of usage information include, but are not limited to, beam management (e.g., beamManagement), codebook, non-codebook (e.g., nonCodebook), antenna switching (e.g., antennaSwitching). Beam management generally indicates that the resource set is for beam management of uplink beamforming (e.g., UE 215 transmits SRS in multiple SRS resources of this SRS resource set, each with a respective uplink beam direction. Codebook generally indicates that the SRS resource set is for uplink channel estimation of precoded SRS. UE 215 can be configured with multiple SRS resources in this SRS resource set, each of which has 1, 2 or 4 antenna ports. UE 215 can transmit the SRS transmission which is precoded at the antenna ports with certain precoding weights at one SRS resource. Non-codebook generally indicates that the SRS resource set is for uplink channel estimation of non-precoded SRS. UE 215 can be configured with multiple (e.g., the same number as the antenna ports) SRS resources in this SRS resource set, at each of which UE transmits using one antenna port. Antenna switching generally indicates that the resource set is for uplink channel estimation when the transmit antennas are less than receive antennas (e.g., UE 215 transmits SRS from a respective transmit antenna port in turn at different locations of the configured radio resource).

However, this approach may give rise to various problems with respect to CLI handling. As discussed above, base station 205 may indicate for the downlink UE (e.g., IE 210 or the victim UE) operating in full duplex mode to measure inter-UE interference (e.g., CLI 230) based on SRS reception, and then the downlink UE adds an SRS resource indicator (SRI) in its CSI report 240 to indicate the selection of the matched uplink UE (e.g., UE 215 or the aggressor UE) and its beam. By doing so, base station 205 can schedule the suitable downlink UE (e.g., UE 210 or the victim UE) and the uplink UE (e.g., UE 215 or the aggressor UE) and determine their transport formats (transmission beams, MIMO schemes, MCS values, etc.). However, such techniques do not differentiate the cases that the SRS resource set of the uplink UE has different usages (e.g., different usage information). That is, such techniques may configured UE 210 with the SRS resource set(s) of UE 215, but do not indicate the usage information for such SRS resource set(s). Different usages correspond to different beamforming operations of the PUSCH of uplink UE (e.g., UE 215) associated with this SRS resource set. If uplink UE is requested to transmit a periodic, semi-persistent (e.g. by RRC signaling, MAC CE) or an aperiodic SRS (e.g., by DCI format 0-1, 0-2, 1-1, 1-2) and if the usage information of the triggered SRS resource set is non-codebook, the uplink UE transmits SRS at some or all SRS resources of this SRS resource set. Then, the following non-codebook based PUSCH use the beam directions from min(L_max, N_SRS) SRS resources of this SRS resource set, where L_max is the maximum number of spatial layers of PUSCH and N_SRS is the number of SRS resources in this SRS resource set. If the usage of the triggered SRS resource set is codebook, the uplink UE transmits its SRS at some or all SRS resources of this SRS resource set. Then, the following codebook based PUSCH uses the beam direction from one SRS resource of this SRS resource set.

In an example of another problem surrounding such techniques, the downlink UE (e.g., UE 210) operating in full duplex mode cannot know how many SRS resources the inter-UE interference (e.g., CLI 230) comes from. Without this information, the downlink UE cannot select a proper matched uplink UE and cannot determine an accurate CSI based on the inter-UE interference hypothesis. For example, if the downlink UE reports a CSI with an excessively large number of associated SRS resources, base station 205 may schedule too small MCS value of the PDSCH based on this CSI report and, therefore, the downlink spectrum efficiency may be reduced. As another example, if the downlink UE reports a CSI with an excessively small number of associated SRS resources, base station 205 may schedule a too large MCS value of the PDSCH based on this CSI report and, therefore, the actual inter-UE interference at the PDSCH may cause PDSCH decoding errors.

Accordingly, aspects of the described techniques may include base station 205 indicating, to UE 210, the usage information for the SRS resource set(s) of UE 215 to support CLI handling. For example, base station 205 may transmit or otherwise convey a configuration 235 to UE 210 for transmitting a CLI feedback message. The configuration 235 may identify or otherwise indicate reference signal resource set(s) (e.g., SRS resource set(s)) for UE 210 to monitor for CLI 230 from an interfering device (e.g., UE 215 in this example). The configuration 235 may also identify or otherwise indicate the usage information for the reference signal resource set(s) (e.g., the usage information for the SRS resource set(s) configured for UE 215).

Accordingly, base station 205 sends a CSI report configuration message (e.g., configuration 235) to UE 210 (e.g., the victim UE in this example), indicating at least one SRS resource set where a UE 215 (e.g., an aggressor UE or interfering device in this example) transmits SRS, and the usage of this SRS resource set(s). If the usage of this indicated SRS resource set is non-codebook, base station 205 may also indicate the number of PUSCH spatial layers of UE 215. This message (e.g., configuration 235) may be transferred by layer-3 (e.g., an RRC layer) message, by a MAC CE, a DCI, or any combination.

In some aspects, because the number of antenna ports of an SRS resource may be statically configured by RRC signaling, the number of PUSCH spatial layers of the inter-UE interference (e.g., the number of spatial layers of CLI 230) may be a static value for an SRS resource whose usage information corresponds to codebook. Accordingly, base station 205 may indicate the number of antenna ports of this SRS resource to UE 210 by RRC signaling or by MAC CE, e.g., in the configuration 235 message of periodic or semi-periodic CSI report configuration. That is, UE 210 may receive, with the configuration 235, an indication of the number of antenna ports of at least one reference signal resource (e.g., SRS resource) in the reference signal resource set(s) (e.g., in the SRS resource set(s)).

In some aspects, because the number of spatial layers of UE 215 PUSCH may be dynamically configured by DCI, the number of spatial layers of the inter-UE interference (e.g., CLI 230) may be a dynamic value for an SRS resource set whose usage is non-codebook. Accordingly, base station 205 may indicate the number of spatial layers of UE 215 PUSCH to UE 210 by DCI, e.g., in the configuration 230 message of aperiodic CSI report configuration. That is, UE 210 may receive, with configuration 235, an indication of the number of spatial layers of CLI 230 associated with interfering device (e.g., UE 215).

Based on the usage information indicated in configuration 235, UE 210 may identify or otherwise determine the number of spatial layers of CLI 230 associated with the interfering device (e.g., UE 215 in this example). UE 210 may determine the channel status information (e.g., CSI) of CLI 230 based, at least in some aspects, on the number of spatial layers of CLI 230.

In some aspects, UE 210 may determine the number of spatial layers of the inter-UE interference (e.g., CLI 230) while operating in a full duplex mode, e.g., based at least in part on the indicated usage of the SRS resource set(s). If the usage of this SRS resource set is non-codebook, the number of spatial layers of the inter-UE interference (e.g., the number of spatial layers of CLI 230) may be equal to the indicated (e.g., in the configuration 235) number of PUSCH spatial layers. If the usage of this SRS resource set is codebook, the number of spatial layers of the inter-UE interference (e.g., the number of spatial layers of CLI 230) may be equal to the number of antenna ports of a SRS resource in this SRS resource set. If a SRS resource indicator (SRI) is associated with the CSI value, the number of spatial layers of the inter-UE interference may be equal to the number of antenna ports of the SRS resource corresponding to that SRI.

That is, based on the CSI report configuration message (e.g., configuration 235), UE 210 may determine the number of spatial layers of inter-UE interference (e.g., CLI 230) in full duplex mode. If base station 205 indicates a SRS resource whose usage is codebook as the hypothetical interference and also indicates the number of its antenna ports, UE 210 uses this number of antenna ports as the number of spatial layers of inter-UE interference in full duplex mode. Accordingly, UE 210 may determine that the configuration 235 indicates a reference signal resource in the at least one reference signal resource set. UE 210 may determine, based at least in part on the configuration 235, that the usage information for the reference signal resource is a codebook-based usage. Accordingly, UE 210 may determine, based at least in part on the codebook-based usage, that the number of spatial layers of CLI is the number of antenna ports of the reference signal resource in the at least one reference signal resource set.

If base station 205 indicates multiple SRS resources whose usage are codebook as the hypothetical interferences and also indicates the numbers of their antenna ports, UE 210 selects a SRS resource (e.g., an SRS resource with the smallest interference strengths) as the paired uplink transmission in full duplex mode. Then, UE 210 determines the number of antenna ports of this SRS resource as the number of spatial layers of inter-UE interference (e.g., CLI 230) in full duplex mode. Accordingly, UE 210 may determine that the configuration 235 indicates a plurality of reference signal resources in the at least one reference signal resource set. UE 210 may select, based at least in part on a previously determined channel status information, a reference signal resource from the plurality of reference signal resources. UE 210 may determine, based at least in part on the configuration 235, that the usage information for the selected reference signal resource is a codebook-based usage. UE 210 may determine, based at least in part on the codebook-based usage, that the number of spatial layers of CLI is the number of antenna ports of the reference signal resource.

If base station 205 indicates one or multiple SRS resources whose usage are non-codebook as the hypothetical interferences and the number of these SRS resources is not larger than the indicated number of spatial layers of UE 215 PUSCH, UE 210 determines the number of these SRS resources as the number of spatial layers of inter-UE inter-ference (e.g., CLI 230) in full duplex mode. As discussed, this may include base station 205 indicating the number of spatial layers in configuration 235. Accordingly, UE 210 may determine, based at least in part on the configuration 235, that the usage information for the at least one reference signal resource set is a non-codebook-based usage and a number of reference signal resources in the at least one reference signal resource set. UE 210 may determine that the number of reference signal resources is the same or less (e.g., not larger) than the number of spatial layers of the uplink transmission from the interfering device (e.g., PUSCH of UE 215). UE 210 may determine, based at least in part on the number of reference signal resources being the same or less than the number of spatial layers and the non-codebook-based usage, that the number of spatial layers of CLI 230 is the number of reference signal resources.

If base station 205 indicates one or multiple SRS resources whose usage are non-codebook as the hypothetical interference and the number of these SRS resources is larger than the indicated number of spatial layers of UE 215 PUSCH, UE 210 determines the number of spatial layers of UE 215 PUSCH as the number of spatial layers of inter-UE interference (e.g., CLI 230) in full duplex mode. As dis-cussed, this may include base station 205 indicating the number of spatial layers in configuration 235. Accordingly, UE 210 may determine, based at least in part on the configuration 235, that the usage information for the at least one reference signal resource set is non-codebook-based usage and a number of reference signal resources in the at least one reference signal resource set. UE 210 may deter-mine that the number of reference signal resources is the greater than the number of spatial layers of the uplink transmission from the interfering device. UE 210 may determine, based at least in part on the number of reference signal resources being greater than the number of spatial layers and the non-codebook-based usage, that the number of spatial layers of CLI 230 is the number of spatial layers configured of the uplink transmission.

In some aspects, UE 210 may transmit or otherwise convey a CLI feedback message (e.g., CSI report 240) to base station 210 indicating the channel status information (e.g., CSI) associated with CLI 230 based on the number of spatial layers. That is, UE 210 may determine and report CSI values for full duplex mode, in accordance with the deter-mined number of spatial layers of the inter-UE interference (e.g., CLI 230).

That is, UE 210 calculates full-duplex mode CSI based on the number of spatial layers of inter-UE interference (e.g., CLI 230), which may be denoted as N. If the usage of this SRS resource set is non-codebook, UE 210 may select N SRS resources with the smallest interference strengths as the hypothetical inter-UE interferences. Then, UE 210 may calculate CSI values based on these hypothetical inter-UE interferences. That is, UE 210 may identify, based at least in part on a previous channel status information associated with each reference signal resource, a subset of reference signal resources of the at least one reference signal resource set. UE 210 may determine, based at least in part on the configuration 235, that the usage information for the at least one reference signal resource set comprises non-codebook-based usage. UE 210 may determine, based at least in part on the non-codebook-based usage and the number of spatial layers of CLI 230, the channel status information (e.g., CSI) associated with the cross-link interference for the subset of reference signal resources.

If the usage of this SRS resource set is codebook, UE 210 selects one SRS resource with the smallest interference strength as the hypothetical inter-UE interference. Then, UE 210 may calculate the CSI values based on this hypothetical inter-UE interference. For example, the interference strength of a SRS resource with multiple antenna ports can be calculated by summing the interference strength of each port of this SRS resource. That is, UE 210 may identify, based at least in part on a previous channel status information asso-ciated with each reference signal resource, a reference signal resource of the at least one reference signal resource set. UE 210 may determine, based at least in part on the configura-tion 235, that the usage information for the at least one reference signal resource set comprises codebook-based usage. UE 210 may determine, based at least in part on the codebook-based usage and the number of spatial layers of cross-link interference, the channel status information asso-ciated with the cross-link interference for the reference signal resource.

Based on the determined channel status information (e.g., CSI), UE 210 may report its full-duplex mode CSI (e.g., in a CLI feedback message, such as CSI report 240). If the usage of this SRS resource set is non-codebook, UE 210 may report not larger than N SRI values. That is, UE 210 may determine, based at least in part on the configuration 235, that the usage information for the at least one reference signal resource set comprises non-codebook-based usage. UE 210 may transmit, based at least in part on the non-codebook-based usage, the CLI feedback message indicat-ing the channel status information for a subset of reference signal resources in the at least one reference signal resource set.

If the usage of this SRS resource set is codebook, UE 210 may report one SRI value. That is, UE 210 may determine, based at least in part on the configuration 230, that the usage information for the at least one reference signal resource set comprises codebook-based usage. UE 210 may transmit, based at least in part on the codebook-based usage, the CLI feedback message indicating the channel status information for a reference signal resource in the at least one reference signal resource set.

In some aspects, UE 210 may be paired with multiple uplink UEs (e.g., multiple potentially interfering devices). If base station 205 pairs one downlink UE (e.g., UE 210) with multiple uplink UEs (e.g., UE 215 and other interfering devices in this example) in full duplex mode, in which the uplink UEs operate using MU-MIMO transmissions, base station 205 may combine the SRS resources from different uplink UEs with the same usage into one SRS resource set. In this way, base station 205 may indicates a SRS resource set whose usage is codebook or a SRS resource set whose usage is non-codebook to UE 210, each of which contains the SRS resources of the same usage from multiple uplink UEs. UE 210 may determine the number of spatial layers of inter-UE interference (e.g., CLI 230 plus CLI from the other interfering devices) based on the usage of this SRS resource set, ignoring the sources (e.g., UE 210 does not know which uplink UE the SRS resource set is configured for) of SRS resources in this SRS resource set. UE 210 may report CSI values and one or more associated SRI values, in which the SRI values may identify SRS resources from one or multiple uplink UEs.

Accordingly, base station 205 may determine that there are a plurality of interfering devices associated with UE 210, each interfering device associated with a corresponding set of reference signal resources having a same usage informa-tion. Base station 205 may combine, based at least in part on the same usage information, the corresponding set of reference signal resources for each interfering device into the indication of the at least one reference signal resources set. In some aspects, this may include base station 205 identifying, based at least in part on a SRI and associated CLI level indicated in the CLI message (e.g., CLI feedback message, such as CSI report 240), an interference level associated with at least one interfering device of the plurality of interfering devices.

Accordingly, aspects of the described techniques support UE 210, while in full duplex mode, being informed of how many SRS resources the inter-UE interference comes from. With this information, UE 210 can select a proper matched uplink UE (e.g., interfering device) and determine an accurate CSI value based on the inter-UE interference hypothesis. This may improve data throughput of full duplex systems.

Figure 3:
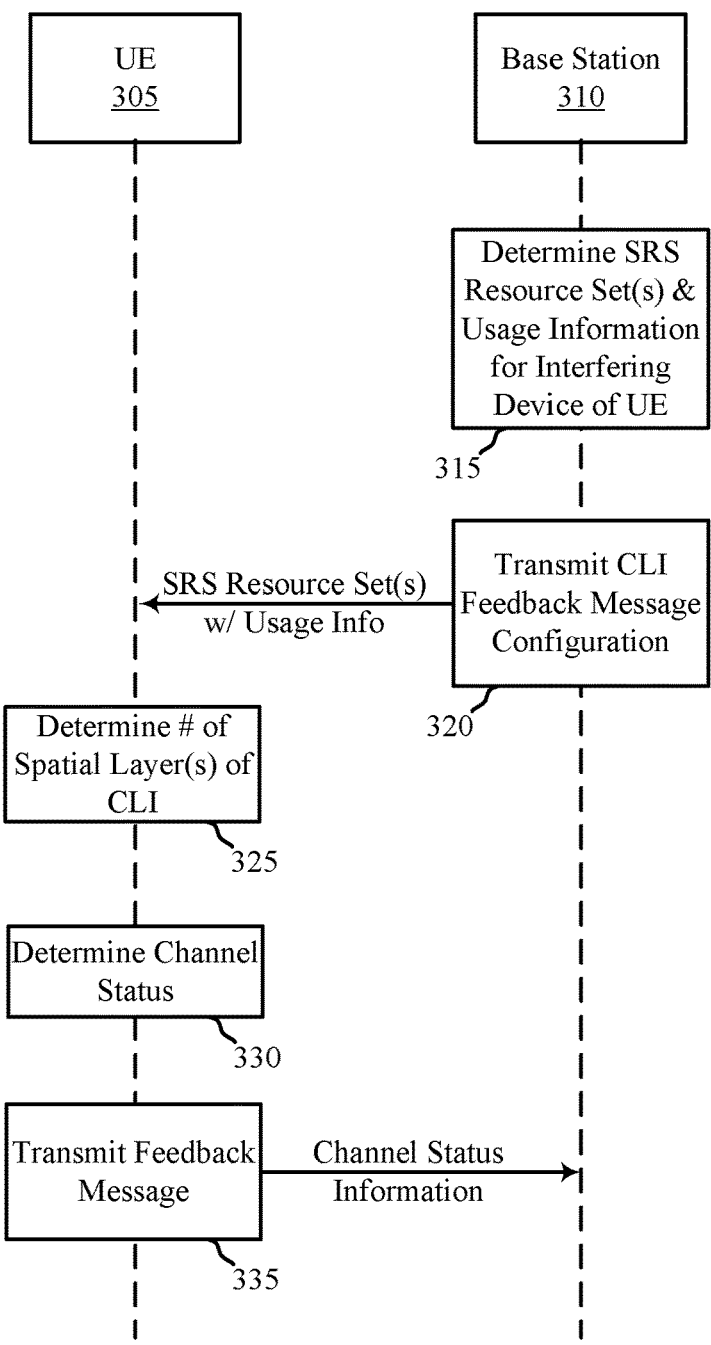
FIG. 3 illustrates an example of a process that supports channel status report based on sounding reference signal resource usage in full duplex in accordance with aspects of the present disclosure.

FIG. 3 illustrates an example of a process 300 that supports channel status report based on sounding reference signal resource usage in full duplex in accordance with aspects of the present disclosure. In some examples, process 300 may implement aspects of wireless communication systems 100 and/or 200. Aspects of process 300 may be implemented by UE 305 and base station 310, which may be examples of the corresponding devices described herein.

At 315, base station 310 may determine, for CLI measurement by UE 305 of CLI from an interfering device, at least one reference signal resource set (e.g., SRS resource set(s)) and usage information for the at least one reference signal resource set.

At 320, base station 310 may transmit (and UE 305 may receive) a configuration for transmitting a CLI feedback message, the configuration indicating at least one reference signal resource set to be monitored by UE 305 for CLI from an interfering device, the configuration also indicating usage information for the at least one reference signal resource set.

At 325, UE 305 may determine, based at least in part on the usage information, a number of spatial layers of CLI associated with the interfering device. In some aspects (when the usage is codebook), this may include base station 310 transmitting (and UE 305 receiving), with the configuration, an indication of a number of antenna ports of at least one reference signal resource of the at least one reference signal resource set. In some aspects (when the usage is non-codebook), this may include base station 310 transmitting (and UE 305 receiving), with the configuration, an indication of the number of spatial layers of CLI associated with the interfering device. The non-codebook usage scenario is specifically illustrated in FIG. 4.

In some aspects, this may include UE 305 determining that the configuration indicates a reference signal resource in the at least one reference signal resource set. Accordingly, UE 305 may determine, based at least in part on the configuration, that the usage information for the reference signal resource comprises a codebook-based usage and may also determine, based at least in part on the codebook-based usage, that the number of spatial layers of CLI is the number of antenna ports of a reference signal resource in the at least one reference signal resource set.

In some aspects, this may include UE 305 determining that the configuration indicates a plurality of reference signal resources in the at least one reference signal resource set. UE 305 may select, based at least in part on a previously determined channel status information, a reference signal resource from the plurality of reference signal resources. Accordingly, UE 305 may determine, based at least in part on the configuration, that the usage information for the selected reference signal resource comprises a codebook-based usage and also determine, based at least in part on the codebook-based usage, that the number of spatial layers of CLI is the number of antenna ports of the reference signal resource.

At 330, UE 305 may determine channel status information (e.g., CSI) associated with the CLI based at least in part on the number of spatial layers. At 335, UE 305 may transmit (and base station 310 may receive) the CLI feedback message (e.g., CSI report) indicating the channel status information.

In some aspects, this may include UE 305 determining, based at least in part on the configuration, that the usage information for the at least one reference signal resource set is non-codebook-based usage. Accordingly, UE 305 may transmit, based at least in part on the non-codebook-based usage, the CLI feedback message indicating the channel status information for a subset of reference signal resources in the at least one reference signal resource set (as also illustrated in FIG. 4).

In some aspects, this may include UE 305 determining, based at least in part on the configuration, that the usage information for the at least one reference signal resource set is codebook-based usage. Accordingly, UE 305 may transmit, based at least in part on the codebook-based usage, the CLI feedback message indicating the channel status information for a reference signal resource in the at least one reference signal resource set.

Figure 4:
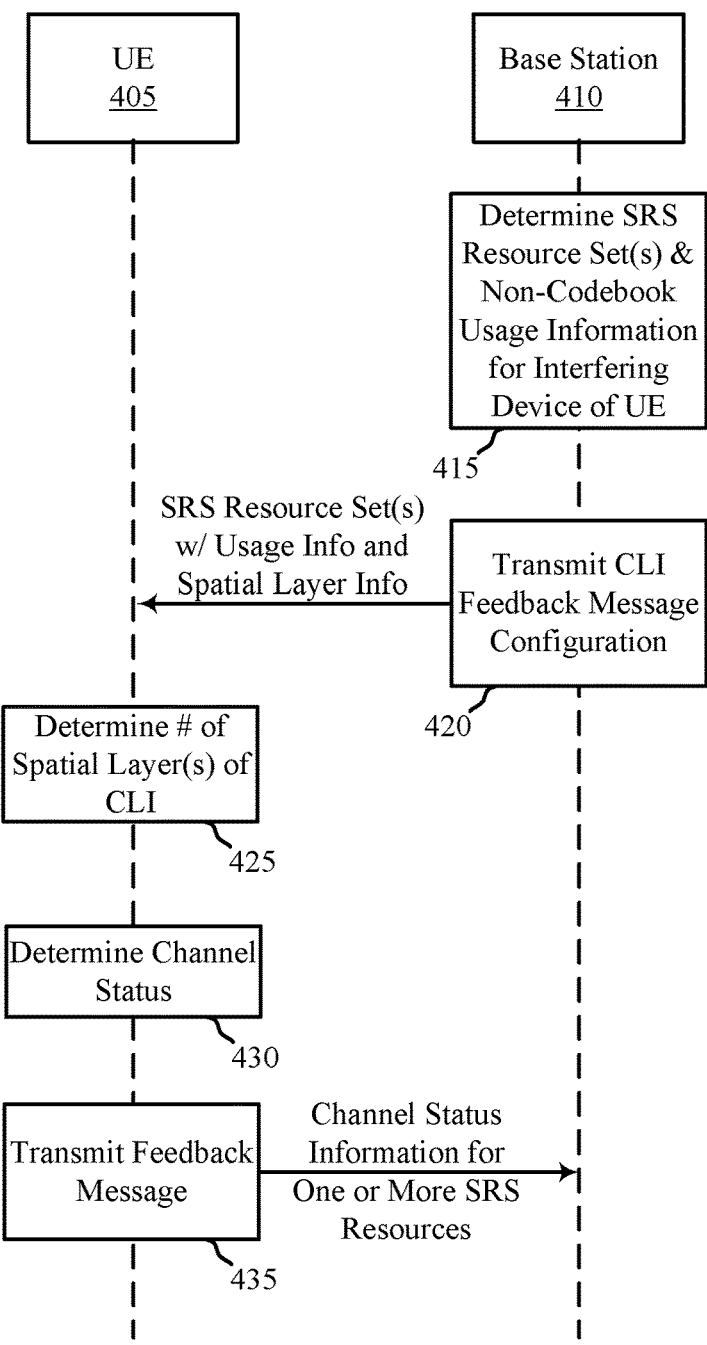
FIG. 4 illustrates an example of a process that supports channel status report based on sounding reference signal resource usage in full duplex in accordance with aspects of the present disclosure.

FIG. 4 illustrates an example of a process 400 that supports channel status report based on sounding reference signal resource usage in full duplex in accordance with aspects of the present disclosure. In some examples, process 400 may implement aspects of wireless communication systems 100 and/or 200. Aspects of process 400 may be implemented by UE 405 and base station 410, which may be examples of the corresponding devices described herein.

At 415, base station 410 may determine, for CLI measurement by UE 405 of CLI from an interfering device, at least one reference signal resource set (e.g., SRS resource set(s)) and usage information for the at least one reference signal resource set.

At 420, base station 410 may transmit (and UE 405 may receive) a configuration for transmitting a CLI feedback message, the configuration indicating at least one reference signal resource set to be monitored by UE 405 for CLI from an interfering device, the configuration also indicating usage information for the at least one reference signal resource set. In FIG. 4, the usage information is non-codebook based usage. In some aspects, the configuration information transmitted from the base station 410 to the UE 405 may indicate the number of spatial layers of CLI associated with the interfering device.

At 425, UE 405 may determine, based at least in part on the usage information, a number of spatial layers of CLI associated with the interfering device. In some aspects, this may include UE 405 determining that the configuration indicates one or multiple reference signal resources in the at least one reference signal resource set. The number of reference signal resources in the at least one reference signal resource set may be determined by UE 405 to be not larger than the indicated number of spatial layers associated with the interfering device. Accordingly, UE 405 may determine, based at least in part on the configuration, that the usage information for the selected reference signal resource comprises a non-codebook-based usage and also determine, based at least in part on the non-codebook-based usage, that the number of spatial layers of CLI is the number of the reference signal resources.

Alternatively, at 425, UE 405 may determine that the number of reference signal resources in the at least one reference signal resource set may be larger than the indicated number of spatial layers associated with the interfering device. Accordingly, UE 405 may determine, based at least in part on the configuration, that the usage information for the selected reference signal resource comprises a non-codebook-based usage and also determine, based at least in part on the non-codebook-based usage, that the number of spatial layers of CLI is the same as the indicated number of spatial layers (received at 420).

At 430, UE 405 may determine channel status information (e.g., CSI) associated with the CLI based at least in part on the number of spatial layers. At 435, UE 405 may transmit (and base station 410 may receive) the CLI feedback message (e.g., CSI report) indicating the channel status information.

In some aspects, this may include UE 405 determining, based at least in part on the configuration, that the usage information for the at least one reference signal resource set is non-codebook-based usage. Accordingly, UE 405 may transmit, based at least in part on the non-codebook-based usage, the CLI feedback message indicating the channel status information for a subset of reference signal resources in the at least one reference signal resource set. The subset of reference signal resources for which the UE 405 reports the channel status information is no larger than the number of reference signal resources used by UE 405 to calculate the channel status information.

Figure 5:
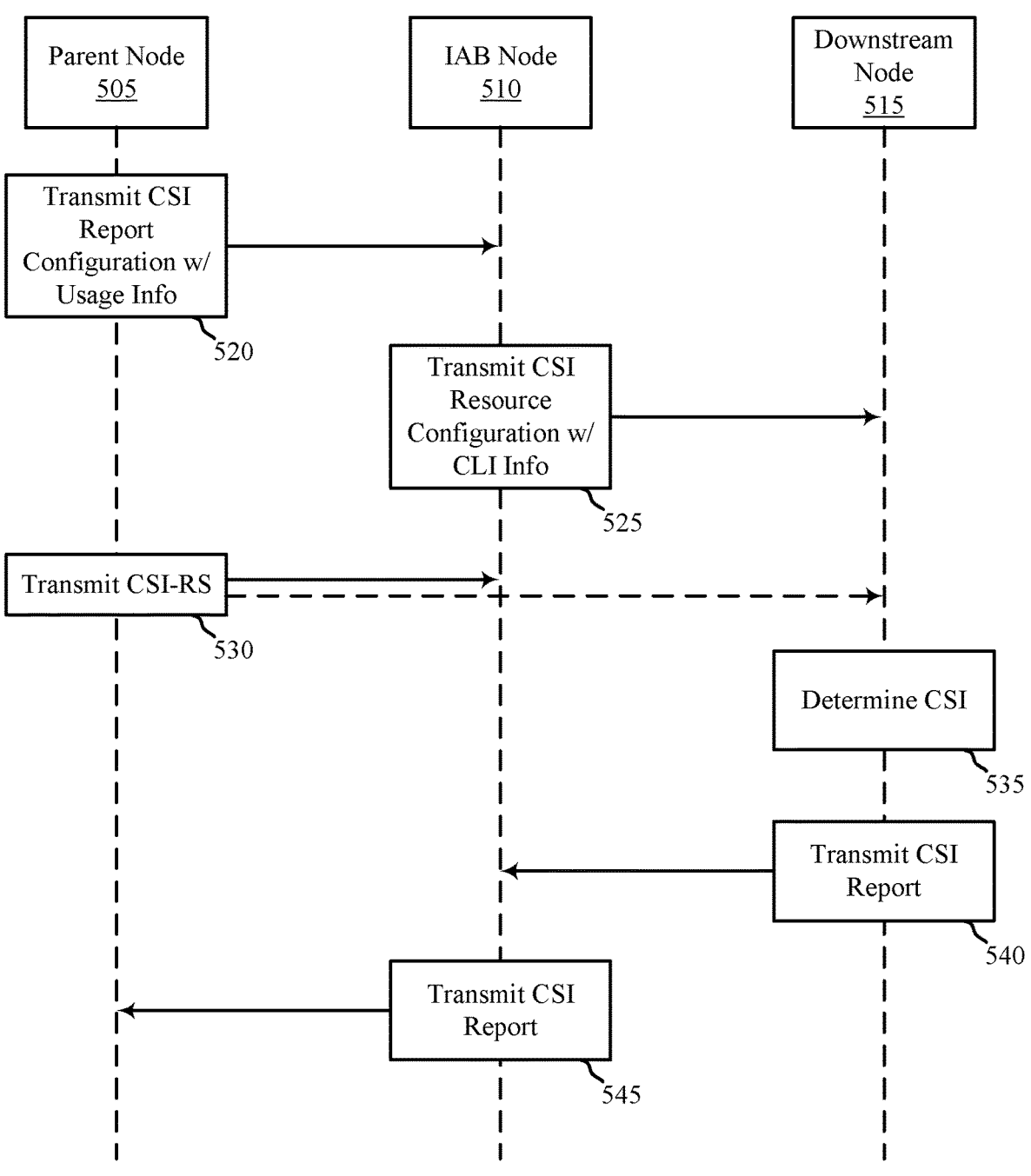
FIG. 5 illustrates an example of a process that supports channel status report based on sounding reference signal resource usage in full duplex in accordance with aspects of the present disclosure.

FIG. 5 illustrates an example of a process 500 that supports channel status report based on SRS resource usage in full duplex in accordance with aspects of the present disclosure. In some examples, process 500 may implement aspects of wireless communication systems 100 and/or 200. Aspects of process 500 may be implemented by parent node 505, an JAB node 510, and a downstream node 515, which may be examples of the corresponding devices described herein.

That is, the techniques for channel status reporting described herein may be adopted within an IAB network. The JAB network may include an anchor node having a connection to a core network, one or more IAB nodes forming the links within the JAB network, and one or more UE associated with at one of the IAB nodes (e.g., each IAB node may be associated with one or more UE). Broadly, the IAB network provides a backhaul connection for UE to connect to the core network via one or more intermediate IAB nodes to the anchor IAB node. In some aspects, each JAB node may include a DU function that manages various aspects of the wireless backhaul links between the JAB node and a parent IAB node (which may simply be an upstream IAB node or may be the anchor IAB node) and between the IAB node and a downstream IAB node (which may be referred to as a child IAB node, with the child JAB node being simply an JAB node or a UE). Additionally, each IAB node may also include a mobile terminal (MT) function that manages various aspects of the wireless access links between the IAB node and one or more associated UE (which may also be considered a downstream node from the perspective of the IAB node in this context). Accordingly, parent node 505 may refer to an upstream IAB node within the IAB network, which may be an anchor node in some examples or another upstream IAB node between IAB node 510 and the anchor node. IAB node 510 may be an example of an JAB node within the IAB network, which may be implemented at or implemented by a base station and/or UE. Downstream node 515 may be an example of a IAB node that is downstream from IAB node 510, which may simply be a downstream IAB node communicating with JAB node 510 via a backhaul link or a UE communicating with IAB node 510 via an access link. In some aspects, IAB node 510 may operate in full duplex communication with parent node 505 and/or with downstream node 515.

Broadly, process 500 illustrates an example where parent node 505 may transmit or otherwise convey a CSI report configuration to IAB node 510. Broadly, the CSI report configuration may generally carry or otherwise convey information identifying how JAB node 510 is to generate a CSI report based on monitoring CSI-RS transmissions from parent node 505 to IAB node 510 using a CSI-RS resource set. In some aspects, the CSI report configuration may also carry or otherwise convey usage information for a CSI-RS resource set (e.g., information identifying the usage or purpose of the CSI-RS transmissions, such as an indication that the transmissions using the associated resources are for CSI measurement and reporting purposes). Based on the CSI report configuration, IAB node 510 may transmit or otherwise provide a CSI resource configuration to downstream node 515 (which may simply be a downstream IAB node served by the DU function of IAB node 510 or may be a UE served by the MT function of IAB node 510). The parent node 505 may transmit CSI-RS according to the CSI-RS resource set, which JAB node 510 may monitor to determine CSI for the link between IAB node 510 and parent IAB node 505. However, downstream node 515 may also receive the CSI-RS transmissions (e.g., overhear) from parent node 505 (which may be CLI from the perspective of the downstream node 515) and determine CSI information (e.g., CLI information) for the parent IAB node 505 (e.g., based on the CSI resource configuration provided to the downstream JAB node 515 by JAB node 510). Accordingly, the downstream node 515 may transmit or otherwise provide a CSI report to the IAB node 510 indicating the CSI information for the parent node 505. That is, the CSI for the parent node 505 may be associated with CLI that is based on the number spatial layers associated with the parent node 505 (e.g.,. the number of ports of the CSI-RS). Accordingly, the JAB node 510 may identify or otherwise determine the number of interference spatial layers associated with the parent IAB node 505 (e.g., from the perspective of downstream node 515), which may be equal to or less than the number of CSI-RS ports associated with the CSI-RS resource set.

For example, at 520 parent node 505 may transmit or otherwise provide (and IAB node 510 may receive or otherwise obtain) a CSI report configuration for generation of the CSI report. The CSI report may be based on, at least in some aspects, on IAB node 510 monitoring a CSI-RS resource set. That is, the CSI report configuration may identify the CSI resource set to be used by parent node 505 for transmitting CSI-RS, which IAB node 510 can monitor to determine the channel status for the link between parent node 505 and IAB node 510. In some aspects, the CSI report configuration may also identify or otherwise indicate usage information for the CSI-RS resource set. For example, the CSI report configuration may carry or otherwise convey information identifying the number of ports in the CSI-RS resource set. In some aspects, the CSI report configuration may be transmitted or otherwise provided via an RRC message, a MAC CE, and/or DCI.

At 525, IAB node 510 may transmit or otherwise provide (and downstream node 515 may receive or otherwise obtain)

a CSI resource configuration. Broadly, the CSI resource configuration may be based on the usage information for the CSI-RS resource set and may identify the number spatial layers of CLI associated with the parent node 505. That is, the IAB node 510 may transmit the CSI resource configuration to downstream node 515, which contains a number of ports in the CSI-RS resource set. In some aspects, the CSI resource configuration may carry or otherwise convey substantially similar information as the IAB node 510 received in the CSI report configuration from parent node 505.

Accordingly and at 530, parent node 505 may transmit one or more CSI-RS according to the CSI-RS resource set identified in the CSI report configuration. The CSI-RS transmissions may use a number of ports, which may be associated with the number of spatial layers for the CSI-RS.

At 535, downstream node 515 may identify or otherwise determine CSI based on the CSI-RS transmissions of parent node 505 (e.g., based on IAB node 510 monitoring the CSI-RS resource set according to the CSI resource configuration). The CSI-RS in this context may be a reference signal configured by parent node 505 for IAB node 510 to use for channel status measurement and reporting. However, such CSI-RS may also be received or otherwise detected by downstream node 515 (e.g., the CSI-RS transmissions of parent node 505 to IAB node 510 may be interfering signals from the perspective of downstream node 515). Accordingly, from the perspective of downstream node 505 the CSI-RS transmissions of parent node 505 to IAB node 510 for channel status and reporting may result in CLI at downstream node 515.

At 540, downstream node 515 may transmit or otherwise provide (and IAB node 510 may receive or otherwise obtain) a CSI report indicating CSI. The CSI in this context may correspond to CLI observed by downstream node 515 based on the CSI-RS transmissions. The CLI may be based, at least to some degree, on the number of spatial layers of CLI (e.g., based on the usage information for the CSI-RS indicating the number of CSI-RS ports). The CSI report may be transmitted via a backhaul link of the IAB network (e.g., when downstream node 515 is another IAB node within the IAB network) or via an access link (e.g., when downstream node 515 is a UE associated with IAB node 510).

For example, IAB node 510 may identify or otherwise determine (e.g., based on the CSI report) the number of interference spatial layers determined or otherwise observed by downstream node 515. In some aspects, the number of interference spatial layers may be equal to or less than the number of CSI-RS ports associated with the CSI-RS resource set. In some aspects, IAB node 510 may identify or otherwise determine (e.g., based on the CSI report) the PMI associated with a number of interference spatial layers.

At 545, IAB node 515 may transmit or otherwise provide a CSI report to parent node 505 (e.g., a second CSI report). The CSI report in this context may be based on the CSI-RS measurements performed by IAB node 510 as well as the CSI report received from downstream node 515. For example, the CSI report provided to parent node 505 by IAB node 510 may carry or otherwise convey the CSI information of IAB node 510 as well as the CSI report from downstream node 515 that is associated with the CLI based on the number of spatial layers of the CSI-RS resource set. Accordingly, IAB node 510 may transmit or otherwise provide (and parent node 505 may receive or otherwise obtain) a CSI report (e.g., a second CSI report) indicating CSI (e.g., based on IAB node 510 monitoring the CSI-RS resource set). The CSI report in this example (e.g., the second CSI report) may carry or otherwise convey some or all of the CSI report received from downstream node 515.

Accordingly, the child node (e.g., downstream node 515) may report full duplex CSI to IAB node 510 based on the indication of the CSI resource configuration. Downstream node 515 may measure (e.g., overhear) the CSI-RS transmitted from parent node 505 and then report the number of interference signal spatial layers. The number of spatial layers in this context may be no larger than the number of CSI-RS ports and corresponding CSI. In some aspects, the CSI report may report precoding matrix (PMI) (e.g., the precoding weights) of the interfering signals. IAB node 510 then reports full-duplex CSI to parent node 505 based on the CSI report it received from downstream node 515. In the CSI report provided to parent node 505 by IAB node 510, the value of the rank indicator (RI) may be equal to the number of interference spatial layers indicated by downstream node 515. That is, the CSI report transmitted to parent node 505 at 545 may also indicate the number spatial layers and/or CLI based on the spatial layers (e.g., based on downstream node 515 detecting CSI-RS transmissions from parent node 505 to IAB node 510.

Figure 6:
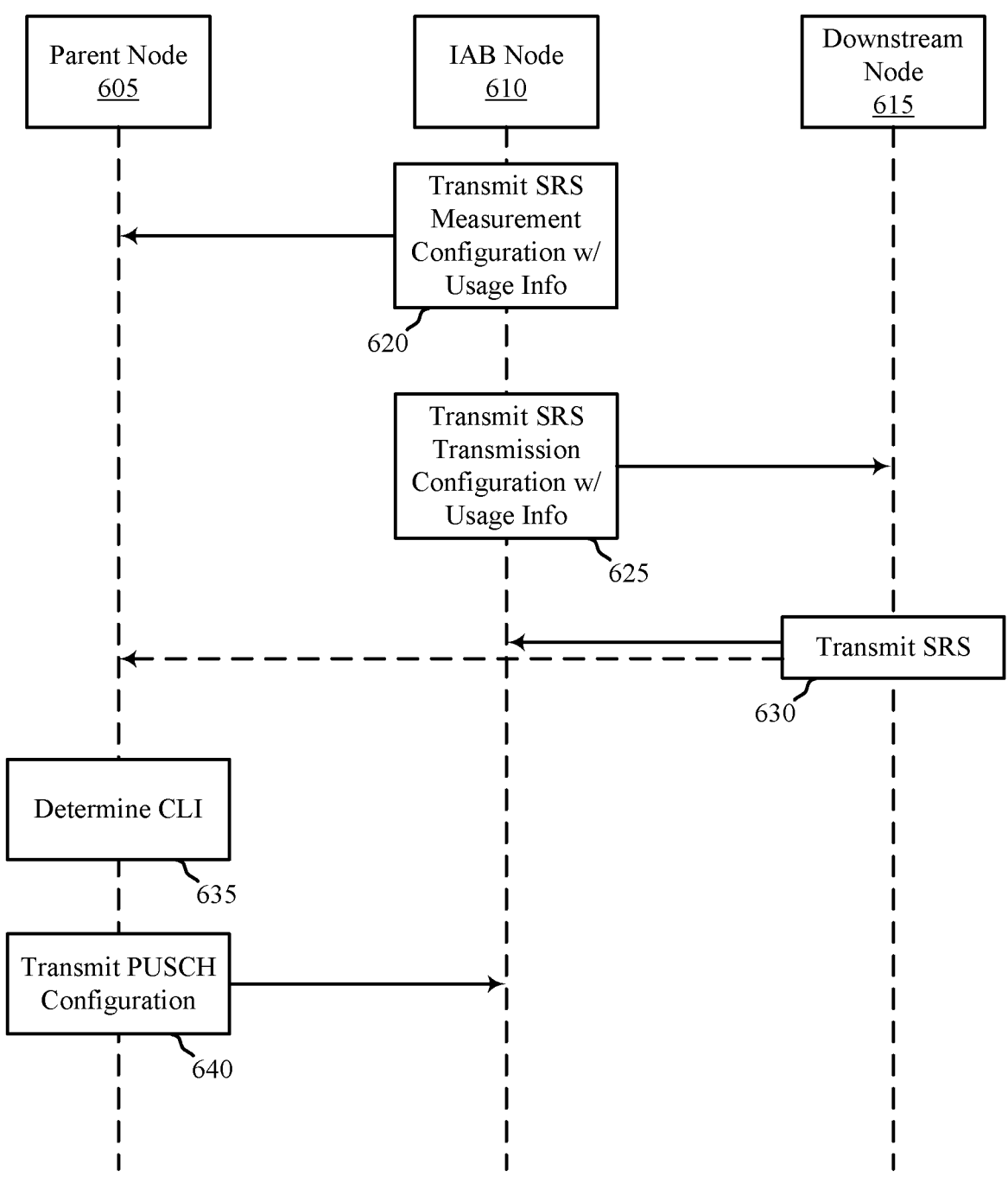
FIG. 6 illustrates an example of a process that supports channel status report based on sounding reference signal resource usage in full duplex in accordance with aspects of the present disclosure.

FIG. 6 illustrates an example of a process 600 that supports channel status report based on SRS resource usage in full duplex in accordance with aspects of the present disclosure. In some examples, process 600 may implement aspects of wireless communication systems 100 and/or 200. Aspects of process 600 may be implemented by parent node 605, an IAB node 610, and a downstream node 615, which may be examples of the corresponding devices described herein. In some aspects, IAB node 610 may operate in full duplex communication with parent node 605 and/or with downstream node 615.

Broadly, process 600 illustrates an example where the described techniques may be utilized in an upstream scenario within the JAB network. For example, the IAB node 610 may transmit or otherwise provide an SRS measurement configuration to the parent node 605. Broadly, the SRS measurement configuration may provide information to be used by the parent node 605 to measure CLI on a reference signal resource set (e.g., an SRS resource set) to be used by the downstream node 615 for transmitting SRS. The SRS measurement configuration may also identify or otherwise indicate a number spatial layers of CLI associated with the downstream node (e.g., based on the usage information for the reference signal resources). The JAB node 610 may also transmit or otherwise provide the SRS transmission configuration to the downstream node 615 that carries or otherwise conveys information identifying the reference signal resource set to be used for transmitting SRS by the downstream node 615. The SRS transmission configuration may also carry or otherwise convey information identifying the usage information for the reference signal resources. The downstream node 615 may transmit SRS according to the SRS transmission configuration, which may be used by the IAB node 610 to determine the channel status for the link between the IAB node 610 and the downstream node 615. However, the parent node 605 may also receive and measure the SRS transmissions of the downstream node 615. Again, this may provide an indication of CLI for the parent node 605 based on the channel status of the link between the JAB node 610 and its downstream node 615. Accordingly, the parent node 605 may also identify or otherwise determine the amount of interference (e.g., the channel status/CLI interference) and make scheduling decisions for the IAB node 610 and/or the downstream node 615. The parent node 605 may transmit or otherwise provide an uplink resource configuration (e.g., a PUCCH and/or PUSCH resource configuration) based on the parent node 605 measuring the CLI determine from the SRS transmissions of the downstream node 615. Again, this may be based on the usage information (e.g., the number spatial layers of CLI associated with the downstream IAB node). The CLI or co-channel interference in this context may be from the downstream node 615 and the parent node 605.

Accordingly and at 620, JAB node 610 may transmit or otherwise provide (and parent node 605 may receive or otherwise obtain) a SRS measurement configuration. Broadly, the SRS measurement configuration may carry or otherwise convey information to be used by parent node 605 for measuring CLI on a reference signal resource set being used by downstream node 615 for transmitting SRS. In some aspects, the SRS measurement configuration may also identify or otherwise indicate a number spatial layers of CLI associated with downstream node 615 (e.g., based on the usage information for the reference signal resource set). That is, the SRS measurement configuration may identify the usage information for the reference signal resource set (e.g., the SRS resource set). Accordingly, IAB node 610 in this context may send a message to parent node 605 indicating the SRS measurement configuration, which contains the usage information for the SRS resource set. In some aspects, the SRS measurement configuration may be communicated via a backhaul link within the IAB network (e.g., transmitted in an RRC message, a MAC CE, and/or a DCI, via a backhaul link between parent node 605 and JAB node 610).

At 625, IAB node 610 may transmit or otherwise provide (and downstream node 615 may receive or otherwise obtain) an SRS transmission configuration indicating the reference signal resource set to be used by downstream node 615 for transmitting SRS. The SRS transmission configuration may also carry or otherwise convey an indication of the usage information for the reference signal resources. That is, JAB node 610 in this example may send a message to downstream node 615 (e.g., a child node or UE) indicating the SRS transmission configuration, which contains the usage information for the SRS resource set. In some aspects, the usage information (e.g., the usage value) may be the same as indicated to parent node 605 in the SRS measurement configuration.

At 630, downstream node 615 may perform SRS transmissions according to the reference signal resource set (e.g., using the resources identified in the SRS resource set). That is, downstream node 615 may identify the resources available for transmitting SRS, and perform the SRS transmissions using the corresponding resources. Broadly, the SRS transmissions are intended for IAB node 610 to use for channel sounding (e.g., to use for channel measurement and reporting, such as CSI). However, such SRS transmissions may also be received or otherwise overheard by parent node 605. From the perspective of parent node 605, the SRS transmissions may be interfering signals to be measured and used for scheduling decisions by parent node 605.

Accordingly, at 635 parent node 605 may identify or otherwise determine the CSI (e.g., the CLI in this context) based on the SRS transmissions performed by downstream node 615. That is, parent node 605 may overhear and measure or otherwise quantify the SRS transmissions from downstream node 615. Based on such measurements, parent node 605 may identify or otherwise determine the amount or degree of interference (e.g., CLI) generated by transmissions from downstream node 615. Accordingly, parent node 605 in this context may use the CLI associated with downstream node 615 transmissions when making scheduling decisions (e.g., identifying or otherwise allocating PUCCH and/or PUSCH resources) for communications involving IAB node 610 and/or downstream node 615. For example, parent node 605 may optimize such scheduling decisions to mitigate or otherwise avoid interference associated with downstream node 615 transmissions.

Accordingly and at 640, parent node 605 may transmit or otherwise provide (and IAB node 610 may receive or otherwise obtain) an uplink resource configuration that is based, at least to some degree, on parent node 605 measuring the CLI from the SRS transmissions of downstream node 615. Again, as the SRS measurement configuration includes the usage information for the reference signal resource set, the uplink resource configuration in this context may be based on the number of spatial layers associated with the SRS transmissions. Accordingly, parent node 605 in this example may measure (e.g., overhear) the SRS transmissions of downstream node 615 and determine the number of interference spatial layers associated with the CLI. This may improve the corresponding uplink resource configuration (e.g., PUSCH and/or PUCCH resource configuration) scheduling decisions at the parent node 605.

Figure 7:
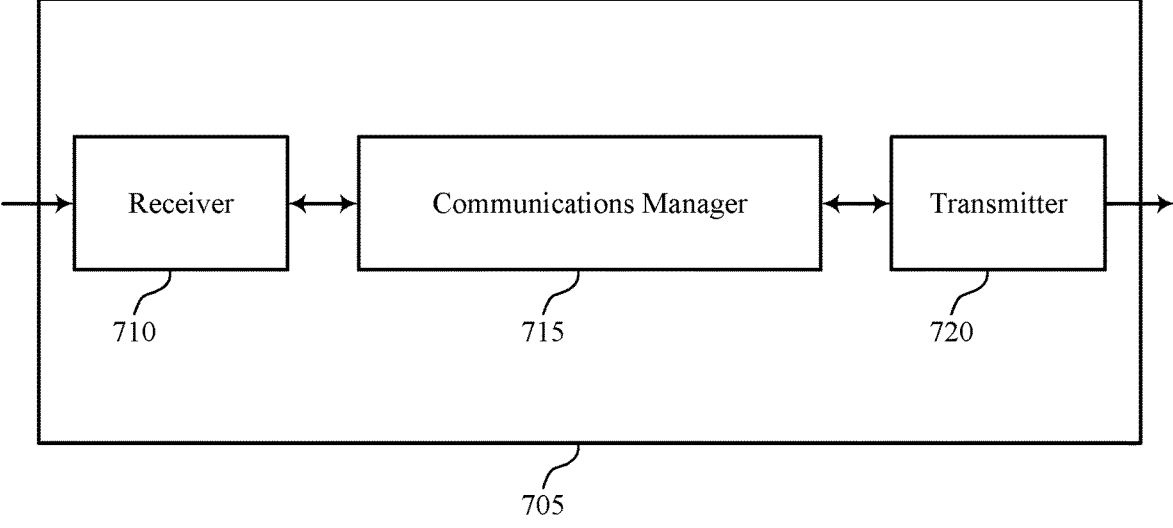
FIGS. 7 and 8 show block diagrams of devices that support channel status report based on sounding reference signal resource usage in full duplex in accordance with aspects of the present disclosure.

FIG. 7 shows a block diagram 700 of a device 705 that supports channel status report based on SRS resource usage in full duplex in accordance with aspects of the present disclosure. The device 705 may be an example of aspects of a UE 115, or an IAB node as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to channel status report based on sounding reference signal resource usage in full duplex, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a configuration for transmitting a CLI feedback message, the configuration indicating at least one reference signal resource set to be monitored by the UE for CLI from an interfering device, the configuration also indicating usage information for the at least one reference signal resource set, determine, based on the usage information, a number of spatial layers of CLI associated with the interfering device, determine channel status information associated with the CLI based on the number of spatial layers, and transmit the CLI feedback message indicating the channel status information. The communications manager 715 may be an example of aspects of the communications manager 1010 described herein.

When device 705 is an example of an IAB node, the communications manager 715 may receive, from a parent IAB node, a CSI report configuration for generation of a CSI report associated with monitoring, by the IAB node, at least one CSI-RS resource set, the configuration also indicating usage information for the at least one CSI-RS resource set; transmit a CSI resource configuration to a downstream node, the CSI resource configuration indicating, based at least in part on the usage information, a number of spatial layers of CLI associated with the parent IAB node; and receive, from the downstream node, the CSI report indicating CSI, the CSI associated with the CLI based at least in part on the number of spatial layers.

When device 705 is an example of an IAB node, the communications manager 715 may transmit, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node; transmit, to the downstream node, a SRS transmission configuration indicating the at least one reference signal resource set to be used in transmitting the SRSs, the configuration indicating the usage information for the at least one reference signal resource set; and receive, from the parent IAB node, an uplink resource configuration that is based at least in part on the measuring of the CLI determined from the SRSs and based at least in part on the number of spatial layers The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
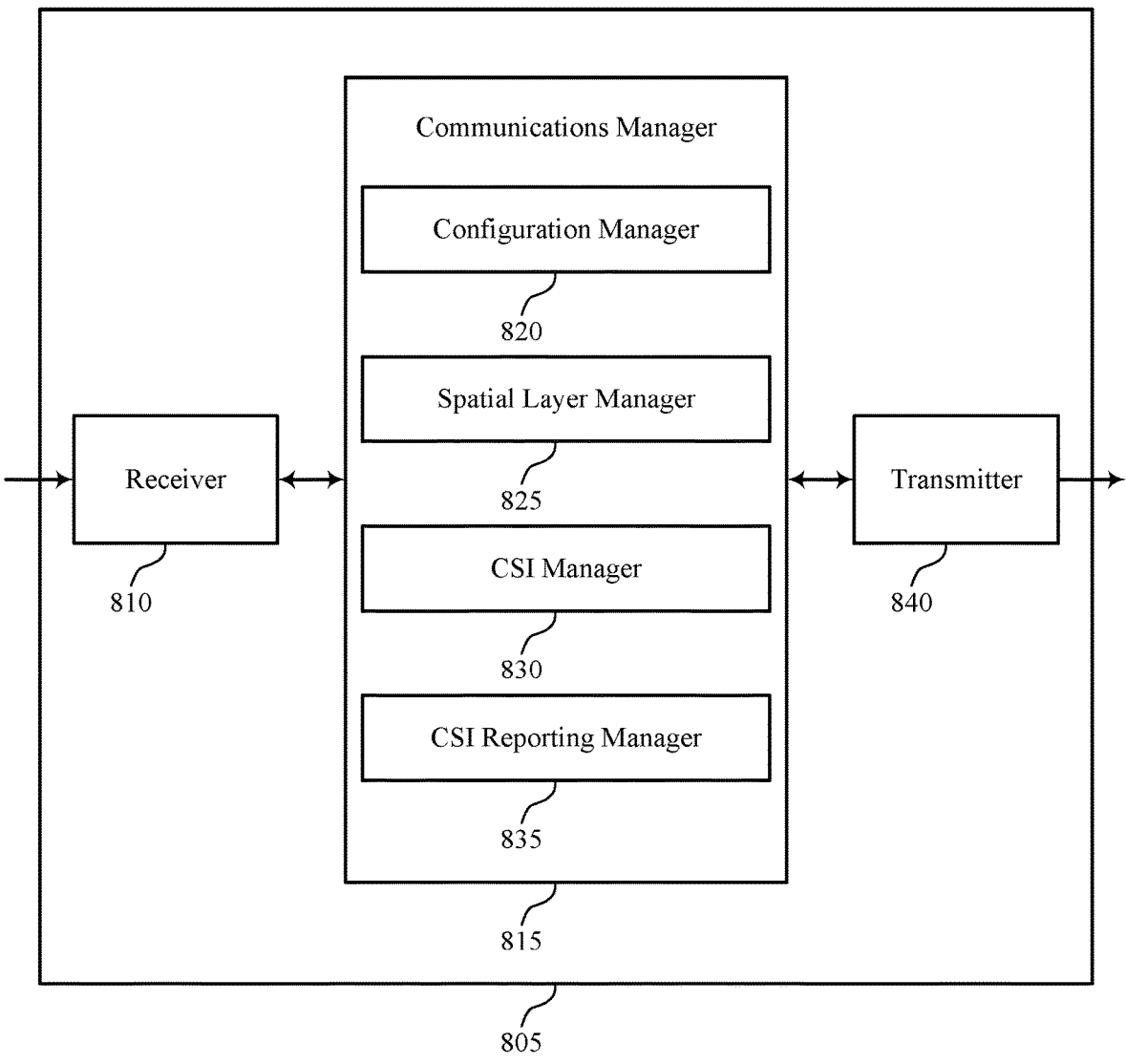

FIG. 8 shows a block diagram 800 of a device 805 that supports channel status report based on SRS resource usage in full duplex in accordance with aspects of the present disclosure. The device 805 may be an example of aspects of a device 805, an IAB node, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to channel status report based on sounding reference signal resource usage in full duplex, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration manager 820, a spatial layer manager 825, a CSI manager 830, and a CSI reporting manager 835. The communications manager 815 may be an example of aspects of the communications manager 1010 described herein.

The configuration manager 820 may receive a configuration for transmitting a CLI feedback message, the configuration indicating at least one reference signal resource set to be monitored by the UE for CLI from an interfering device, the configuration also indicating usage information for the at least one reference signal resource set.

The configuration manager 820 may receive, from a parent IAB node, a CSI report configuration for generation of a CSI report associated with monitoring, by the IAB node, at least one CSI-RS resource set, the configuration also indicating usage information for the at least one CSI-RS resource set.

The configuration manager 820 may transmit, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node.

The spatial layer manager 825 may determine, based on the usage information, a number of spatial layers of CLI associated with the interfering device.

The spatial layer manager 825 may transmit a CSI resource configuration to a downstream node, the CSI resource configuration indicating, based at least in part on the usage information, a number of spatial layers of cross-link interference associated with the parent IAB node.

The spatial layer manager 825 may transmit, to the downstream node, a SRS transmission configuration indicating the at least one reference signal resource set to be used in transmitting the SRSs, the configuration indicating the usage information for the at least one reference signal resource set.

The CSI manager 830 may determine channel status information associated with the CLI based on the number of spatial layers.

The CSI reporting manager 835 may transmit the CLI feedback message indicating the channel status information.

The CSI reporting manager 835 may receive, from the downstream node, the CSI report indicating CSI, the CSI associated with the cross-link interference based at least in part on the number of spatial layers.

The CSI reporting manager 835 may receive, from the parent IAB node, an uplink resource configuration that is based at least in part on the measuring of the CLI determined from the SRSs and based at least in part on the number of spatial layers The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
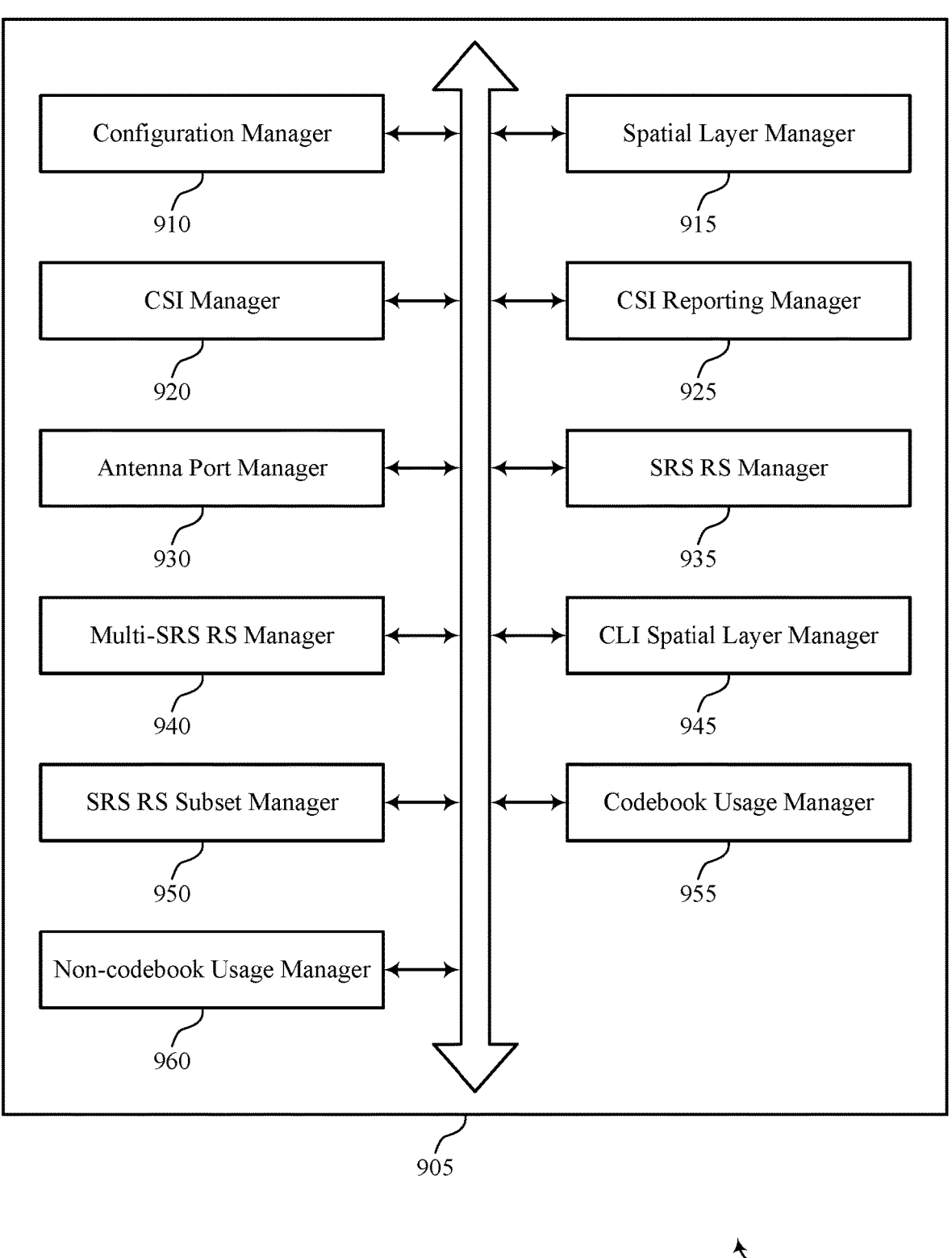
FIG. 9 shows a block diagram of a communications manager that supports channel status report based on sounding reference signal resource usage in full duplex in accordance with aspects of the present disclosure.

FIG. 9 shows a block diagram 900 of a communications manager 905 that supports channel status report based on SRS resource usage in full duplex in accordance with aspects of the present disclosure. The communications manager 905 may be an example of aspects of a communications manager 715, a communications manager 815, or a communications manager 1010 described herein. The communications manager 905 may include a configuration manager 910, a spatial layer manager 915, a CSI manager 920, a CSI reporting manager 925, an antenna port manager 930, a SRS RS manager 935, a multi-SRS RS manager 940, a CLI spatial layer manager 945, a SRS RS subset manager 950, a codebook usage manager 955, and a non-codebook usage manager 960. Each of these modules may communicate, directly or indirectly, with one another (e.g., via one or more buses).

The configuration manager 910 may receive a configuration for transmitting a CLI feedback message, the configuration indicating at least one reference signal resource set to be monitored by the UE for CLI from an interfering device, the configuration also indicating usage information for the at least one reference signal resource set. In some cases, the CLI feedback message indicates a SRI associated with the CLI. In some cases, the CLI feedback message may indicate one SRI based at least in part on the usage information for the at least one reference signal resource set comprising a codebook-based usage. In some cases, the CLI feedback message indicates a number of SRIs equal to the number of spatial layers of CLI associated with the interfering device based at least in part on the usage information for the at least one reference signal resource set comprising a non-codebook-based usage. In some cases, the configuration is received in at least one of a RRC message, or a MAC CE, or a DCI, or a combination thereof.

The configuration manager 910 may receive, from a parent IAB node, a CSI report configuration for generation of a CSI report associated with monitoring, by the IAB node, at least one CSI-RS resource set, the configuration also indicating usage information for the at least one CSI-RS resource set. In some examples, the CSI report configuration may be received in at least one of a RCC message, or a MAC CE, or a DCI, or a combination thereof.

The configuration manager 910 may transmit, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node. In some examples, the downstream node is a downstream IAB node or a UE. In some examples, the CSI is based at least in part on the IAB node operating in a full-duplex communication with the downstream node.

The spatial layer manager 915 may determine, based on the usage information, a number of spatial layers of CLI associated with the interfering device.

The spatial layer manager 915 may transmit a CSI resource configuration to a downstream node, the CSI resource configuration indicating, based at least in part on the usage information, a number of spatial layers of cross-link interference associated with the parent IAB node.

The spatial layer manager 915 may transmit, to the downstream node, a SRS transmission configuration indicating the at least one reference signal resource set to be used in transmitting the SRSs, the configuration indicating the usage information for the at least one reference signal resource set.

The spatial layer manager 915 may identify, based at least in part on the CSI report, a number of interference spatial layers, the number of interference spatial layers being equal to or less than a number of CSI-RS ports associated with the at least one CSI-RS resource set.

The spatial layer manager 915 may identify, based at least in part on the CSI report, a PMI associated with a number of interference spatial layers.

The CSI manager 920 may determine channel status information associated with the CLI based on the number of spatial layers. In some cases, the channel status information is based on the UE operating in a full-duplex communication with the interfering device.

The CSI reporting manager 925 may transmit the CLI feedback message indicating the channel status information.

The CSI reporting manager 925 may transmit, to the parent IAB node and according to the CSI report configuration, a second CSI report indicating CSI obtained based on monitoring the at least one CSI-RS resource set, the second CSI report indicating the CSI report received from the downstream node.

The CSI reporting manager 925 may receive, from the downstream node, the CSI report indicating CSI, the CSI associated with the cross-link interference based at least in part on the number of spatial layers.

The CSI reporting manager 925 may receive, from the parent IAB node, an uplink resource configuration that is based at least in part on the measuring of the CLI determined from the SRSs and based at least in part on the number of spatial layers. In some examples, the SRS measurement configuration is transmitted in at least one of a RRC message, or a MAC CE, or a DCI, or a combination thereof. In some examples, the CSI is based at least in part on the IAB node operating in a full-duplex communication with the downstream node.

The antenna port manager 930 may receive, with the configuration, an indication of a number of antenna ports of at least one reference signal resource of the at least one reference signal resource set.

The SRS RS manager 935 may determine that the configuration indicates a reference signal resource in the at least one reference signal resource set. In some examples, determining, based on the configuration, that the usage information for the reference signal resource includes a codebook-based usage. In some examples, determining, based on the codebook-based usage, that the number of spatial layers of CLI includes a number of antenna ports of a reference signal resource in the at least one reference signal resource set.

The multi-SRS RS manager 940 may determine that the configuration indicates a set of reference signal resources in the at least one reference signal resource set. In some examples, the multi-SRS RS manager 940 may select, based on a previously determined channel status information, a reference signal resource from the set of reference signal resources. In some examples, determining, based on the configuration, that the usage information for the selected reference signal resource includes a codebook-based usage. In some examples, determining, based on the codebook-based usage, that the number of spatial layers of CLI includes a number of antenna ports of the reference signal resource.

The CLI spatial layer manager 945 may receive, with the configuration, an indication of the number of spatial layers of CLI associated with the interfering device. In some examples, determining, based on the configuration, that the usage information for the at least one reference signal resource set includes a non-codebook-based usage and a number of reference signal resources in the at least one reference signal resource set.

In some examples, the CLI spatial layer manager 945 may determine that the number of reference signal resources is the same or less than the number of spatial layers of the uplink transmission from the interfering device. In some examples, the CLI spatial layer manager 945 may determine, based on the number of reference signal resources being the same or less than the number of spatial layers and the non-codebook-based usage, that the number of spatial layers of CLI include the number of reference signal resources. In some examples, determining, based on the configuration, that the usage information for the at least one reference signal resource set includes non-codebook-based usage and a number of reference signal resources in the at least one reference signal resource set.

In some examples, the CLI spatial layer manager 945 may determine that the number of reference signal resources is the greater than the number of spatial layers of the uplink transmission from the interfering device. In some examples, the CLI spatial layer manager 945 may determine, based on the number of reference signal resources being greater than the number of spatial layers and the non-codebook-based usage, that the number of spatial layers of CLI include the number of spatial layers configured of the uplink transmission.

The SRS RS subset manager 950 may identify, based on a previous channel status information associated with each reference signal resource, a subset of reference signal resources of the at least one reference signal resource set. In some examples, determining, based on the configuration, that the usage information for the at least one reference signal resource set includes non-codebook-based usage. In some examples, the SRS RS subset manager 950 may determine, based on the non-codebook-based usage and the number of spatial layers of CLI, the channel status information associated with the CLI for the subset of reference signal resources.

The codebook usage manager 955 may identify, based on a previous channel status information associated with each reference signal resource, a reference signal resource of the at least one reference signal resource set. In some examples, determining, based on the configuration, that the usage information for the at least one reference signal resource set includes codebook-based usage.

In some examples, the codebook usage manager 955 may determine, based on the codebook-based usage and the number of spatial layers of CLI, the channel status information associated with the CLI for the reference signal resource. In some examples, the codebook usage manager 955 may transmit, based on the codebook-based usage, the CLI feedback message indicating the channel status information for a reference signal resource in the at least one reference signal resource set.

The non-codebook usage manager 960 may determine, based on the configuration, that the usage information for the at least one reference signal resource set includes non-codebook-based usage. In some examples, the non-codebook usage manager 960 may transmit, based on the non-codebook-based usage, the CLI feedback message indicating the channel status information for a subset of reference signal resources in the at least one reference signal resource set.

Figure 10:
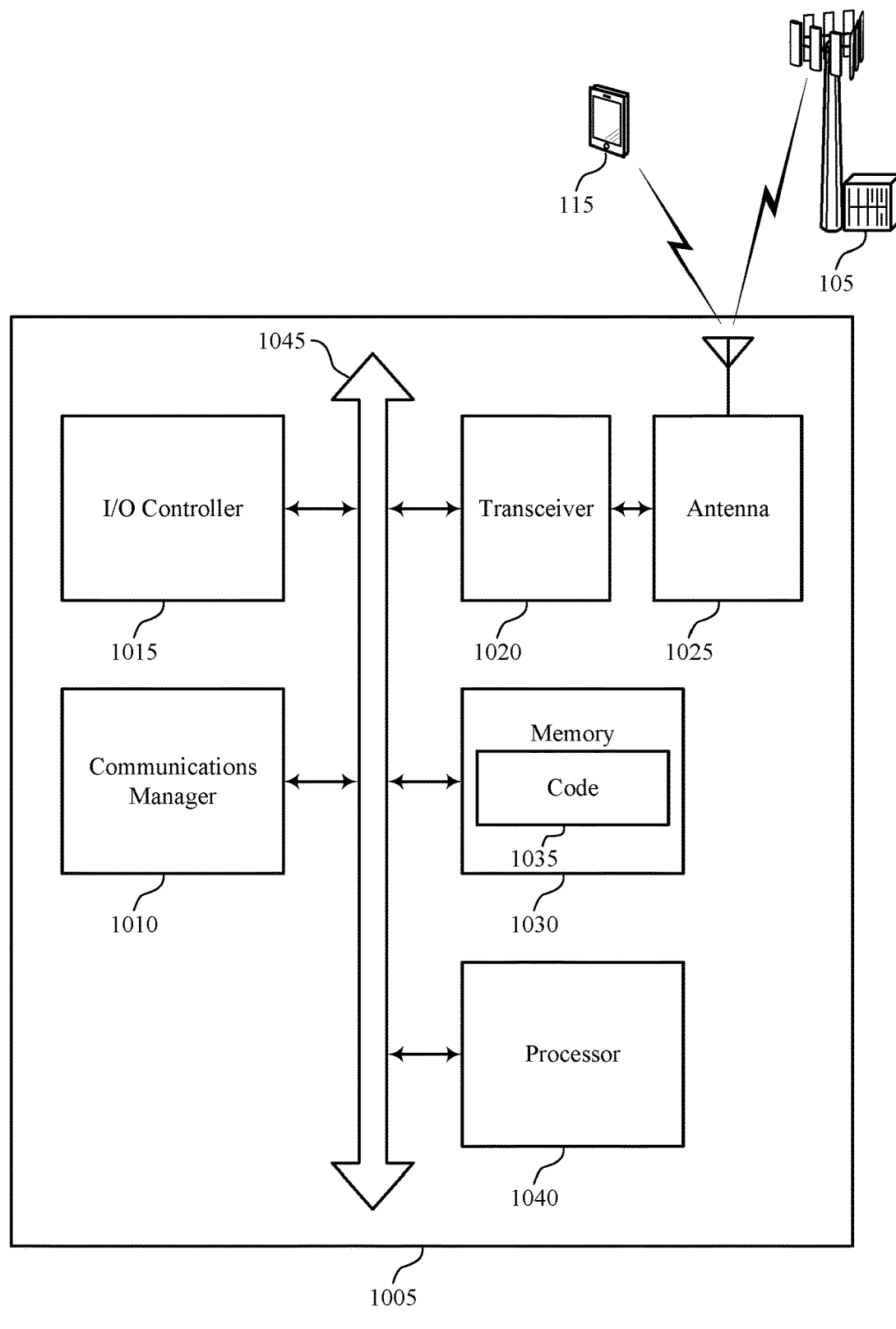
FIG. 10 shows a diagram of a system including a device that supports channel status report based on sounding reference signal resource usage in full duplex in accordance with aspects of the present disclosure.

FIG. 10 shows a diagram of a system 1000 including a device 1005 that supports channel status report based on SRS resource usage in full duplex in accordance with aspects of the present disclosure. The device 1005 may be an example of or include the components of device 705, device 805, an IAB node, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a configuration for transmitting a CLI feedback message, the configuration indicating at least one reference signal resource set to be monitored by the UE for CLI from an interfering device, the configuration also indicating usage information for the at least one reference signal resource set, determine, based on the usage information, a number of spatial layers of CLI associated with the interfering device, determine channel status information associated with the CLI based on the number of spatial layers, and transmit the CLI feedback message indicating the channel status information.

The communications manager 1010 may receive, from a parent IAB node, a CSI report configuration for generation of a CSI report associated with monitoring, by the IAB node, at least one CSI-RS resource set, the configuration also indicating usage information for the at least one CSI-RS resource set; transmit a CSI resource configuration to a downstream node, the CSI resource configuration indicating, based at least in part on the usage information, a number of spatial layers of cross-link interference associated with the parent IAB node; and receive, from the downstream node, the CSI report indicating CSI, the CSI associated with the cross-link interference based at least in part on the number of spatial layers.

The communications manager 1010 may transmit, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node; transmit, to the downstream node, a SRS transmission configuration indicating the at least one reference signal resource set to be used in transmitting the SRSs, the configuration indicating the usage information for the at least one reference signal resource set; and receive, from the parent IAB node, an uplink resource configuration that is based at least in part on the measuring of the CLI determined from the SRSs and based at least in part on the number of spatial layers.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting channel status report based on sounding reference signal resource usage in full duplex).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
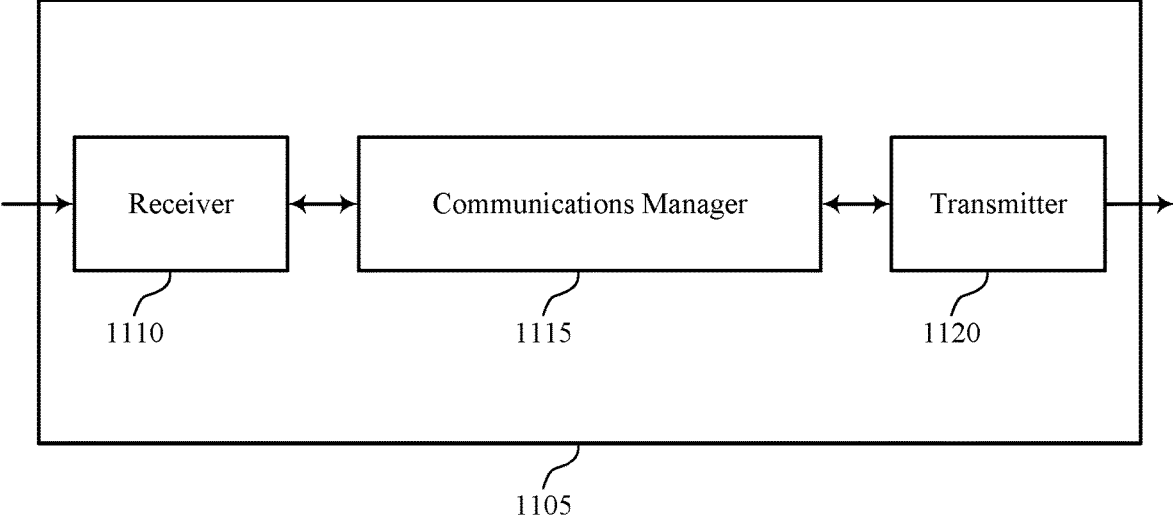
FIGS. 11 and 12 show block diagrams of devices that support channel status report based on sounding reference signal resource usage in full duplex in accordance with aspects of the present disclosure.

FIG. 11 shows a block diagram 1100 of a device 1105 that supports channel status report based on sounding reference signal resource usage in full duplex in accordance with aspects of the present disclosure. The device 1105 may be an example of aspects of a base station 105, or an IAB node as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to channel status report based on sounding reference signal resource usage in full duplex, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine, for CLI measurement by a UE of CLI from an interfering device, at least one reference signal resource set and usage information for the at least one reference signal resource set, transmit, to the UE, a configuration for transmitting a CLI feedback message, the configuration indicating the at least one reference signal resource set to be monitored by the UE for CLI from the interfering device, the configuration also indicating the usage information for the at least one reference signal resource set, and receive, from the UE, the CLI feedback message indicating channel status information associated with the CLI, the channel status information being based on the usage information. The communications manager 1115 may be an example of aspects of the communications manager 1410 described herein.

The communications manager 1115 may receive, from a parent IAB node, a CSI report configuration for generation of a CSI report associated with monitoring, by the IAB node, at least one CSI-RS resource set, the configuration also indicating usage information for the at least one CSI-RS resource set; transmit a CSI resource configuration to a downstream node, the CSI resource configuration indicating, based at least in part on the usage information, a number of spatial layers of cross-link interference associated with the parent IAB node; and receive, from the downstream node, the CSI report indicating CSI, the CSI associated with the cross-link interference based at least in part on the number of spatial layers.

The communications manager 1115 may transmit, to a parent IAB node, a SRS measurement configuration for measuring, by the parent IAB node, CLI on at least one reference signal resource set to be used by a downstream node in transmitting SRSs, the configuration also indicating, based at least in part on usage information for the at least one reference signal resource set, a number of spatial layers of CLI associated with the downstream node; transmit, to the downstream node, a SRS transmission configuration indicating the at least one reference signal resource set to be used in transmitting the SRSs, the configuration indicating the usage information for the at least one reference signal resource set; and receive, from the parent IAB node, an uplink resource configuration that is based at least in part on the measuring of the CLI determined from the SRSs and based at least in part on the number of spatial layers.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
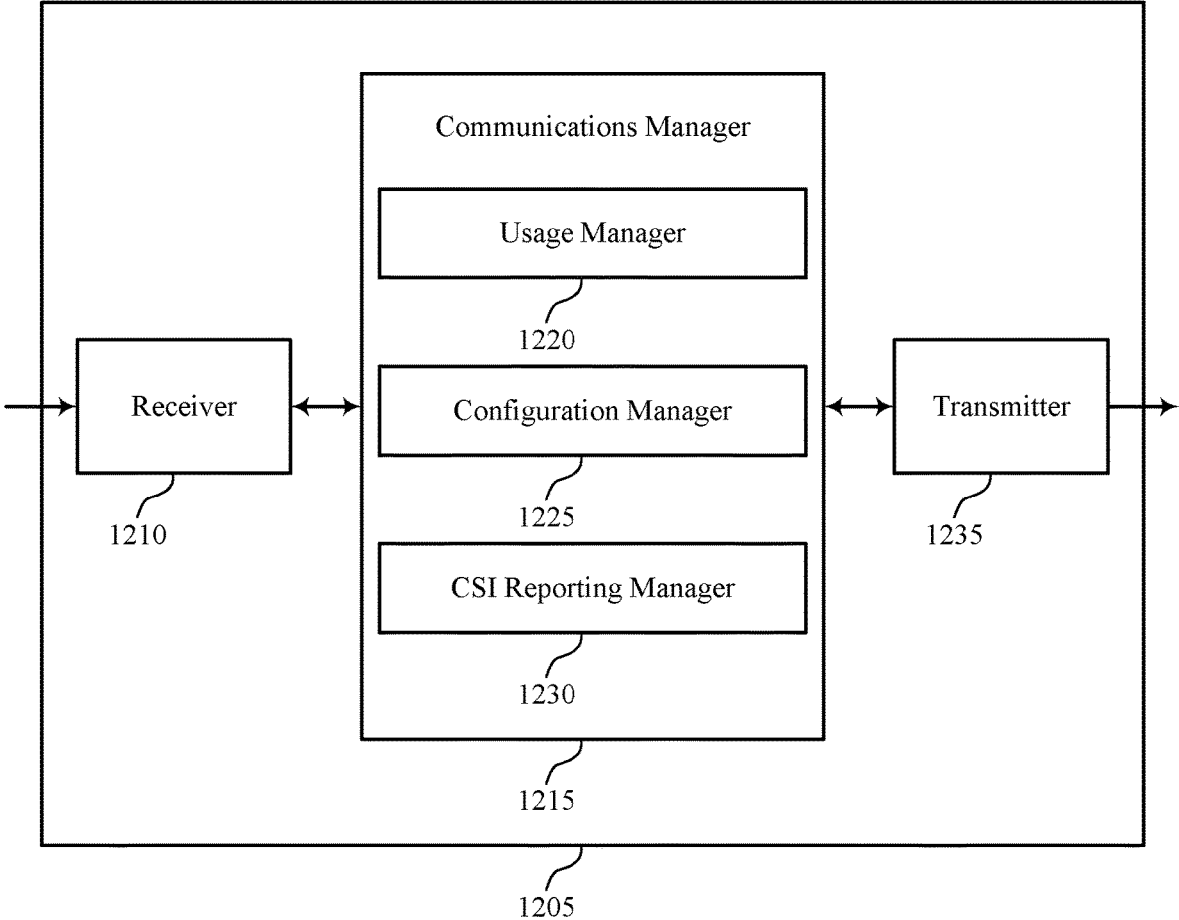

FIG. 12 shows a block diagram 1200 of a device 1205 that supports channel status report based on SRS resource usage in full duplex in accordance with aspects of the present disclosure. The device 1205 may be an example of aspects of a device 1205, or an IAB node, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to channel status report based on sounding reference signal resource usage in full duplex, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a usage manager 1220, a configuration manager 1225, and a CSI reporting manager 1230. The communications manager 1215 may be an example of aspects of the communications manager 1410 described herein.

The usage manager 1220 may determine, for CLI measurement by a UE of CLI from an interfering device, at least one reference signal resource set and usage information for the at least one reference signal resource set.

The usage manager 1220 may receive, from a parent IAB node, a CSI report configuration for generation of a CSI report associated with monitoring, by the IAB node, at least one CSI-RS resource set, the configuration also indicating usage information for the at least one CSI-RS resource set.

The usage manager 1220 may transmit, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node.

The configuration manager 1225 may transmit, to the UE, a configuration for transmitting a CLI feedback message, the configuration indicating the at least one reference signal resource set to be monitored by the UE for CLI from the interfering device, the configuration also indicating the usage information for the at least one reference signal resource set.

The configuration manager 1225 may transmit a CSI resource configuration to a downstream node, the CSI resource configuration indicating, based at least in part on the usage information, a number of spatial layers of CLI associated with the parent IAB node.

The configuration manager 1225 may transmit, to the downstream node, a SRS transmission configuration indicating the at least one reference signal resource set to be used in transmitting the SRSs, the configuration indicating the usage information for the at least one reference signal resource set.

The CSI reporting manager 1230 may receive, from the UE, the CLI feedback message indicating channel status information associated with the CLI, the channel status information being based on the usage information.

The CSI reporting manager 1230 may receive, from the downstream node, the CSI report indicating CSI, the CSI associated with the cross-link interference based at least in part on the number of spatial layers.

The CSI reporting manager 1230 may receive, from the parent IAB node, an uplink resource configuration that is based at least in part on the measuring of the CLI determined from the SRSs and based at least in part on the number of spatial layers.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
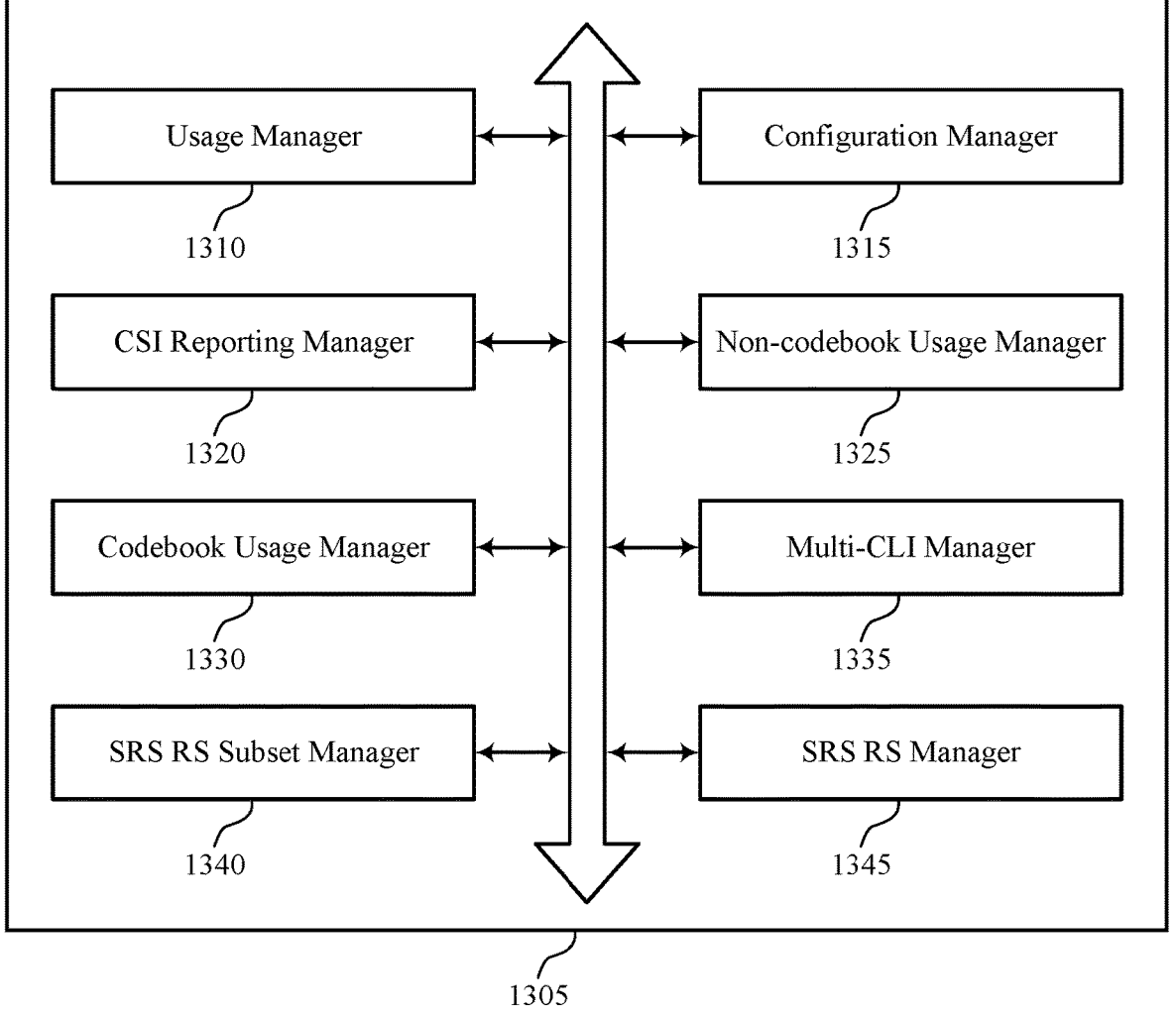
FIG. 13 shows a block diagram of a communications manager that supports channel status report based on sounding reference signal resource usage in full duplex in accordance with aspects of the present disclosure.

FIG. 13 shows a block diagram 1300 of a communications manager 1305 that supports channel status report based on SRS resource usage in full duplex in accordance with aspects of the present disclosure. The communications manager 1305 may be an example of aspects of a communications manager 1115, a communications manager 1215, or a communications manager 1410 described herein. The communications manager 1305 may include an usage manager 1310, a configuration manager 1315, a CSI reporting manager 1320, a non-codebook usage manager 1325, a codebook usage manager 1330, a multi-CLI manager 1335, a SRS RS subset manager 1340, and a SRS RS manager 1345. Each of these modules may communicate, directly or indirectly, with one another (e.g., via one or more buses).

The usage manager 1310 may determine, for CLI measurement by a UE of CLI from an interfering device, at least one reference signal resource set and usage information for the at least one reference signal resource set.

The configuration manager 1315 may transmit, to the UE, a configuration for transmitting a CLI feedback message, the configuration indicating the at least one reference signal resource set to be monitored by the UE for CLI from the interfering device, the configuration also indicating the usage information for the at least one reference signal resource set. In some cases, the configuration is transmitted in at least one of a RRC message, or a MAC CE, or a DCI, or a combination thereof.

The configuration manager 1315 may receive, from a parent IAB node, a CSI report configuration for generation of a CSI report associated with monitoring, by the IAB node, at least one CSI-RS resource set, the configuration also indicating usage information for the at least one CSI-RS resource set. In some examples, the CSI report configuration may be received in at least one of RRC message, or a MAC CE, or a DCI, or a combination thereof. In some examples, the downstream node is a downstream IAB node or a UE.

The configuration manager 1315 may transmit a CSI resource configuration to a downstream node, the CSI resource configuration indicating, based at least in part on the usage information, a number of spatial layers of cross-link interference associated with the parent IAB node.

The configuration manager 1315 may transmit, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node. In some examples, the SRS measurement configuration is transmitted in at least one of a RRC message, or a MAC CE, or a DCI, or a combination thereof. In some examples, the CSI is based at least in part on the IAB node operating in a full-duplex communication with the downstream node.

The configuration manager 1315 may transmit, to the downstream node, a SRS transmission configuration indicating the at least one reference signal resource set to be used in transmitting the SRSs, the configuration indicating the usage information for the at least one reference signal resource set.

The CSI reporting manager 1320 may receive, from the UE, the CLI feedback message indicating channel status information associated with the CLI, the channel status information being based on the usage information. In some cases, the channel status information is based on the UE operating in a full-duplex communication with the interfering device.

The CSI reporting manager 1320 may receive, from the downstream node, the CSI report indicating CSI, the CSI associated with the cross-link interference based at least in part on the number of spatial layers. In some examples, the CSI may be based at least in part on the IAB node operating in a full-duplex communication with the downstream node.

The CSI reporting manager 1320 may transmit, to the parent IAB node and according to the CSI report configuration, a second CSI report indicating CSI obtained based on monitoring the at least one CSI-RS resource set, the second CSI report indicating the CSI report received from the downstream node.

The CSI reporting manager 1320 may identify, based at least in part on the CSI report, a number of interference spatial layers, the number of interference spatial layers being equal to or less than a number of CSI-RS ports associated with the at least one CSI-RS resource set.

The CSI reporting manager 1320 may identify, based at least in part on the CSI report, a PMI associated with a number of interference spatial layers.

The non-codebook usage manager 1325 may determine that the usage information for the at least one reference signal resource set includes non-codebook-based usage. In some examples, the non-codebook usage manager 1325 may include an indication of a number of spatial layers in the configuration.

The codebook usage manager 1330 may determine that the usage information for the at least one reference signal resource set includes codebook-based usage. In some examples, the codebook usage manager 1330 may include an indication of a number of antenna ports of at least one reference signal resource of the at least one reference signal resource set in the configuration.

The multi-CLI manager 1335 may determine that there are a set of interfering devices associated with the UE, each interfering device associated with a corresponding set of reference signal resources having a same usage information. In some examples, the multi-CLI manager 1335 may combine, based on the same usage information, the corresponding set of reference signal resources for each interfering device into the indication of the at least one reference signal resources set.

In some examples, the multi-CLI manager 1335 may identify, based on a SRI and associated CLI level indicated in the CLI message, an interference level associated with at least one interfering device of the set of interfering devices.

The SRS RS subset manager 1340 may receive, based on the non-codebook-based usage, the CLI feedback message indicating the channel status information for a subset of reference signal resources in the at least one reference signal resource set.

The SRS RS manager 1345 may receive, based on the codebook-based usage, the CLI feedback message indicating the channel status information for a reference signal resource in the at least one reference signal resource set.

Figure 14:
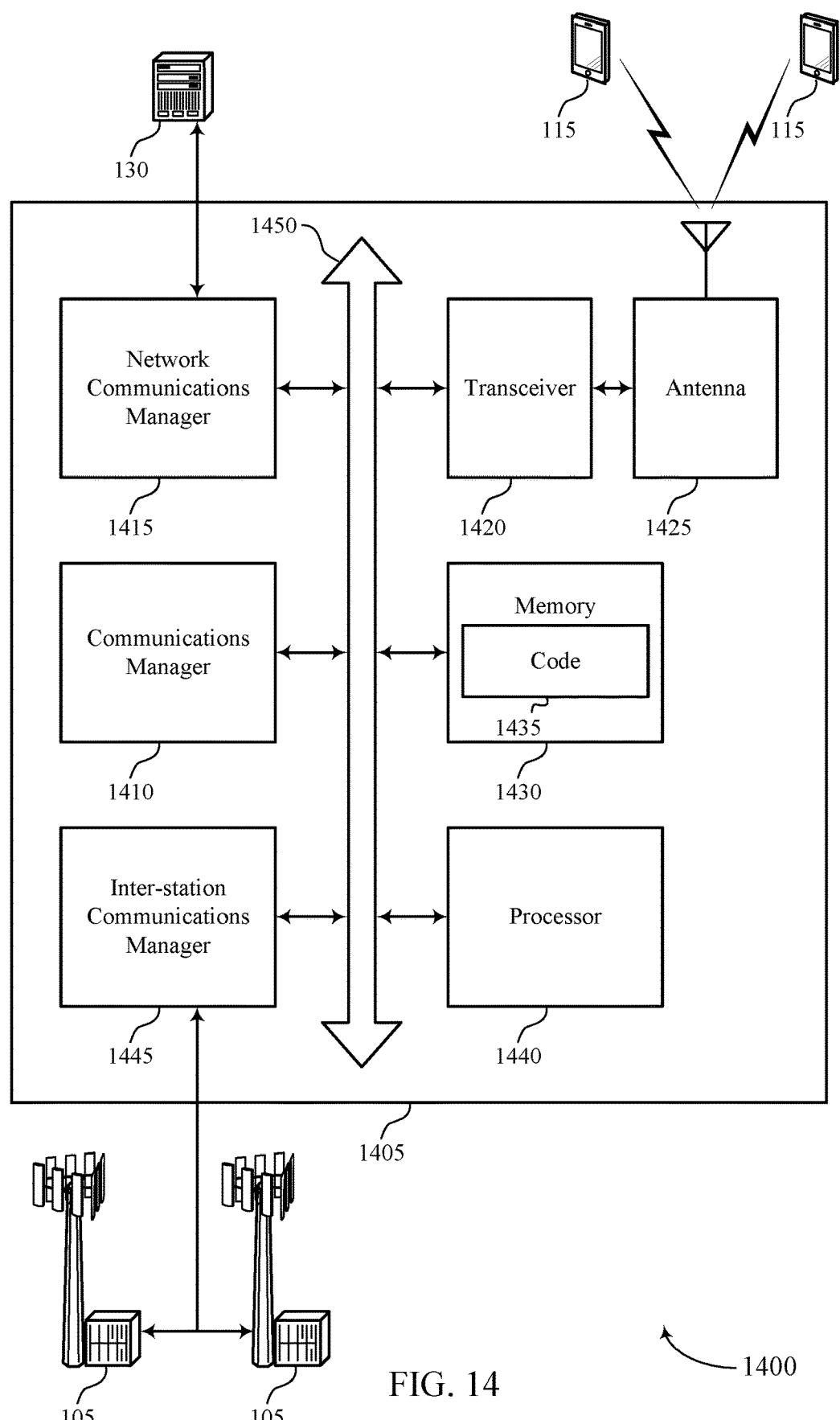
FIG. 14 shows a diagram of a system including a device that supports channel status report based on sounding reference signal resource usage in full duplex in accordance with aspects of the present disclosure.

FIG. 14 shows a diagram of a system 1400 including a device 1405 that supports channel status report based on SRS resource usage in full duplex in accordance with aspects of the present disclosure. The device 1405 may be an example of or include the components of device 1105, device 1205, an IAB node, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine, for CLI measurement by a UE of CLI from an interfering device, at least one reference signal resource set and usage information for the at least one reference signal resource set, transmit, to the UE, a configuration for transmitting a CLI feedback message, the configuration indicating the at least one reference signal resource set to be monitored by the UE for CLI from the interfering device, the configuration also indicating the usage information for the at least one reference signal resource set, and receive, from the UE, the CLI feedback message indicating channel status information associated with the CLI, the channel status information being based on the usage information.

The communications manager 1410 may receiving, from a parent IAB node, a CSI report configuration for generation of a CSI report associated with monitoring, by the IAB node, at least one CSI-RS resource set, the configuration also indicating usage information for the at least one CSI-RS resource set; transmit a CSI resource configuration to a downstream node, the CSI resource configuration indicating, based at least in part on the usage information, a number of spatial layers of cross-link interference associated with the parent IAB node; and receive, from the downstream node, the CSI report indicating CSI, the CSI associated with the cross-link interference based at least in part on the number of spatial layers.

The communications manager 1410 may transmitting, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node; transmit, to the downstream node, a SRS transmission configuration indicating the at least one reference signal resource set to be used in transmitting the SRSs, the configuration indicating the usage information for the at least one reference signal resource set; and receive, from the parent IAB node, an uplink resource configuration that is based at least in part on the measuring of the CLI determined from the SRSs and based at least in part on the number of spatial layers.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random access memory (RAM), read-only memory (ROM), or a combination thereof. The memory 1430 may store computer-readable code 1435 including instructions that, when executed by a processor (e.g., the processor 1440) cause the device to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting channel status report based on sounding reference signal resource usage in full duplex).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

FIG. 15 shows a flowchart illustrating a method 1500 that supports channel status report based on SRS resource usage in full duplex in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a configuration for transmitting a CLI feedback message, the configuration indicating at least one reference signal resource set to be monitored by the UE for CLI from an interfering device, the configuration also indicating usage information for the at least one reference signal resource set. The operations of 1505 may be performed according to the methods described herein. In some examples, aspects of the operations of 1505 may be performed by a configuration manager as described with reference to FIGS. 7 through 10.

At 1510, the UE may determine, based on the usage information, a number of spatial layers of CLI associated with the interfering device. The operations of 1510 may be performed according to the methods described herein. In some examples, aspects of the operations of 1510 may be performed by a spatial layer manager as described with reference to FIGS. 7 through 10.

At 1515, the UE may determine channel status information associated with the CLI based on the number of spatial layers. The operations of 1515 may be performed according to the methods described herein. In some examples, aspects of the operations of 1515 may be performed by a CSI manager as described with reference to FIGS. 7 through 10.

At 1520, the UE may transmit the CLI feedback message indicating the channel status information. The operations of 1520 may be performed according to the methods described herein. In some examples, aspects of the operations of 1520 may be performed by a CSI reporting manager as described with reference to FIGS. 7 through 10.

FIG. 16 shows a flowchart illustrating a method 1600 that supports channel status report based on SRS resource usage in full duplex in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a configuration for transmitting a CLI feedback message, the configuration indicating at least one reference signal resource set to be monitored by the UE for CLI from an interfering device, the configuration also indicating usage information for the at least one reference signal resource set. The operations of 1605 may be performed according to the methods described herein. In some examples, aspects of the operations of 1605 may be performed by a configuration manager as described with reference to FIGS. 7 through 10.

At 1610, the UE may determine that the configuration indicates a reference signal resource in the at least one reference signal resource set. The operations of 1610 may be performed according to the methods described herein. In some examples, aspects of the operations of 1610 may be performed by a SRS RS manager as described with reference to FIGS. 7 through 10.

At 1615, the UE may determine, based on the configuration, that the usage information for the reference signal resource includes a codebook-based usage. The operations of 1615 may be performed according to the methods described herein. In some examples, aspects of the operations of 1615 may be performed by a SRS RS manager as described with reference to FIGS. 7 through 10.

At 1620, the UE may determine, based on the usage information, a number of spatial layers of CLI associated with the interfering device. The operations of 1620 may be performed according to the methods described herein. In some examples, aspects of the operations of 1620 may be performed by a spatial layer manager as described with reference to FIGS. 7 through 10.

At 1625, the UE may determine, based on the codebook-based usage, that the number of spatial layers of CLI includes a number of antenna ports of a reference signal resource in the at least one reference signal resource set. The operations of 1625 may be performed according to the methods described herein. In some examples, aspects of the operations of 1625 may be performed by a SRS RS manager as described with reference to FIGS. 7 through 10.

At 1630, the UE may determine channel status information associated with the CLI based on the number of spatial layers. The operations of 1630 may be performed according to the methods described herein. In some examples, aspects of the operations of 1630 may be performed by a CSI manager as described with reference to FIGS. 7 through 10.

At 1635, the UE may transmit the CLI feedback message indicating the channel status information. The operations of 1635 may be performed according to the methods described herein. In some examples, aspects of the operations of 1635 may be performed by a CSI reporting manager as described with reference to FIGS. 7 through 10.

FIG. 17 shows a flowchart illustrating a method 1700 that supports channel status report based on SRS resource usage in full duplex in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a configuration for transmitting a CLI feedback message, the configuration indicating at least one reference signal resource set to be monitored by the UE for CLI from an interfering device, the configuration also indicating usage information for the at least one reference signal resource set. The operations of 1705 may be performed according to the methods described herein. In some examples, aspects of the operations of 1705 may be performed by a configuration manager as described with reference to FIGS. 7 through 10.

At 1710, the UE may determine that the configuration indicates a set of reference signal resources in the at least one reference signal resource set. The operations of 1710 may be performed according to the methods described herein. In some examples, aspects of the operations of 1710 may be performed by a multi-SRS RS manager as described with reference to FIGS. 7 through 10.

At 1715, the UE may select, based on a previously determined channel status information, a reference signal resource from the set of reference signal resources. The operations of 1715 may be performed according to the methods described herein. In some examples, aspects of the operations of 1715 may be performed by a multi-SRS RS manager as described with reference to FIGS. 7 through 10.

At 1720, the UE may determine, based on the usage information, a number of spatial layers of CLI associated with the interfering device. The operations of 1720 may be performed according to the methods described herein. In some examples, aspects of the operations of 1720 may be performed by a spatial layer manager as described with reference to FIGS. 7 through 10.

At 1725, the UE may determine, based on the configuration, that the usage information for the selected reference signal resource includes a codebook-based usage. The operations of 1725 may be performed according to the methods described herein. In some examples, aspects of the operations of 1725 may be performed by a multi-SRS RS manager as described with reference to FIGS. 7 through 10.

At 1730, the UE may determine, based on the codebook-based usage, that the number of spatial layers of CLI includes a number of antenna ports of the reference signal resource. The operations of 1730 may be performed according to the methods described herein. In some examples, aspects of the operations of 1730 may be performed by a multi-SRS RS manager as described with reference to FIGS. 7 through 10.

At 1735, the UE may determine channel status information associated with the CLI based on the number of spatial layers. The operations of 1735 may be performed according to the methods described herein. In some examples, aspects of the operations of 1735 may be performed by a CSI manager as described with reference to FIGS. 7 through 10.

At 1740, the UE may transmit the CLI feedback message indicating the channel status information. The operations of 1740 may be performed according to the methods described herein. In some examples, aspects of the operations of 1740 may be performed by a CSI reporting manager as described with reference to FIGS. 7 through 10.

FIG. 18 shows a flowchart illustrating a method 1800 that supports channel status report based on SRS resource usage in full duplex in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may determine, for CLI measurement by a UE of CLI from an interfering device, at least one reference signal resource set and usage information for the at least one reference signal resource set. The operations of 1805 may be performed according to the methods described herein. In some examples, aspects of the operations of 1805 may be performed by an usage manager as described with reference to FIGS. 11 through 14.

At 1810, the base station may transmit, to the UE, a configuration for transmitting a CLI feedback message, the configuration indicating the at least one reference signal resource set to be monitored by the UE for CLI from the interfering device, the configuration also indicating the usage information for the at least one reference signal resource set. The operations of 1810 may be performed according to the methods described herein. In some examples, aspects of the operations of 1810 may be performed by a configuration manager as described with reference to FIGS. 11 through 14.

At 1815, the base station may receive, from the UE, the CLI feedback message indicating channel status information associated with the CLI, the channel status information being based on the usage information. The operations of 1815 may be performed according to the methods described herein. In some examples, aspects of the operations of 1815 may be performed by a CSI reporting manager as described with reference to FIGS. 11 through 14.

FIG. 19 shows a flowchart illustrating a method 1900 that supports channel status report based on SRS resource usage in full duplex in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may determine, for CLI measurement by a UE of CLI from an interfering device, at least one reference signal resource set and usage information for the at least one reference signal resource set. The operations of 1905 may be performed according to the methods described herein. In some examples, aspects of the operations of 1905 may be performed by an usage manager as described with reference to FIGS. 11 through 14.

At 1910, the base station may determine that the usage information for the at least one reference signal resource set includes non-codebook-based usage. The operations of 1910 may be performed according to the methods described herein. In some examples, aspects of the operations of 1910 may be performed by a non-codebook usage manager as described with reference to FIGS. 11 through 14.

At 1915, the base station may transmit, to the UE, a configuration for transmitting a CLI feedback message, the configuration indicating the at least one reference signal resource set to be monitored by the UE for CLI from the interfering device, the configuration also indicating the usage information for the at least one reference signal resource set. The operations of 1915 may be performed according to the methods described herein. In some examples, aspects of the operations of 1915 may be performed by a configuration manager as described with reference to FIGS. 11 through 14.

At 1920, the base station may include an indication of a number of spatial layers in the configuration. The operations of 1920 may be performed according to the methods described herein. In some examples, aspects of the operations of 1920 may be performed by a non-codebook usage manager as described with reference to FIGS. 11 through 14.

At 1925, the base station may receive, from the UE, the CLI feedback message indicating channel status information associated with the CLI, the channel status information being based on the usage information. The operations of 1925 may be performed according to the methods described herein. In some examples, aspects of the operations of 1925 may be performed by a CSI reporting manager as described with reference to FIGS. 11 through 14.

FIG. 20 shows a flowchart illustrating a method 2000 that supports channel status report based on SRS resource usage in full duplex in accordance with aspects of the present disclosure. The operations of method 2000 may be implemented by an IAB node, which may be an example of a base station 105 or UE 115 or sub-components as described herein. For example, the operations of method 2000 may be performed by a communications manager as described with reference to FIGS. 7 through 9 and 11 through 14. In some examples, an IAB node may execute a set of instructions to control the functional elements of the IAB node to perform the functions described below. Additionally or alternatively, an IAB node may perform aspects of the functions described below using special-purpose hardware.

At 2005, the IAB node may receive, from a parent IAB node, a CSI report configuration for generation of a CSI report associated with monitoring, by the IAB node, at least one CSI-RS resource set, the configuration also indicating usage information for the at least one CSI-RS resource set. The operations of 2005 may be performed according to the methods described herein. In some examples, aspects of the operations of 2005 may be performed by an usage manager as described with reference to FIGS. 7 through 9 and 11 through 14.

At 2010, the IAB node may transmit a CSI resource configuration to a downstream node, the CSI resource configuration indicating, based at least in part on the usage information, a number of spatial layers of cross-link interference associated with the parent IAB node. The operations of 2010 may be performed according to the methods described herein. In some examples, aspects of the operations of 2010 may be performed by a non-codebook usage manager as described with reference to FIGS. 7 through 9 and 11 through 14.

At 2015, the IAB node may receive, from the downstream node, the CSI report indicating CSI, the CSI associated with the cross-link interference based at least in part on the number of spatial layers. The operations of 2015 may be performed according to the methods described herein. In some examples, aspects of the operations of 2015 may be performed by a configuration manager as described with reference to FIGS. 7 through 9 or 11 through 14.

FIG. 21 shows a flowchart illustrating a method 2100 that supports channel status report based on SRS resource usage in full duplex in accordance with aspects of the present disclosure. The operations of method 2100 may be implemented by an IAB node, which may be an example of a base station 105 or UE 115 or sub-components as described herein. For example, the operations of method 2100 may be performed by a communications manager as described with reference to FIGS. 7 through 9 and 11 through 14. In some examples, an IAB node may execute a set of instructions to control the functional elements of the IAB node to perform the functions described below. Additionally or alternatively, an IAB node may perform aspects of the functions described below using special-purpose hardware.

At 2105, the IAB node may transmit, to a parent IAB node, a SRS measurement configuration for measuring, by the parent IAB node, cross-link interference on at least one reference signal resource set to be used by a downstream node in transmitting SRSs, the configuration also indicating, based at least in part on usage information for the at least one reference signal resource set, a number of spatial layers of CLI associated with the downstream node. The operations of 2105 may be performed according to the methods described herein. In some examples, aspects of the operations of 2105 may be performed by an usage manager as described with reference to FIGS. 7 through 9 and 11 through 14.

At 2110, the IAB node may transmit, to the downstream node, a SRS transmission configuration indicating the at least one reference signal resource set to be used in transmitting the SRSs, the configuration indicating the usage information for the at least one reference signal resource set;. The operations of 2110 may be performed according to the methods described herein. In some examples, aspects of the operations of 2110 may be performed by a non-codebook usage manager as described with reference to FIGS. 7 through 9 and 11 through 14.

At 2115, the IAB node may receive, from the parent IAB node, an uplink resource configuration that is based at least in part on the measuring of the CLI determined from the SRSs and based at least in part on the number of spatial layers. The operations of 2115 may be performed according to the methods described herein. In some examples, aspects of the operations of 2115 may be performed by a configuration manager as described with reference to FIGS. 7 through 9 or 11 through 14.

The following provides an overview of aspects of the present disclosure:

Aspect 1: A method for wireless communication at an IAB node, comprising: receiving, from a parent IAB node, a CSI report configuration for generation of a CSI report associated with monitoring, by the IAB node, at least one CSI-RS resource set, the configuration also indicating usage information for the at least one CSI-RS resource set; transmitting a CSI resource configuration to a downstream node, the CSI resource configuration indicating, based at least in part on the usage information, a number of spatial layers of CLI associated with the parent IAB node; and receiving, from the downstream node, the CSI report indicating CSI, the CSI associated with the CLI based at least in part on the number of spatial layers.

Aspect 2: The method of aspect 1, further comprising: identifying, based at least in part on the CSI report, a number of interference spatial layers, the number of interference spatial layers being equal to or less than a number of CSI-RS ports associated with the at least one CSI-RS resource set.

Aspect 3: The method of any of aspects 1 through 2, further comprising: identifying, based at least in part on the CSI report, a PMI associated with a number of interference spatial layers.

Aspect 4: The method of any of aspects 1 through 3, further comprising: transmitting, to the parent IAB node and according to the CSI report configuration, a second CSI report indicating CSI obtained based on monitoring the at least one CSI-RS resource set, the second CSI report indicating the CSI report received from the downstream node.

Aspect 5: The method of any of aspects 1 through 4, wherein the configuration is received in at least one of an RRC message, or a MAC CE, or a DCI, or a combination thereof.

Aspect 6: The method of any of aspects 1 through 5, wherein the CSI is based at least in part on the IAB node operating in a full-duplex communication with the downstream node.

Aspect 7: The method of any of aspects 1 through 6, wherein the downstream node comprises a downstream IAB node or a UE.

Aspect 8: A method for wireless communication at an IAB node, comprising: transmitting, to a parent IAB node, a sounding reference signal measurement configuration for measuring, by the parent IAB node, CLI on at least one reference signal resource set to be used by a downstream node in transmitting sounding reference signals, the configuration also indicating, based at least in part on usage information for the at least one reference signal resource set, a number of spatial layers of CLI associated with the downstream node; transmitting, to the downstream node, a sounding reference signal transmission configuration indicating the at least one reference signal resource set to be used in transmitting the sounding reference signals, the configuration indicating the usage information for the at least one reference signal resource set; and receiving, from the parent IAB node, an uplink resource configuration that is based at least in part on the measuring of the CLI determined from the sounding reference signals and based at least in part on the number of spatial layers.

Aspect 9: The method of aspect 8, wherein the sounding reference signal measurement configuration is transmitted in at least one of an RRC message, or a MAC CE, or a DCI, or a combination thereof.

Aspect 10: The method of any of aspects 8 through 9, wherein the CSI is based at least in part on the IAB node operating in a full-duplex communication with the downstream node.

Aspect 11: A method for wireless communication at a UE, comprising: receiving a configuration for transmitting a CLI feedback message, the configuration indicating at least one reference signal resource set to be monitored by the UE for CLI from an interfering device, the configuration also indicating usage information for the at least one reference signal resource set; determining, based at least in part on the usage information, a number of spatial layers of CLI associated with the interfering device; determining CSI associated with the CLI based at least in part on the number of spatial layers; and transmitting the CLI feedback message indicating the CSI.

Aspect 12: The method of aspect 11, wherein receiving the configuration comprises: receiving, with the configuration, an indication of a number of antenna ports of at least one reference signal resource of the at least one reference signal resource set.

Aspect 13: The method of any of aspects 11 through 12, further comprising: determining that the configuration indicates a reference signal resource in the at least one reference signal resource set; determining, based at least in part on the configuration, that the usage information for the reference signal resource comprises a codebook-based usage; and determining, based at least in part on the codebook-based usage, that the number of spatial layers of CLI comprises a number of antenna ports of a reference signal resource in the at least one reference signal resource set.

Aspect 14: The method of any of aspects 11 through 13, further comprising: determining that the configuration indicates a plurality of reference signal resources in the at least one reference signal resource set; selecting, based at least in part on a previously determined CSI, a reference signal resource from the plurality of reference signal resources; determining, based at least in part on the configuration, that the usage information for the selected reference signal resource comprises a codebook-based usage; and determining, based at least in part on the codebook-based usage, that the number of spatial layers of CLI comprises a number of antenna ports of the reference signal resource.

Aspect 15: The method of any of aspects 11 through 14, wherein receiving the configuration comprises: receiving, with the configuration, an indication of the number of spatial layers of CLI associated with the interfering device.

Aspect 16: The method of aspect 15, further comprising: determining, based at least in part on the configuration, that the usage information for the at least one reference signal resource set comprises a non-codebook-based usage and a number of reference signal resources in the at least one reference signal resource set; determining that the number of reference signal resources is the same or less than the number of spatial layers of the uplink transmission from the interfering device; and determining, based at least in part on the number of reference signal resources being the same or less than the number of spatial layers and the non-codebook-based usage, that the number of spatial layers of CLI comprise the number of reference signal resources.

Aspect 17: The method of any of aspects 15 through 16, further comprising: determining, based at least in part on the configuration, that the usage information for the at least one reference signal resource set comprises non-codebook-based usage and a number of reference signal resources in the at least one reference signal resource set; determining that the number of reference signal resources is the greater than the number of spatial layers of the uplink transmission from the interfering device; and determining, based at least in part on the number of reference signal resources being greater than the number of spatial layers and the non-codebook-based usage, that the number of spatial layers of CLI comprise the number of spatial layers configured of the uplink transmission.

Aspect 18: The method of any of aspects 11 through 17, further comprising: identifying, based at least in part on a previous CSI associated with each reference signal resource, a subset of reference signal resources of the at least one reference signal resource set; determining, based at least in part on the configuration, that the usage information for the at least one reference signal resource set comprises non-codebook-based usage; and determining, based at least in part on the non-codebook-based usage and the number of spatial layers of CLI, the CSI associated with the CLI for the subset of reference signal resources.

Aspect 19: The method of any of aspects 11 through 18, further comprising: identifying, based at least in part on a previous CSI associated with each reference signal resource, a reference signal resource of the at least one reference signal resource set; determining, based at least in part on the configuration, that the usage information for the at least one reference signal resource set comprises codebook-based usage; and determining, based at least in part on the code-book-based usage and the number of spatial layers of CLI, the CSI associated with the CLI for the reference signal resource.

Aspect 20: The method of any of aspects 11 through 19, further comprising: determining, based at least in part on the configuration, that the usage information for the at least one reference signal resource set comprises non-codebook-based usage; and transmitting, based at least in part on the non-codebook-based usage, the CLI feedback message indicating the CSI for a subset of reference signal resources in the at least one reference signal resource set.

Aspect 21: The method of any of aspects 11 through 20, further comprising: determining, based at least in part on the configuration, that the usage information for the at least one reference signal resource set comprises codebook-based usage; and transmitting, based at least in part on the codebook-based usage, the CLI feedback message indicating the CSI for a reference signal resource in the at least one reference signal resource set.

Aspect 22: The method of any of aspects 11 through 21, wherein the CLI feedback message indicates an SRI associated with the CLI.

Aspect 23: The method of aspect 22, wherein the CLI feedback message indicates one SRI based at least in part on the usage information for the at least one reference signal resource set comprising a codebook-based usage.

Aspect 24: The method of any of aspects 22 through 23, wherein the CLI feedback message indicates a number of SRIs equal to the number of spatial layers of CLI associated with the interfering device based at least in part on the usage information for the at least one reference signal resource set comprising a non-codebook-based usage.

Aspect 25: The method of any of aspects 11 through 24, wherein the configuration is received in at least one of an RRC message, or a MAC CE, or a DCI, or a combination thereof.

Aspect 26: The method of any of aspects 11 through 25, wherein the CSI is based at least in part on the UE operating in a full-duplex communication with the interfering device.

Aspect 27: A method for wireless communication at a base station, comprising: determining, for CLI measurement by a UE of CLI from an interfering device, at least one reference signal resource set and usage information for the at least one reference signal resource set; transmitting, to the UE, a configuration for transmitting a CLI feedback message, the configuration indicating the at least one reference signal resource set to be monitored by the UE for CLI from the interfering device, the configuration also indicating the usage information for the at least one reference signal resource set; and receiving, from the UE, the CLI feedback message indicating CSI associated with the CLI, the CSI being based on the usage information.

Aspect 28: The method of aspect 27, further comprising: determining that the usage information for the at least one reference signal resource set comprises non-codebook-based usage; and including an indication of a number of spatial layers in the configuration.

Aspect 29: The method of any of aspects 27 through 28, further comprising: determining that the usage information for the at least one reference signal resource set comprises codebook-based usage; and including an indication of a number of antenna ports of at least one reference signal resource of the at least one reference signal resource set in the configuration.

Aspect 30: The method of any of aspects 27 through 29, further comprising: determining that there are a plurality of interfering devices associated with the UE, each interfering device associated with a corresponding set of reference signal resources having a same usage information; and combining, based at least in part on the same usage information, the corresponding set of reference signal resources for each interfering device into the indication of the at least one reference signal resources set.

Aspect 31: The method of aspect 30, further comprising: identifying, based at least in part on an SRI and associated CLI level indicated in the CLI message, an interference level associated with at least one interfering device of the plurality of interfering devices.

Aspect 32: The method of any of aspects 27 through 31, wherein the configuration indicates that the usage information for the at least one reference signal resource set comprises non-codebook-based usage, comprising: receiving, based at least in part on the non-codebook-based usage, the CLI feedback message indicating the CSI for a subset of reference signal resources in the at least one reference signal resource set.

Aspect 33: The method of any of aspects 27 through 32, wherein the configuration indicates that the usage information for the at least one reference signal resource set comprises codebook-based usage, comprising: receiving, based at least in part on the codebook-based usage, the CLI feedback message indicating the CSI for a reference signal resource in the at least one reference signal resource set.

Aspect 34: The method of any of aspects 27 through 33, wherein the configuration is transmitted in at least one of an RRC message, or a MAC CE, or a DCI, or a combination thereof.

Aspect 35: The method of any of aspects 27 through 34, wherein the CSI is based at least in part on the UE operating in a full-duplex communication with the interfering device.

Aspect 36: An apparatus for wireless communication at an IAB node, comprising a processor; memory coupled with the processor; and instructions stored in the memory and executable by the processor to cause the apparatus to perform a method of any of aspects 1 through 7.

Aspect 37: An apparatus for wireless communication at an IAB node, comprising at least one means for performing a method of any of aspects 1 through 7.

Aspect 38: A non-transitory computer-readable medium storing code for wireless communication at an IAB node, the code comprising instructions executable by a processor to perform a method of any of aspects 1 through 7.

Aspect 39: An apparatus for wireless communication at an IAB node, comprising a processor; memory coupled with the processor; and instructions stored in the memory and executable by the processor to cause the apparatus to perform a method of any of aspects 8 through 10.

Aspect 40: An apparatus for wireless communication at an IAB node, comprising at least one means for performing a method of any of aspects 8 through 10.

Aspect 41: A non-transitory computer-readable medium storing code for wireless communication at an IAB node, the code comprising instructions executable by a processor to perform a method of any of aspects 8 through 10.

Aspect 42: An apparatus for wireless communication at a UE, comprising a processor; memory coupled with the processor; and instructions stored in the memory and executable by the processor to cause the apparatus to perform a method of any of aspects 11 through 26.

Aspect 43: An apparatus for wireless communication at a UE, comprising at least one means for performing a method of any of aspects 11 through 26.

Aspect 44: A non-transitory computer-readable medium storing code for wireless communication at a UE, the code comprising instructions executable by a processor to perform a method of any of aspects 11 through 26.

Aspect 45: An apparatus for wireless communication at a base station, comprising a processor; memory coupled with the processor; and instructions stored in the memory and executable by the processor to cause the apparatus to perform a method of any of aspects 27 through 35.

Aspect 46: An apparatus for wireless communication at a base station, comprising at least one means for performing a method of any of aspects 27 through 35.

Aspect 47: A non-transitory computer-readable medium storing code for wireless communication at a base station, the code comprising instructions executable by a processor to perform a method of any of aspects 27 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving a configuration for transmitting a cross-link interference feedback message, the configuration indicating at least one reference signal resource set to be monitored by the UE for cross-link interference from an interfering device, the configuration also indicating usage information for the at least one reference signal resource set;

determining, based at least in part on the usage information, a number of spatial layers of the cross-link interference from the interfering device;

determining channel status information associated with the cross-link interference from the interfering device based at least in part on the number of spatial layers; and transmitting the cross-link interference feedback message indicating the channel status information.

2. The method of claim 1, wherein receiving the configuration comprises:

receiving, with the configuration, an indication of a number of antenna ports of at least one reference signal resource of the at least one reference signal resource set.

3. The method of claim 1, further comprising:

determining that the configuration indicates a reference signal resource in the at least one reference signal resource set;

determining, based at least in part on the configuration, that the usage information for the reference signal resource comprises a codebook-based usage; and determining, based at least in part on the codebook-based usage, that the number of spatial layers of the cross-link interference from the interfering device comprises a number of antenna ports of the reference signal resource in the at least one reference signal resource set.

4. The method of claim 1, further comprising:

determining that the configuration indicates a plurality of reference signal resources in the at least one reference signal resource set;

selecting, based at least in part on a previously determined channel status information, a reference signal resource from the plurality of reference signal resources;

determining, based at least in part on the configuration, that the usage information for the selected reference signal resource comprises a codebook-based usage; and determining, based at least in part on the codebook-based usage, that the number of spatial layers of the cross-link interference from the interfering device comprises a number of antenna ports of the reference signal resource.

5. A method for wireless communication at a network device, comprising:

determining, for cross-link interference measurement by a user equipment (UE) of cross-link interference from an interfering device, at least one reference signal resource set and usage information for the at least one reference signal resource set;

transmitting, to the UE, a configuration for transmitting a cross-link interference feedback message, the configuration indicating the at least one reference signal resource set to be monitored by the UE for the cross-link interference from the interfering device, the configuration also indicating the usage information for the at least one reference signal resource set, wherein:

the configuration comprises an indication of a number of spatial layers in accordance with the usage information comprising a non-codebook-based usage; or the configuration comprises an indication of a number of antenna ports of at least one reference signal resource of the at least one reference signal resource set in accordance with the usage information comprising a codebook-based usage; and receiving, from the UE, the cross-link interference feedback message indicating channel status information associated with the cross-link interference, the channel status information being based on the usage information.

6. An apparatus for wireless communication at a user equipment (UE), comprising:

a processor, memory coupled with the processor; and instructions stored in the memory and executable by the processor to cause the apparatus to:

receive a configuration for transmitting a cross-link interference feedback message, the configuration indicating at least one reference signal resource set to be monitored by the UE for cross-link interference from an interfering device, the configuration also indicating usage information for the at least one reference signal resource set;

determine, based at least in part on the usage information, a number of spatial layers of the cross-link interference from the interfering device;

determine channel status information associated with the cross-link interference from the interfering device based at least in part on the number of spatial layers of the cross-link interference from the interfering device; and transmit the cross-link interference feedback message indicating the channel status information.

7. The apparatus of claim 6, wherein the instructions to receive the configuration are executable by the processor to cause the apparatus to:

receive, with the configuration, an indication of a number of antenna ports of at least one reference signal resource of the at least one reference signal resource set.

8. The apparatus of claim 6, wherein the instructions are further executable by the processor to cause the apparatus to:

determine that the configuration indicates a reference signal resource in the at least one reference signal resource set;

determine, based at least in part on the configuration, that the usage information for the reference signal resource comprises a codebook-based usage; and determine, based at least in part on the codebook-based usage, that the number of spatial layers of the cross-link interference from the interfering device comprises a number of antenna ports of the reference signal resource in the at least one reference signal resource set.

9. The apparatus of claim 6, wherein the instructions are further executable by the processor to cause the apparatus to:

determine that the configuration indicates a plurality of reference signal resources in the at least one reference signal resource set;

select, based at least in part on a previous channel status information, a reference signal resource from the plurality of reference signal resources;

determine, based at least in part on the configuration, that the usage information for the selected reference signal resource comprises a codebook-based usage; and determine, based at least in part on the codebook-based usage, that the number of spatial layers of the cross-link interference from the interfering device comprises a number of antenna ports of the reference signal resource.

10. The apparatus of claim 6, wherein the instructions to receive the configuration are executable by the processor to cause the apparatus to:

receive, with the configuration, an indication of the number of spatial layers of the cross-link interference from the interfering device.

11. The apparatus of claim 10, wherein the instructions are further executable by the processor to cause the apparatus to:

determine, based at least in part on the configuration, that the usage information for the at least one reference signal resource set comprises a non-codebook-based usage and a number of reference signal resources in the at least one reference signal resource set;

determine that the number of reference signal resources is the same or less than the number of spatial layers of the cross-link interference from the interfering device; and determine, based at least in part on the number of reference signal resources being the same or less than the number of spatial layers of the cross-link interference from the interfering device and the non-codebook-based usage, that the number of spatial layers of the cross-link interference from the interfering device comprises the number of reference signal resources.

12. The apparatus of claim 10 wherein the instructions are further executable by the processor to cause the apparatus to:

determine, based at least in part on the configuration, that the usage information for the at least one reference signal resource set comprises non-codebook-based usage and a number of reference signal resources in the at least one reference signal resource set;

determine that the number of reference signal resources is greater than the number of spatial layers of the cross-link interference from the interfering device; and determine, based at least in part on the number of reference signal resources being greater than the number of spatial layers of the cross-link interference from the interfering device and the non-codebook-based usage, that the number of spatial layers of the cross-link interference from the interfering device comprises a number of spatial layers of an uplink transmission configured for the interfering device.

13. The apparatus of claim 6, wherein the instructions are further executable by the processor to cause the apparatus to:

identify, based at least in part on a previous channel status information associated with each reference signal resource of a plurality of reference signal resources in the at least one reference signal resource set, a subset of reference signal resources of the at least one reference signal resource set;

determine, based at least in part on the configuration, that the usage information for the at least one reference signal resource set comprises non-codebook-based usage; and determine, based at least in part on the non-codebook-based usage and the number of spatial layers of the cross-link interference from the interfering device, the channel status information associated with the cross-link interference for the subset of reference signal resources.

14. The apparatus of claim 6, wherein the instructions are further executable by the processor to cause the apparatus to:

identify, based at least in part on a previous channel status information associated with each reference signal resource of a plurality of reference signal resources in the at least one reference signal resource set, a reference signal resource of the at least one reference signal resource set;

determine, based at least in part on the configuration, that the usage information for the at least one reference signal resource set comprises codebook-based usage; and determine, based at least in part on the codebook-based usage and the number of spatial layers of the cross-link interference from the interfering device, the channel status information associated with the cross-link interference for the reference signal resource.

15. The apparatus of claim 6, wherein the instructions are further executable by the processor to cause the apparatus to:

determine, based at least in part on the configuration, that the usage information for the at least one reference signal resource set comprises non-codebook-based usage; and transmit, based at least in part on the non-codebook-based usage, the cross-link interference feedback message indicating the channel status information for a subset of reference signal resources in the at least one reference signal resource set.

16. The apparatus of claim 6, wherein the instructions are further executable by the processor to cause the apparatus to:

determine, based at least in part on the configuration, that the usage information for the at least one reference signal resource set comprises codebook-based usage; and transmit, based at least in part on the codebook-based usage, the cross-link interference feedback message indicating the channel status information for a reference signal resource in the at least one reference signal resource set.

17. The apparatus of claim 6, wherein the cross-link interference feedback message indicates a sounding reference signal (SRS) resource indicator (SRI) associated with the cross-link interference from the interfering device.

18. The apparatus of claim 17, wherein the cross-link interference feedback message indicates one SRI based at least in part on the usage information for the at least one reference signal resource set comprising a codebook-based usage.

19. The apparatus of claim 17, wherein the cross-link interference feedback message indicates a number of SRIs equal to the number of spatial layers of the cross-link interference from the interfering device based at least in part on the usage information for the at least one reference signal resource set comprising a non-codebook-based usage.

20. The apparatus of claim 6, wherein the configuration is received in at least one of a radio resource control (RRC) message, or a medium access control (MAC) control element (CE), or a downlink control information (DCI), or a combination thereof.

21. The apparatus of claim 6, wherein the channel status information is based at least in part on the UE operating in a full-duplex communication with the interfering device.

22. An apparatus for wireless communication at a network device, comprising:

a processor, memory coupled with the processor; and instructions stored in the memory and executable by the processor to cause the apparatus to:

determine, for cross-link interference measurement by a user equipment (UE) of cross-link interference from an interfering device, at least one reference signal resource set and usage information for the at least one reference signal resource set;

transmit, to the UE, a configuration for transmitting a cross-link interference feedback message, the configuration indicating the at least one reference signal resource set to be monitored by the UE for the cross-link interference from the interfering device, the configuration also indicating the usage information for the at least one reference signal resource set, wherein:

the configuration comprises an indication of a number of spatial layers in accordance with the usage information comprising a non-codebook-based usage; or the configuration comprises an indication of a number of antenna ports of at least one reference signal resource of the at least one reference signal resource set in accordance with the usage information comprising a codebook-based usage; and receive, from the UE, the cross-link interference feedback message indicating channel status information associated with the cross-link interference from the interfering device, the channel status information being based on the usage information.

23. The apparatus of claim 22, wherein the instructions are further executable by the processor to cause the apparatus to:

determine that there are a plurality of interfering devices associated with the UE, each interfering device associated with a corresponding set of reference signal resources having a same usage information; and combine, based at least in part on the same usage information, the corresponding set of reference signal resources for each interfering device into the indication of the at least one reference signal resource set.

24. The apparatus of claim 23, wherein the instructions are further executable by the processor to cause the apparatus to:

identify, based at least in part on a sounding reference signal (SRS) resource identifier (SRI) and associated cross-link interference level indicated in the cross-link interference feedback message, an interference level associated with at least one interfering device of the plurality of interfering devices.

25. The apparatus of claim 22, wherein the configuration indicates that the usage information for the at least one reference signal resource set comprises the non-codebook-based usage, and the instructions are further executable by the processor to cause the apparatus to:

receive, based at least in part on the non-codebook-based usage, the cross-link interference feedback message indicating the channel status information for a subset of reference signal resources in the at least one reference signal resource set.

26. The apparatus of claim 22, wherein the configuration indicates that the usage information for the at least one reference signal resource set comprises the codebook-based usage, and the instructions are further executable by the processor to cause the apparatus to:

receive, based at least in part on the codebook-based usage, the cross-link interference feedback message indicating the channel status information for a reference signal resource in the at least one reference signal resource set.

27. The apparatus of claim 22, wherein the configuration is transmitted in at least one of a radio resource control (RRC) message, or a medium access control (MAC) control element (CE), or a downlink control information (DCI), or a combination thereof.

28. The apparatus of claim 22, wherein the channel status information is based at least in part on the UE operating in a full-duplex communication with the interfering device.

\* \* \* \* \*